(12) United States Patent
Evans

(10) Patent No.: US 9,299,236 B2
(45) Date of Patent: Mar. 29, 2016

(54) EMERGENCY NOTIFICATION SYSTEM AND METHODS

(71) Applicant: Sielox, LLC, Runnemede, NJ (US)

(72) Inventor: Karen Evans, Glen Mills, PA (US)

(73) Assignee: Sietox, LLC, Runnemede, NJ (US)

( * ) Notice: Subject to any disclaimer, the term of this patent is extended or adjusted under 35 U.S.C. 154(b) by 0 days.

(21) Appl. No.: 14/077,986

(22) Filed: Nov. 12, 2013

(65) Prior Publication Data

US 2014/0132393 A1    May 15, 2014

Related U.S. Application Data

(60) Provisional application No. 61/725,296, filed on Nov. 12, 2012, provisional application No. 61/791,167, filed on Mar. 15, 2013.

(51) Int. Cl.
| | |
|---|---|
| *G08B 1/08* | (2006.01) |
| *G08B 13/14* | (2006.01) |
| *G08B 23/00* | (2006.01) |
| *G08B 21/02* | (2006.01) |
| *G05B 15/02* | (2006.01) |
| *G08B 25/14* | (2006.01) |

(52) U.S. Cl.
CPC ............... *G08B 21/02* (2013.01); *G05B 15/02* (2013.01); *G08B 25/14* (2013.01)

(58) Field of Classification Search
CPC .......... G08B 1/08; G08B 13/14; G08B 23/00; G08B 21/02; G05B 15/02
USPC .................. 340/6.11, 572.1, 573.1, 506, 3.1; 701/213, 214; 342/357.01, 357.02; 455/404.2
See application file for complete search history.

(56) References Cited

U.S. PATENT DOCUMENTS

| | | | |
|---|---|---|---|
| 6,229,429 B1 | 5/2001 | Horon | |
| 6,873,256 B2 * | 3/2005 | Lemelson et al. | 340/539.1 |
| 7,286,814 B2 * | 10/2007 | Watanabe et al. | 455/404.2 |
| 7,518,531 B2 * | 4/2009 | Butzer et al. | 340/907 |
| 7,528,723 B2 * | 5/2009 | Fast et al. | 340/572.1 |
| 7,579,945 B1 * | 8/2009 | Richter et al. | 340/506 |

(Continued)

FOREIGN PATENT DOCUMENTS

WO    2006034246    3/2006

OTHER PUBLICATIONS

International Search Report and Written Opinion for related PCT Application No. PCT/US2013/069679 mailed Jun. 10, 2014 (10 pages).

*Primary Examiner* — Nam V Nguyen
(74) *Attorney, Agent, or Firm* — Winthrop & Weinstine, P.A.

(57) ABSTRACT

The present invention is related to systems and methods for identifying and reporting a crisis status. In at least one embodiment, the system comprises a central server; an administrative work station communicably coupled to the central server, wherein the administrative work station is accessible only by an authorized administrator; a database communicably coupled to the central server, the database including a floor plan of the area, wherein the database is accessible and modifiable by the authorized administrator at the administrative work station; and a remote device at a particular location in the area, the remote device communicably coupled to the central server, the remote device capable of communicating securely to the database the particular location of the remote device and the crisis status of the particular location.

14 Claims, 59 Drawing Sheets

(56) References Cited

U.S. PATENT DOCUMENTS

| | | | |
|---|---|---|---|
| 7,961,110 B2 * | 6/2011 | Lemmon | 340/573.1 |
| 8,013,734 B2 * | 9/2011 | Saigh et al. | 340/539.13 |
| 8,350,700 B2 * | 1/2013 | Fast et al. | 340/572.1 |
| 8,391,909 B2 * | 3/2013 | Stewart | 455/518 |
| 8,400,292 B2 * | 3/2013 | Kummetz | 340/517 |
| 8,558,689 B2 * | 10/2013 | Mitchell | A62B 99/00 340/539.11 |
| 2002/0174367 A1 | 11/2002 | Kimmel | |
| 2003/0125998 A1 * | 7/2003 | McKenney | G06Q 90/205 705/324 |
| 2011/0141276 A1 * | 6/2011 | Borghei | 348/143 |
| 2012/0286951 A1 * | 11/2012 | Hess et al. | 340/539.1 |
| 2013/0303193 A1 * | 11/2013 | Dharwada | H04W 4/043 455/456.3 |

* cited by examiner

| SAVE ALL | CLEAR | CLOSE |

ID: 10

NAME: SOMETIME   ENABLED: ☑

DESCRIPTION: SOME OF THE TIME

| INTERVAL | MON | TUE | WED | THU | FRI | SAT | SUN | HOL | START | STOP |
|---|---|---|---|---|---|---|---|---|---|---|
| 1 | ☑ | ☑ | ☑ | ☑ | ☑ | ☐ | ☐ | ☐ | 08:00 | 17:59 |
| 2 | ☐ | ☐ | ☐ | ☐ | ☐ | ☐ | ☐ | ☐ | 00:00 | 00:00 |
| 3 | ☐ | ☐ | ☐ | ☐ | ☐ | ☐ | ☐ | ☐ | 00:00 | 00:00 |
| 4 | ☐ | ☐ | ☐ | ☐ | ☐ | ☐ | ☐ | ☐ | 00:00 | 00:00 |
| 5 | ☐ | ☐ | ☐ | ☐ | ☐ | ☐ | ☐ | ☐ | 00:00 | 00:00 |
| 6 | ☐ | ☐ | ☐ | ☐ | ☐ | ☐ | ☐ | ☐ | 00:00 | 00:00 |
| 7 | ☐ | ☐ | ☐ | ☐ | ☐ | ☐ | ☐ | ☐ | 00:00 | 00:00 |
| 8 | ☐ | ☐ | ☐ | ☐ | ☐ | ☐ | ☐ | ☐ | 00:00 | 00:00 |

| SAVE ALL | CLEAR | CLOSE |

| NAME | FIRST | LAST | GROUP | ACTIONS | STATUS | ENABLED | DESCRIPTION | MODIFICATIONS |
|---|---|---|---|---|---|---|---|---|
| SU (COPY) | SUPER | USER (COPY) | SU | ACTION.. ▼ | NONE | YES | | SELECT.. ▼ |
| RESPONDER | 1 | RESPONDER | RESPONDER | ACTION.. ▼ | NONE | YES | RESPONDER | SELECT.. ▼ |
| OPERATOR | STANDARD | OPERATOR | OPERATOR | ACTION.. ▼ | EMERGENCY | YES | STANDARD OPERATOR | SELECT.. ▼ |
| INITIATOR | 1 | INITIATOR | INITIATOR | ACTION.. ▼ | YELLOW | YES | INITIATOR (E.G. TEACHER, AID, GUARDIAN) | SELECT.. ▼ |
| ADMIN | ADMIN | ADMIN | ADMIN | ACTION.. ▼ | EMERGENCY | YES | | SELECT.. ▼ |

Fig. 22

| NAME | ADMIN | CONFIG | MONITOR | DASHBOARD | DESCRIPTION | |
|---|---|---|---|---|---|---|
| ADMIN | VMX | VMX | VMX | ADMIN | | SELECT... ▼ |
| CONFIGURATOR | VMX | VMX | VMX | ADMIN | | SELECT... ▼ |
| GUEST | ... | ... | V.. | MONITOR | GUEST ACCOUNT - PRE AUTHENTICATION | SELECT... ▼ |
| INITIATOR | ... | ... | V.. | RP | | SELECT... ▼ |
| MONITOR | ... | V.X | VMX | MONITOR | | SELECT... ▼ |
| RESPONDER | ... | ... | V.. | AUTH | RESPONDER - SCHOOL ADMIN, EMS | SELECT... ▼ |

Fig. 24

| NAME | ACTIONS | STATUS | ENABLED | DESCRIPTION | MODIFICATIONS | | TIME SPAN |
|---|---|---|---|---|---|---|---|
| 10AM-NOON | | NONE | YES | MORNINGS | SELECT... | M T W TH F | 10:00-12:00 |
| AFTERNOON CONTRACTORS | | NONE | YES | BUSINESS AFTERNOONS | SELECT... | M T W TH F | 11:55-17:00 |
| ALWAYS | | ACTIVATED | YES | ALL THE TIME | SELECT... | M T W TH F S SU H | 00:00-23:59 |
| ALWAYS (COPY) | | NONE | YES | ALL THE TIME | SELECT... | M T W TH F S SU H | 00:00-23:59 |
| NEVER | | ACTIVATED | YES | NEVER | SELECT... | | 23:59-00:00 |
| STANDARD HOURS | | ACTIVATED | YES | TYPICAL STANDARD HOURS | SELECT... | M T W TH F | 08:30-17:00 |
| UNLOCK 3:15PM-3:45PM | | NONE | YES | 2 INTERVAL | SELECT... | M T W TH F S SU H | 15:15-15:44 |
| WEEKEND HOURS | | ACTIVATED | YES | TYPICAL WEEKEND HOURS | SELECT... | S SU H | 08:30-17:00 |

Fig. 26

| SAVE ALL | CLEAR | CLOSE |

ID: 9

NAME: TWILIGHT ZONE  ENABLED: ☑

DESCRIPTION: TWILIGHT

| INTERVAL | MON | TUE | WED | THU | FRI | SAT | SUN | HOL | START | STOP |
|---|---|---|---|---|---|---|---|---|---|---|
| 1 | ☑ | ☑ | ☑ | ☑ | ☑ | ☑ | ☑ | ☑ | 04:59 | 7:59 |
| 2 | ☑ | ☑ | ☑ | ☑ | ☑ | ☑ | ☑ | ☑ | 18:00 | 20:00 |
| 3 | ☐ | ☐ | ☐ | ☐ | ☐ | ☐ | ☐ | ☐ | 00:00 | 00:00 |
| 4 | ☐ | ☐ | ☐ | ☐ | ☐ | ☐ | ☐ | ☐ | 00:00 | 00:00 |
| 5 | ☐ | ☐ | ☐ | ☐ | ☐ | ☐ | ☐ | ☐ | 00:00 | 00:00 |
| 6 | ☐ | ☐ | ☐ | ☐ | ☐ | ☐ | ☐ | ☐ | 00:00 | 00:00 |
| 7 | ☐ | ☐ | ☐ | ☐ | ☐ | ☐ | ☐ | ☐ | 00:00 | 00:00 |
| 8 | ☐ | ☐ | ☐ | ☐ | ☐ | ☐ | ☐ | ☐ | 00:00 | 00:00 |

| SAVE ALL | CLEAR | CLOSE |

Fig. 27

| NAME | START | END | ACTIONS | STATUS ENABLED | DESCRIPTION | MODIFICATIONS |
|---|---|---|---|---|---|---|
| 32513 | 03/25/2013 00:00 | 03/25/2013 23:59 | ACTION... ▾ | YES | | SELECT... ▾ |
| HOLIDAY TEMPLATE | 12/31/1969 19:00 | 12/31/1969 19:00 | ACTION... ▾ | YES | BASE TEMPLATE FOR HOLIDAYS | SELECT... ▾ |
| HOLIDAY TEMPLATE (COPY) | 12/31/1969 19:00 | 12/31/1969 19:00 | ACTION... ▾ | YES | BASE TEMPLATE FOR HOLIDAYS | SELECT... ▾ |

Fig. 28

| NAME | ACTIONS | STATUS | ENABLED | DESCRIPTION | MODIFICATIONS | CONTROLLER |
|---|---|---|---|---|---|---|
| DOOR 1 TEMPLATE | ACTION... ▼ | TEST | YES | FIRST DOOR | SELECT... ▼ | EXTERIOR CONTROLLER |
| DOOR 2 TEMPLATE | ACTION... ▼ | TEMPLATE | YES | SECOND DOOR | SELECT... ▼ | INTERIOR CONTROLLER |
| C13D1 | ACTION... ▼ | UNLOCKED | YES | FIRST DOOR | SELECT... ▼ | UNKNOWN |
| LOCKDOWN DOOR 1 | ACTION... ▼ | UNLOCKED | YES | LOCKDOWN DOOR 1 | SELECT... ▼ | CLASS DEMO UNIT 220 |
| D1 ON 219 | ACTION... ▼ | LOCKED | YES | DOOR 1 ON 219 | SELECT... ▼ | 219 |
| D2 ON 219 | ACTION... ▼ | LOCKED | YES | DOOR 2 ON 219 | SELECT... ▼ | 219 |

| NAME | ACTIONS | STATUS | ENABLED | DESCRIPTION | MODIFICATIONS | CONTROLLER |
|---|---|---|---|---|---|---|
| READER 1 TEMPLATE | ACTION... ▼ | UNKNOWN | YES | READER 1 TEMPLATE DESCRIPTION | SELECT... ▼ | EXTERIOR CONTROLLER |
| READER 2 TEMPLATE | ACTION... ▼ | UNKNOWN | YES | READER 2 TEMPLATE DESCRIPTION | SELECT... ▼ | EXTERIOR CONTROLLER |
| C13-R1 | ACTION... ▼ | UNBLOCKED | YES | READER 1 | | |
| APTIQ R1 | ACTION... ▼ | UNBLOCKED | YES | APTIQ READER ON PORT 1 | SELECT... ▼ | UNKNOWN |
| R1 D1 219 | ACTION... ▼ | UNBLOCKED | YES | READER 1 ON 219 | SELECT... ▼ | CLASS DEMO UNIT 220 |
| R2 D2 219 | ACTION... ▼ | UNBLOCKED | YES | READER 2 ON 219 | SELECT... ▼ | 219 |

| NAME | ACTIONS | STATUS | ENABLED | DESCRIPTION | MODIFICATIONS | CONTROLLER |
|---|---|---|---|---|---|---|
| INPUT TEMPLATE 1 | ACTION... ▼ | UNKNOWN | YES | | SELECT... ▼ | EXTERIOR CONTROLLER |
| INPUT TEMPLATE 2 | NOT AUTHORIZED | UNKNOWN | NO | INPUT 12 | SELECT... ▼ | EXTERIOR CONTROLLER |
| RED BUTTON I1 | ACTION... ▼ | ACTIVE | YES | RED BUTTON ON INPUT 1 | SELECT... ▼ | CLASS DEMO UNIT 220 |
| YELLOW BUTTON I2 | ACTION... ▼ | ACTIVE | YES | YELLOW BUTTON ON INPUT 2 | SELECT... ▼ | CLASS DEMO UNIT 220 |
| GREEN BUTTON I3 | ACTION... ▼ | ACTIVE | YES | GREEN BUTTON ON INPUT 2 | SELECT... ▼ | CLASS DEMO UNIT 220 |

| NAME | ACTIONS | STATUS | ENABLED | DESCRIPTION | MODIFICATIONS | CONTROLLER |
|---|---|---|---|---|---|---|
| OUTPUT TEMPLATE | ACTION... ▸ | UNKNOWN | YES | OUTPUT TEMPLATE DESCRIPTION | SELECT... ▸ | EXTERIOR CONTROLLER |
| C13.o1 | ACTION... ▸ | OFF | YES | OUTPUT TEMPLATE DESCRIPTION | SELECT... ▸ | UNKNOWN |
| GREEN LIGHT o3 | ACTION... ▸ | OFF | YES | GREEN LIGHT OUTPUT 3 | SELECT... ▸ | CLASS DEMO UNIT 220 |
| RED LIGHT o1 | ACTION... ▸ | OFF | YES | RED LIGHT OUTPUT 1 | SELECT... ▸ | CLASS DEMO UNIT 220 |
| YELLOW LIGHT o2 | ACTION... ▸ | OFF | YES | YELLOW LIGHT OUTPUT 2 | SELECT... ▸ | CLASS DEMO UNIT 220 |

Fig. 36

| SAVE ALL | CLEAR | CLOSE |

ID: 7  NAME: RED LIGHT 01     ENABLED: ☑ — 3704
                                        ↑
                                       3706

DESCRIPTION: RED LIGHT OUTPUT 1

ADDRESS: 1    CONTROLLER: CLASS DEMO UNIT 220 ▼

ACTIVATION TIME: 1  X SECONDS ▼
OUTPUT TRIGGER: MOMENTARY ▼
NORMAL OUTPUT STATE: FAIL SECURE ▼
AUTOMATIC ACTIVATION TIME ZONE: NEVER ▼
INPUT/EVENT ACTIVATION TIME ZONE: ALWAYS ▼
REPORT STATE CHANGED TIME ZONE: ALWAYS ▼

INPUT TRIGGERED OUTPUTS
  INPUT
    RED BUTTON 11: ☑
    YELLOW BUTTON 12: ☐
    GREEN BUTTON 13: ☐

| SAVE ALL | CLEAR | CLOSE |

| NAME | ACTIONS | STATUS | ENABLED | DESCRIPTION | MODIFICATIONS | IP | VERSION |
|---|---|---|---|---|---|---|---|
| EXTERIOR CONTROLLER | DISABLED | DEACTIVATED | NO | TEMPLATE | SELECT... ▼ | 192.168.1.170 | UNKNOWN |
| EXTERIOR CONTROLLER (COPY) | DISABLED | DEACTIVATED | NO | TEMPLATE | SELECT... ▼ | 192.168.1.170 | UNKNOWN |
| INTERIOR CONTROLLER | DISABLED | DEACTIVATED | NO | TEMPLATE | SELECT... ▼ | 192.168.1.171 | UNKNOWN |
| 219 | ACTION... ▼ | CONNECTED | YES | 219 | SELECT... ▼ | 192.168.200.219 | 18-20 |
| CLASS DEMO UNIT 220 | DISABLED | DEACTIVATED | NO | CLASS DEMO UNIT 220 | SELECT... ▼ | 192.168.200.220 | 18-20 |

| NAME | ACTIONS | STATUS | ENABLED | DESCRIPTION | MODIFICATIONS | MODEL | IP | VERSION |
|---|---|---|---|---|---|---|---|---|
| AW2.SIELOX.COM | ACTION... ▼ | RUNNING | YES | AW2.SIELOX.COM | SELECT.. ▼ | STANDARD | 192.168.200.68 | 1.4.0418 |
| CLASS4.SIELOX.COM | NOT AUTHORIZED | RUNNING | NO | CLASS4.SIELOX.COM | SELECT.. ▼ | STANDARD | 192.168.200.74 | 1.4.0320 |
| AW4.SIELOX.COM | NOT AUTHORIZED | RUNNING | NO | AW4.SIELOX.COM | SELECT.. ▼ | STANDARD | 192.168.200.70 | 1.4.0415 |
| AW1.SIELOX.COM | NOT AUTHORIZED | RUNNING | NO | AW1.SIELOX.COM | SELECT.. ▼ | STANDARD | 192.168.200.67 | 1.4.0318 |

Fig. 40

| WHAT | WHERE | | WHO | | WHEN | EVEN |
|---|---|---|---|---|---|---|
| DELETED CARDHOLDER | SYSTEM | 192.168.201.83 | ADMIN | CARDHOLDER (COPY), TEMPLATE | 15:30 03-19-13 | 45773 |
| MODIFIED CARDHOLDER | SYSTEM | 192.168.201.83 | ADMIN | | 15:30 03-19-13 | 45772 |
| CREATED CARDHOLDER | SYSTEM | 192.168.201.83 | ADMIN | CARDHOLDER (COPY), TEMPLATE | 15:30 03-19-13 | 45771 |
| MODIFIED OUTPUT | SYSTEM | 192.168.201.83 | ADMIN | DELETED OUTPUT OUTPUT TEMPLATE (COPY) | 15:25 03-19-13 | 45770 |
| MODIFIED OUTPUT | SYSTEM | 192.168.201.83 | ADMIN | UPDATED OUTPUT OUTPUT TEMPLATE (COPY) | 15:25 03-19-13 | 45769 |
| MODIFIED OUTPUT | SYSTEM | 192.168.201.83 | ADMIN | ADDED OUTPUT OUTPUT TEMPLATE (COPY) | 15:25 03-19-13 | 45768 |
| MODIFIED INTPUT | SYSTEM | 192.168.201.83 | ADMIN | DELETED INPUT INPUT TEMPLATE 1 (COPY) | 15:25 03-19-13 | 45767 |
| MODIFIED INTPUT | SYSTEM | 192.168.201.83 | ADMIN | UPDATED INPUT INPUT TEMPLATE 1 (COPY) | 15:25 03-19-13 | 45766 |
| MODIFIED CONTROLLER | SYSTEM | 192.168.201.83 | ADMIN | ADDED INPUT INPUT TEMPLATE 1 (COPY) | 15:25 03-19-13 | 45765 |
| MODIFIED READER | SYSTEM | 192.168.201.83 | ADMIN | DELETED READER READER 1 TEMPLATE (COPY) | 15:25 03-19-13 | 45764 |
| MODIFIED READER | SYSTEM | 192.168.201.83 | ADMIN | UPDATED READER READER 1 TEMPLATE (COPY) | 15:25 03-19-13 | 45763 |
| REFRESH SUCCEEDED | TERMINAL CONTROLLER | C13 | 192.168.200.219 | UBUNTU | 15:25 03-19-13 | 45762 |
| MODIFIED READER | SYSTEM | 192.168.201.83 | ADMIN | ADDED READER READER 1 TEMPLATE (COPY) | 15:25 03-19-13 | 45761 |
| REFRESH SCHEDULED | TERMINAL CONTROLLER | TEST | 192.168.201.218 | UBUNTU | 15:25 03-19-13 | 45760 |
| REFRESH SCHEDULED | TERMINAL CONTROLLER | C13 | 192.168.200.219 | UBUNTU | 15:25 03-19-13 | 45759 |
| MODIFIED DOOR | SYSTEM | 192.168.201.83 | ADMIN | DELETED DOOR DOOR 1 TEMPLATE (COPY) | 15:25 03-19-13 | 45758 |
| MODIFIED DOOR | SYSTEM | 192.168.201.83 | ADMIN | UPDATED DOOR CONFIGURATION FOR DOOR 1 TEMPLATE (CO | 15:25 03-19-13 | 45757 |
| REFRESH SUCCEEDED | TERMINAL CONTROLLER | C13 | 192.168.200.219 | UBUNTU | 15:25 03-19-13 | 45756 |
| REFRESH SCHEDULED | TERMINAL CONTROLLER | TEST | 192.168.201.218 | UBUNTU | 15:25 03-19-13 | 45755 |

| WHAT | WHERE | | WHO | | WHEN | EVENT |
|---|---|---|---|---|---|---|
| LOGIN | SYSTEM | UBUNTU | 192.168.201.78 | A | 10:08 05-10-13 | 68497 |
| LOGOUT | SYSTEM | UBUNTU | 192.168.201.78 | A | 10:08 05-10-13 | 68496 |
| ALERT LEVEL CHANGED EMERGENCY | SYSTEM | ADMIN | 192.168.201.73 | ADMIN | 10:07 05-10-13 | 68495 |
| ALERT LEVEL CHANGED MONITOR | SYSTEM | ADMIN | 192.168.201.73 | ADMIN | 10:07 05-10-13 | 68494 |
| LOGIN | SYSTEM | UBUNTU | 192.168.201.78 | A | 10:07 05-10-13 | 68493 |
| LOGOUT | SYSTEM | UBUNTU | 192.168.201.78 | ADMIN | 10:07 05-10-13 | 68492 |
| MODIFIED USER | SYSTEM | A | 192.168.201.78 | ADMIN | 10:07 05-10-13 | 68491 |
| MODIFIED USER | SYSTEM | 192.168.201.78 | ADMIN | SHORE, ROBERT (COPY) | 10:07 05-10-13 | 68490 |
| MODIFIED USER GROUP | SYSTEM | 192.168.201.78 | ADMIN | MODIFIED USER GROUP SCHOOLADMINS | 10:07 05-10-13 | 68489 |
| LOGIN | SYSTEM | UBUNTU | 192.168.201.78 | ADMIN | 10:06 05-10-13 | 68488 |
| ALERT LEVEL CHANGED MONITOR | SYSTEM | ADMIN | 192.168.201.73 | ADMIN | 10:06 05-10-13 | 68487 |
| LOGIN | SYSTEM | UBUNTU | 192.168.201.73 | ADMIN | 10:05 05-10-13 | 68486 |
| LOGOUT | SYSTEM | UBUNTU | 192.168.201.73 | TEACHER PAUL | 10:05 05-10-13 | 68485 |
| LOGIN | SYSTEM | UBUNTU | 192.168.201.78 | I | 09:58 05-10-13 | 68484 |
| LOGIN | SYSTEM | UBUNTU | 192.168.201.78 | R | 09:58 05-10-13 | 68483 |

Fig. 57

| NAME | ACTIONS | STATUS | ENABLED | DESCRIPTION | MODIFICATIONS | SUBJECT |
|---|---|---|---|---|---|---|
| ACTION EMAIL TEMPLATE | NO ACTIONS | ACTIVATED | YES | ACTION E-MAIL TEMPLATE / EXAMPLE | SELECT... | SAMPLE SUBJECT |
| AOL VALIDATION | NO ACTIONS | NONE | YES | AW3 ACTION EMAIL | SELECT... | TEST |
| GMAIL VALIDATION | NO ACTIONS | NONE | YES | AW3 ACTION EMAIL | SELECT... | TEST |
| RYAN TEST | NO ACTIONS | NONE | YES | RYAN TEST | SELECT... | TESTING SIELOX CLASS |
| SECONDARY EMAIL VALIDATION | NO ACTIONS | NONE | YES | AW3 ACTION EMAIL | SELECT... | TEST |
| YMAIL VALIDATION 2 | NO ACTIONS | NONE | YES | AW3 ACTION EMAIL | SELECT... | TEST |

Fig. 58

EMERGENCY NOTIFICATION SYSTEM AND METHODS

CROSS-REFERENCE TO RELATED APPLICATIONS

This application claims priority to U.S. Provisional Application No. 61/725,296, entitled "Emergency Notification System and Methods," filed Nov. 12, 2012, and U.S. Provisional Application No. 61/791,167, entitled "Features of an Emergency Notification System and Methods," filed Mar. 15, 2013, which are hereby incorporated herein in their entireties.

BACKGROUND

The emergency system currently used in most K-12 schools throughout the country is a manual system utilizing three cards (plastic or paper) that are color coded. Each card has been assigned a status for each color. Three color cards are issued to each room in the school and the teacher or staff member is trained in an emergency to gather all students or staff in a designated secure area of the room, lock the door, and slide a colored card under the door or place it in the window to indicate the status of that particular room. The Principal, security or other designated employee(s) are then responsible to walk around and determine the safe and secure vs. unsecured rooms needing attention in the emergency. This puts those individuals in a potentially dangerous environment should they encounter an intruder or dangerous individual while taking inventory of the status of all rooms. Thus, there is a need for a more automated system that may safely indicate and communicate the security level of one or more areas to persons of interest.

BRIEF SUMMARY OF THE INVENTION

Embodiments of the present invention comprise an emergency notification system for an area, such as a school building, college campus, commercial building, industrial building, mall, sports facility, residential building, airport, transit station, or other similar structure. In at least one embodiment, the emergency notification system comprises: a central server; an administrative work station communicably coupled to the central server, wherein the administrative work station is accessible only by an authorized administrator; a database communicably coupled to the central server, the database including a floor plan of the area, wherein the database is accessible and modifiable by the authorized administrator at the administrative work station; and a remote device at a particular location in the area, the remote device communicably coupled to the central server, the remote device is accessible only by an authorized user, the remote device capable of communicating securely to the database the particular location of the remote device and the crisis status of the particular location. In at least one embodiment, the authorized user selects an indicator on the remote device corresponding to the crisis status of the location, which is communicated to the database and the floor plan is updated in real time to reflect the security status of the location. In at least one embodiment, the floor plan is viewable by both the authorized administrator and the authorized user. In some embodiments, the authorized administrator is at least one of an employee, a security officer, a first responder, or a government agent. In at least one embodiment, the authorized administrator and the authorized user must each be authenticated through a login process.

In some embodiments, the emergency notification system further comprises a chat feature enabling at least one of audio, video, or text communication between the authorized administrator and the authorized user.

In some embodiments, the emergency notification system further comprises a safety device communicably coupled to the central server, wherein a signal may be sent by the central server to the safety device to control the safety device depending on the crisis status of the particular location. The safety device may be selected from the group consisting of speakers, alarms, cameras, lights, locks, barriers, sensors, fire sprinkler systems, and public address systems. In at least one embodiment, the signal is an encrypted signal. In at least one embodiment, the safety device is in communication with a controller, which is in communication with the remote device.

In some embodiments, the remote device can be hardwired at the particular location, and in other embodiments the remote device is a wireless device in wireless communication with the central server. In some embodiments, the remote device comprises a microphone, a camera, and a speaker. In some embodiments, the remote device is selected from the group consisting of desktops, laptops, mobile phones, smartphones, and tablet devices. In at least one embodiment, the remote device comprises a touchscreen.

Methods of remotely communicating a crisis status of a particular location using an emergency notification system are described herein. In at least one embodiment, a method of remotely communicating a crisis status of a particular location to an authority comprises communicating the particular location of an authorized user to a database via a remote device, wherein the database is communicably coupled to a central server and the database includes a floor plan of the area; and selecting an indicator that correlates with the crisis status of the particular location, wherein selecting the indicator updates the floor plan in the database. In some embodiments, the method may further comprise communicating instructions and information through a chat feature enabling at least one of audio, video, or text communication between the authority and the authorized user. In some embodiments, the method may further comprise controlling a safety device communicably coupled to the central server, wherein a signal dependent upon the crisis status of the particular location may be sent by the central server to the safety device. The safety device may be selected from the group consisting of speakers, alarms, cameras, lights, locks, barriers, sensors, fire sprinkler systems, and public address systems.

BRIEF DESCRIPTION OF THE SEVERAL FIGURES

FIG. 1 is a schematic of an embodiment of the invention.
FIG. 2 is a schematic of an embodiment of the invention.
FIG. 3 is an electrical schematic of an embodiment of a controller in communication with the remote device.
FIG. 4 is an electrical schematic of an embodiment of a controller in communication with the safety device.
FIG. 5 is a screenshot from an embodiment of an authorized administrator interface for the database of an embodiment of the invention, according to some embodiments of the present disclosure.
FIG. 6 is a screenshot from an embodiment of an authorized administrator interface for the database of an embodiment of the invention, according to some embodiments of the present disclosure.
FIG. 7 is a screenshot showing a setup menu for an embodiment of an authorized administrator interface for the database of an embodiment of the invention, according to some embodiments of the present disclosure.

FIG. 11 is a screenshot from an embodiment of an authorized administrator interface for the database of an embodiment of the invention relating to the function of modifying, adding, or editing the schedule settings, according to some embodiments of the present disclosure.

FIG. 16 is a screenshot from an embodiment of an authorized administrator interface for the database of an embodiment of the invention relating to functions of a safety device, according to some embodiments of the present disclosure.

FIG. 22 is a screenshot from an embodiment of an authorized administrator interface for the database of an embodiment of the invention relating to a list of authorized users, according to some embodiments of the present disclosure.

FIG. 24 is a screenshot from an embodiment of an authorized administrator interface for the database of an embodiment of the invention relating to user groups, according to some embodiments of the present disclosure.

FIG. 26 is a screenshot from an embodiment of an authorized administrator interface for the database of an embodiment of the invention relating to "time zones," according to some embodiments of the present disclosure.

FIG. 27 is a screenshot from an embodiment of an authorized administrator interface for the database of an embodiment of the invention relating to the function of modifying, adding, or editing time zones, according to some embodiments of the present disclosure.

FIG. 28 is a screenshot from an embodiment of an authorized administrator interface for the database of an embodiment of the invention relating to "holidays," according to some embodiments of the present disclosure.

FIG. 30 is a screenshot from an embodiment of an authorized administrator interface for the database of an embodiment of the invention relating to the safety devices, according to some embodiments of the present disclosure.

FIG. 31 is a screenshot from an embodiment of an authorized administrator interface for the database of an embodiment of the invention relating to the function of modifying, adding, or editing safety devices, according to some embodiments of the present disclosure.

FIG. 32 is a screenshot from an embodiment of an authorized administrator interface for the database of an embodiment of the invention relating to access card readers, according to some embodiments of the present disclosure.

FIG. 34 is a screenshot from an embodiment of an authorized administrator interface for the database of an embodiment of the invention relating to sensors, according to some embodiments of the present disclosure.

FIG. 36 is a screenshot from an embodiment of an authorized administrator interface for the database of an embodiment of the invention relating to output devices, according to some embodiments of the present disclosure.

FIG. 37 is a screenshot from an embodiment of an authorized administrator interface for the database of an embodiment of the invention relating to the function of modifying, adding, or editing the output devices, according to some embodiments of the present disclosure.

FIG. 38 is a screenshot from an embodiment of an authorized administrator interface for the database of an embodiment of the invention relating to controllers, according to some embodiments of the present disclosure.

FIG. 39 is a screenshot from an embodiment of an authorized administrator interface for the database of an embodiment of the invention relating to the function of modifying, adding, or editing the controllers, according to some embodiments of the present disclosure.

FIG. 40 is a screenshot from an embodiment of an authorized administrator interface for the database of an embodiment of the invention relating to websites for access to the database, according to some embodiments of the present disclosure.

FIG. 42 is a screenshot from an embodiment of an authorized administrator interface for the database of an embodiment of the invention relating to the events, according to some embodiments of the present disclosure.

FIG. 44 is a screenshot from an embodiment of an authorized administrator interface for the database of an embodiment of the invention relating to triggers, according to some embodiments of the present disclosure.

FIG. 57 is a screenshot from an embodiment of a responder interface for the database of an embodiment of the invention, according to some embodiments of the present disclosure.

FIG. 58 is a screenshot from an embodiment of an e-mail system relating to the database, according to some embodiments of the present disclosure.

DESCRIPTION OF THE INVENTION

Figure 1:
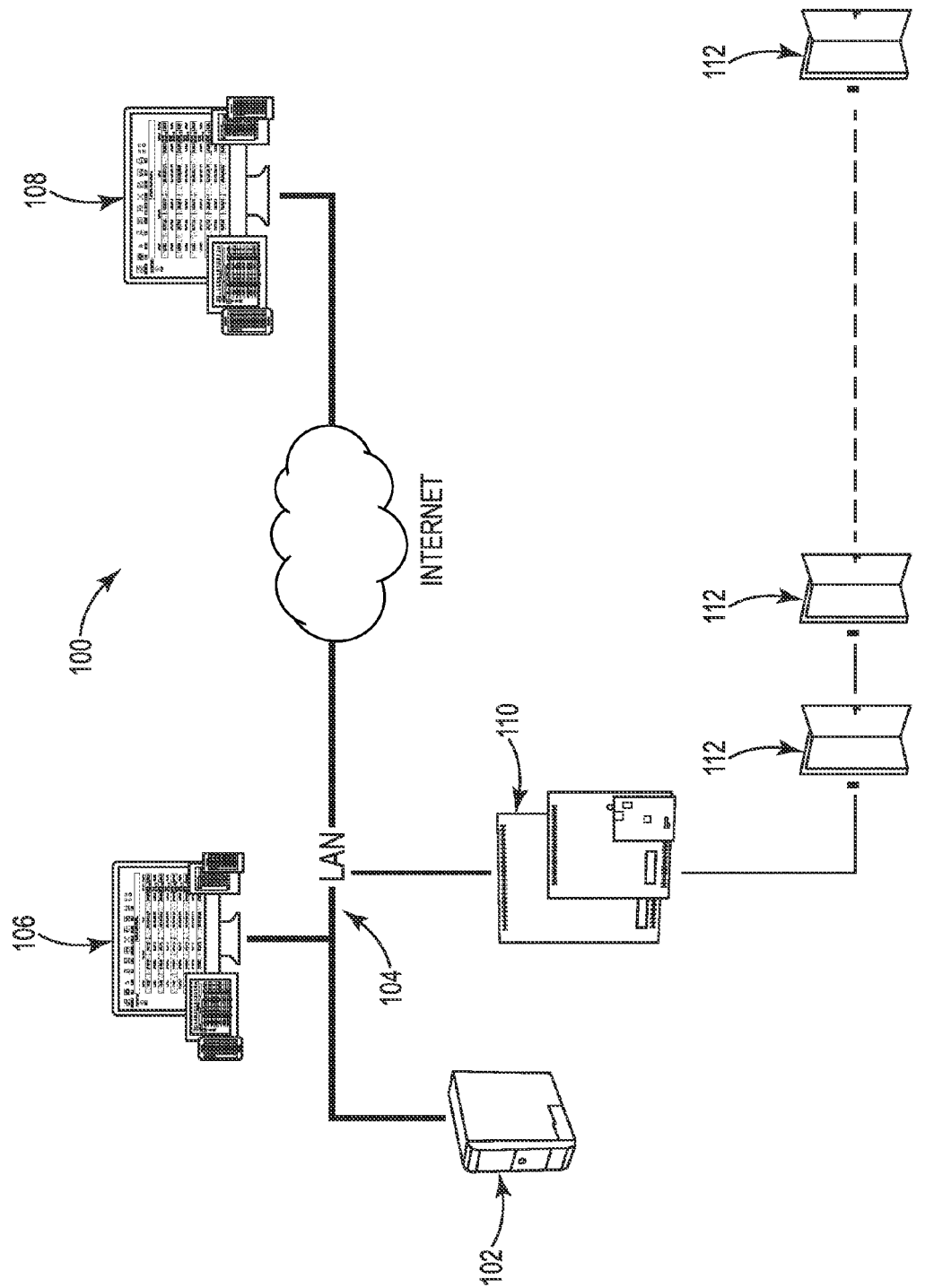

The present disclosure in some embodiments is intended for use in a school setting and comprises a secure, automated system to provide instant communication and/or notification of an emergency situation in a school building to the school administrators (for example, a principal, headmaster, superintendent or dean), security personnel, emergency responders, and/or other designated employees. These individuals can be classified as "authorized administrators" of the system. The system of the present invention is suitable for buildings comprising one or more rooms (such as a classroom) and other areas such as, for example, exits or entrances, hallways, stairwells, common areas, cafeterias, checkpoints, parking facilities, etc. In many examples, the building has a floor plan, which is a two-dimensional or three-dimensional representation of the layout of the rooms and other areas. In many embodiments, the authorized administrator may be located remotely from a particular location, and may need to rely on information available to a staff member overseeing that area, in order to determine the crisis status of a particular area, such as a classroom or the hallway. Both time and information are critical to the successful resolution of an emergency situation. The system allows authorized staff members to securely provide real-time information about an emergency situation, such as a security issue, a fire, a medical emergency, or a missing person, for example, to the authorized administrator in order to successfully resolve the situation and protect unaffected areas of the building. In some embodiments, the system not only allows authorized staff members to provide information to authorized administrators, but the system may also allow authorized administrators to provide information to the authorized staff members. Thus, information about emergency situations can be safely exchanged in real time between staff members, administrators, first responders, and/or parents or guardians, for example, in order to assess the safety situation of the building from secure areas. It will be understood that while embodiments of the present disclosure are being discussed with regard to the K-12 school setting, other embodiments are possible. For example, embodiments of the present disclosure may be used in a college setting, military setting, camp setting, work place setting, residential setting, airport, shopping mall, or any other suitable setting.

In some embodiments, a room status signal can be configured to lockdown all appropriate doors in the school. In addition, in some embodiments, the programming can be configured to not only lock doors but block access rights from those doors except to a limited number of card holders such as security or first responder, for example. In some embodiments, the system may also include the ability for an authorized user, for example, a teacher or librarian, to initiate a lockdown of the room they are currently in, for example, in the event that they perceive a threat. In some embodiments, the programming may be or may also be configured to communicate an automatic update to the system if a door has been forced. For example, if an unauthorized individual forces or attempts to force a door open, the system may automatically flag that fact on the floor plan graphic, for example by the appearance of a pre-determined icon and/or color over that room. This indicator may provide appropriate personnel or individuals with critical information such that rescue and control efforts may be better prioritized, for example.

Figure 2:
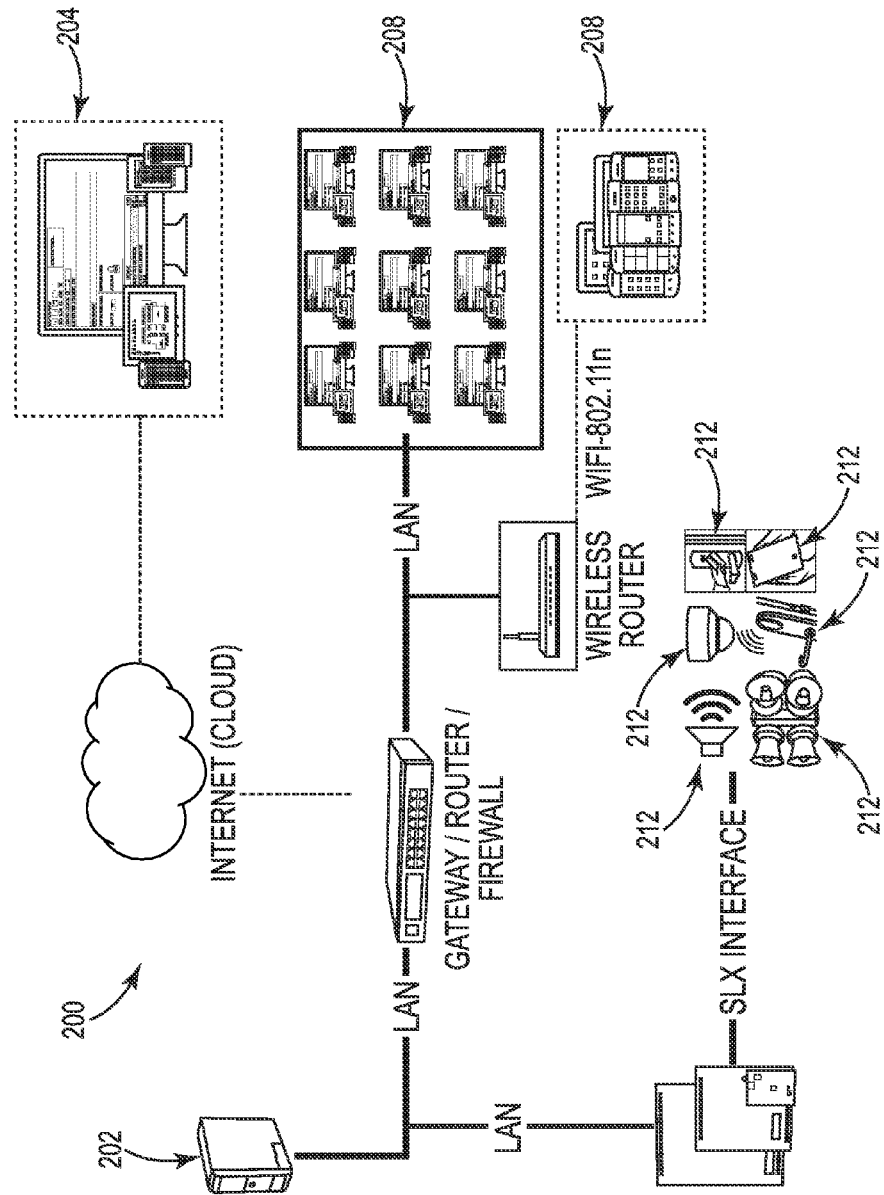

FIGS. 1-2 show exemplary embodiments of the emergency notification system of the present invention. To effectuate the communication of information regarding an emergency situation or the present status of a classroom or area in a school setting, system 100 of FIG. 1 comprises a database 102. In some embodiments, the database comprises a software package, which may be Sielox Pinnacle® software, but other software programs are possible and within the spirit and scope of the present disclosure. In at least one embodiment, the software package may also include a floor plan graphics package and an emergency notification software module to link events that display as icons on the floor plan graphics. In at least one embodiment, the database 102 may only be accessible by an authorized administrator and an authorized user. In some embodiments, some aspects of the database 102 are only modifiable by the authorized administrator, including but not limited to user rights, locations, floor plans, and/or an operation mode of the system, for example. The database 102 may be communicably coupled to a central server (shown generally at 104), and the database 102 may be accessible by at least an administrative work station 106 and a remote device 108, in some embodiments. In some embodiments, the remote device may be a hard wired device or may be a wireless device including but not limited to mobile phones, laptops, desktops, tablets, RFID readers, and other similar devices. In some embodiments, the remote device 108 may be capable of communicating securely to the database 102 the particular location of the remote device and the crisis status of the particular location. The administrative work station 106 and the remote device 108 may also be communicably coupled to the central server 104. In at least one embodiment, the administrative work station 106 and the remote device 108 are communicably coupled directly or indirectly to the central server via the internet or a local area network. In at least the embodiment show, the system 100 further comprises a controller 110 in communication with the central server 104 and a safety device 112 communicably coupled to the controller 110, the safety device 112 selected from suitable devices including, but not limited to, door access (as shown), speakers, alarms, cameras, lights, locks, barriers, sensors, fire sprinkler systems, and public address systems.

Figure 3:
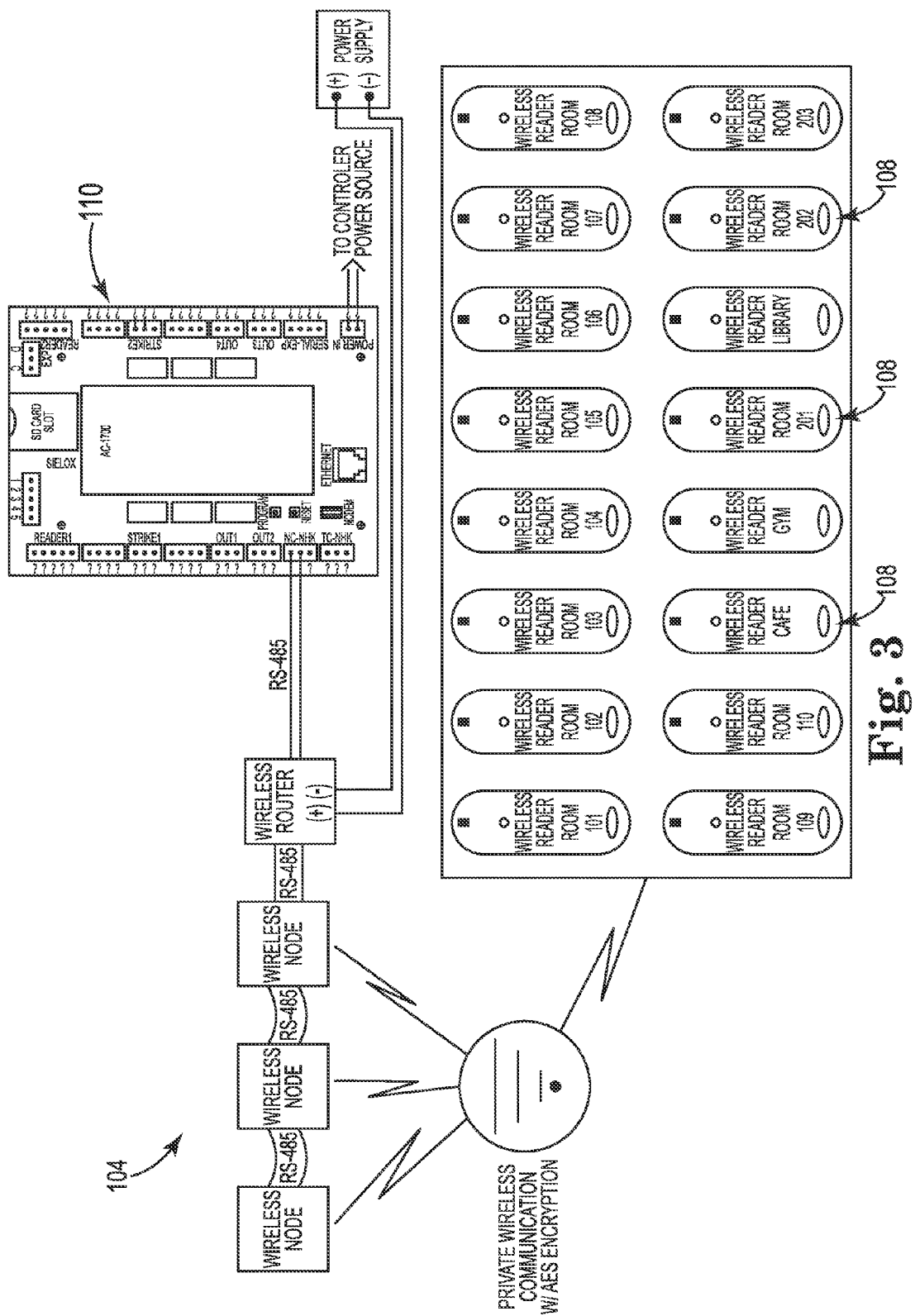
Figure 4:
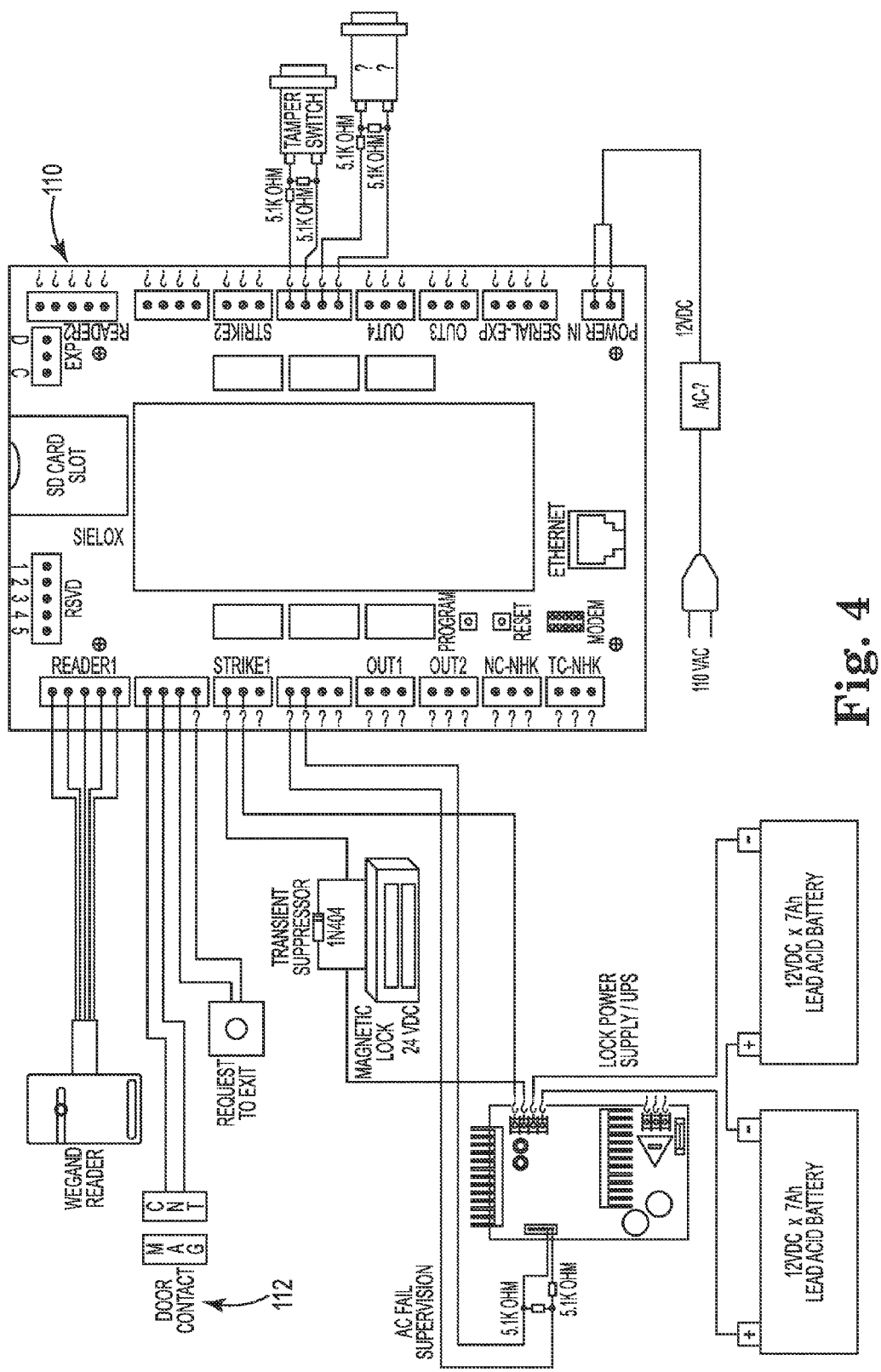

In at least one embodiment, the administrative work station 104 is accessible only by an authorized administrator, as described above, such as a principal, first responder, or other authorized security personnel. In at least one embodiment, the database 102 is accessible and modifiable by the authorized administrator at the administrative work station. In at least one embodiment 108, the remote device is accessible only by an authorized user, as described above, such as a teacher or other authorized personnel. In at least one embodiment, the authorized user selects an indicator via the remote device 108 corresponding to the crisis status of the location, which is communicated to the database 102. The database 102 may send a signal to the controller 110 to activate or deactivate the safety device depending on one or more selected indicators relative to the location. For example, one or more selected indicators indicate a crisis in a nearby hallway, the controller 110 may be programmed to activate one or more door locks 112. FIGS. 3-4 show electrical schematics for embodiments for controllers 110, where the is communicably coupled to the remote device 108 either directly or indirectly (as shown in FIG. 3) and the controller is communicably or electrically coupled to a safety device 112 (as shown in FIG. 4).

FIG. 2 shows another exemplary embodiment of an emergency notification system 200 of the present invention. As shown, the system comprises a central server (shown generally at 206); an administrative work station 204 communicably coupled to the central server; a database 202 communicably coupled to the central server and accessible by at least the administrative work station 204; and a plurality of remote devices 208. In at least the embodiment shown, the administrative work station 204 is remotely coupled to the server via the internet. Each remote device 208 may be communicably coupled to the central server, and the remote device may be capable of communicating securely to the database 202 the particular location of the remote device and the crisis status of the particular location. In at least one embodiment, the remote device 208 is either hard wired or wirelessly connected, as shown in FIG. 2. In at least the embodiment show, the system 200 further comprises a controller 210 in communication with the central server and a safety device 212.

The electronic means of communicating the room status to the database may be provided in one embodiment using a hard wired remote device 108. The hard wired remote device 108 may be installed in at least one room and have, for example, one or more color-coded buttons. The authorized user of the remote device 108, such as a teacher or staff member, may have the ability to push the appropriate color button which sends a signal in real time of the room status to the database 106 to update the status in the database 106, which may update information accessible by the user interface to either an authorized administrator or the authorized user. In other embodiments, the electronic means of communicating the room status to the database 106 can be a wireless remote device 108. In another embodiment, each authorized user in a classroom with a computer on the network or access from the internet can communicate the status of the room to the database 108 by selecting a particular color coded button, another particular visual indicia, a status from a drop down menu, or other suitable visual indicia or can communicate the status via text or chat message, for example. In one embodiment, the user can place color coded buttons on the desktop of a remote device that may mimic the color coded cards of the prior art system, and in an emergency, the authorized user selects the appropriate colored desk top button which sends a signal of the room status and in at least one embodiment provides feedback to the authorized user that the message was sent.

In still another embodiment, the system may include installing wireless RFID readers 108 in a designated location in each class room. Each classroom may be assigned at least one or more color coded RFID cards, for example. The RFID cards may be programmed with the status associated for each color coded card; for example, red may indicate an emergency crisis situation, blue may indicate a medical emergency situation, while green may indicate a normal status. When a color coded card is presented to the reader, a signal related to the room status may be sent in real time via the remote device to update the database, and in particular may update a floor plan accessible by the authorized administrator, authorized user, or a responder to reflect a particular status for the class room. In other embodiments, at least one quick response code ("QR code") may be displayed in each desired location, for example on a wall, on or near the door, on the door frame, or on the teacher's desk. In other embodiments, the teacher may have a document with a plurality of QR codes, each QR code identifying particular information for communication to the authorized administrator. In some embodiments, the QR code may identify the particular location or a particular crisis status of the particular location, such as a security emergency, a medical emergency or an "all clear" status, for example. The authorized user can use the remote device to scan the QR code to identify the particular location of the authorized user and/ or to send a signal to the database to relay the crisis status of the particular location. In some embodiments, the QR code may identify a login for the authorized user to scan to authenticate the user in the system. In at least one embodiment, the remote device can be the authorized user's mobile phone, tablet, laptop or other remote device capable of scanning the QR code and sending a signal to the database.

A school, for example, can choose to deploy one of the above described embodiments in each room for an emergency notification system or deploy more than one of the above described embodiments for a redundant means of initiating a status signal from each room.

In some embodiments, one or more aspects of the present disclosure may be accessible from one or more different types of devices. For example, in one embodiment, the floor plan graphics component of the present disclosure may be interactively accessible to an authorized, and in some cases a pre-authorized user via the user's and/or school's laptop device, desk top device, PDA, or other mobile device, including tablet, cell phone or other device, any of which may be accessed via a land line, Wi-Fi connectivity, wireless connectivity, or any other means of connectivity. In some embodiments, a user may register with the system and receive registration information which the user may use to enable their personal device(s) to have access to the approved components of the system of the present disclosure. Such registration may occur when the member of the institution and/or the device is first introduced to the institution, for example. In some cases, the school or institution may require staff and/or students, for example, to have their own personal devices configured to allow interactive communication with the one or more designated aspects of the system. It will be appreciated by those skilled in the art that there are a number of ways, all of which are within the scope of the present invention, to provide one or more functionalities to one or more devices including institution-owned devices and/or devices owned by a member of the institution, for example students and/or teachers.

In some cases, the system may be configured to permit remote log-in, such as by using a mobile phone, laptop or desktop from a location, for example that is remote from the school or institution. In this way, a teacher for example, may have the ability to "check-in" or "check-out" at night from the system and/or check the status of the school when they are at home or otherwise away from the school. Further, the remote log-in feature may also allow the system to be updated with important information, such as the teacher's schedule for the upcoming week, the fact that a teacher has taken her class to the playground, or that one or more students has returned from a field trip, for example. The school can also grant login rights to the system and early responders to enable the viewing of the floor plan graphics with the status icons on laptops or tablet devices, for example.

Figure 5:
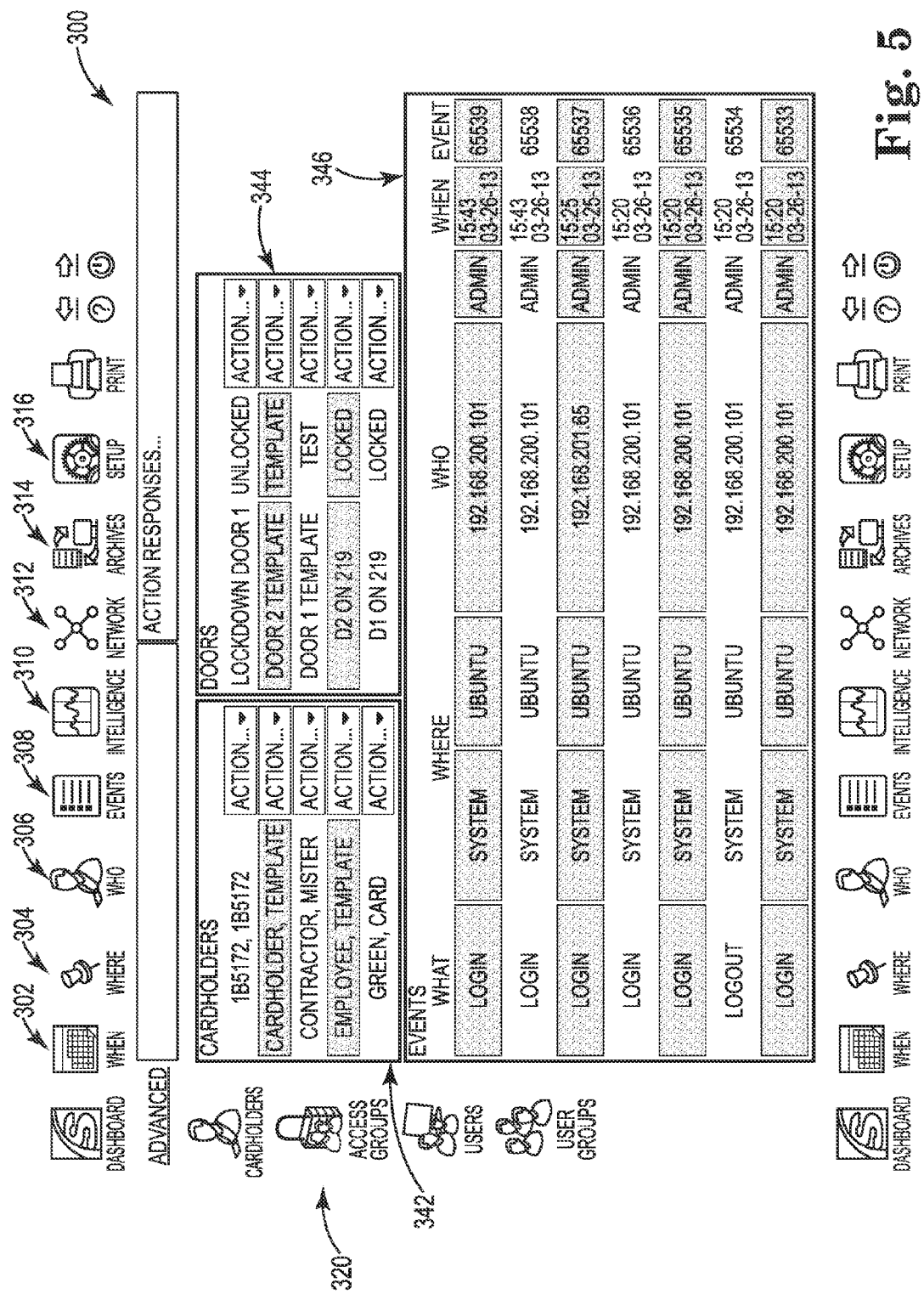
Figure 56:
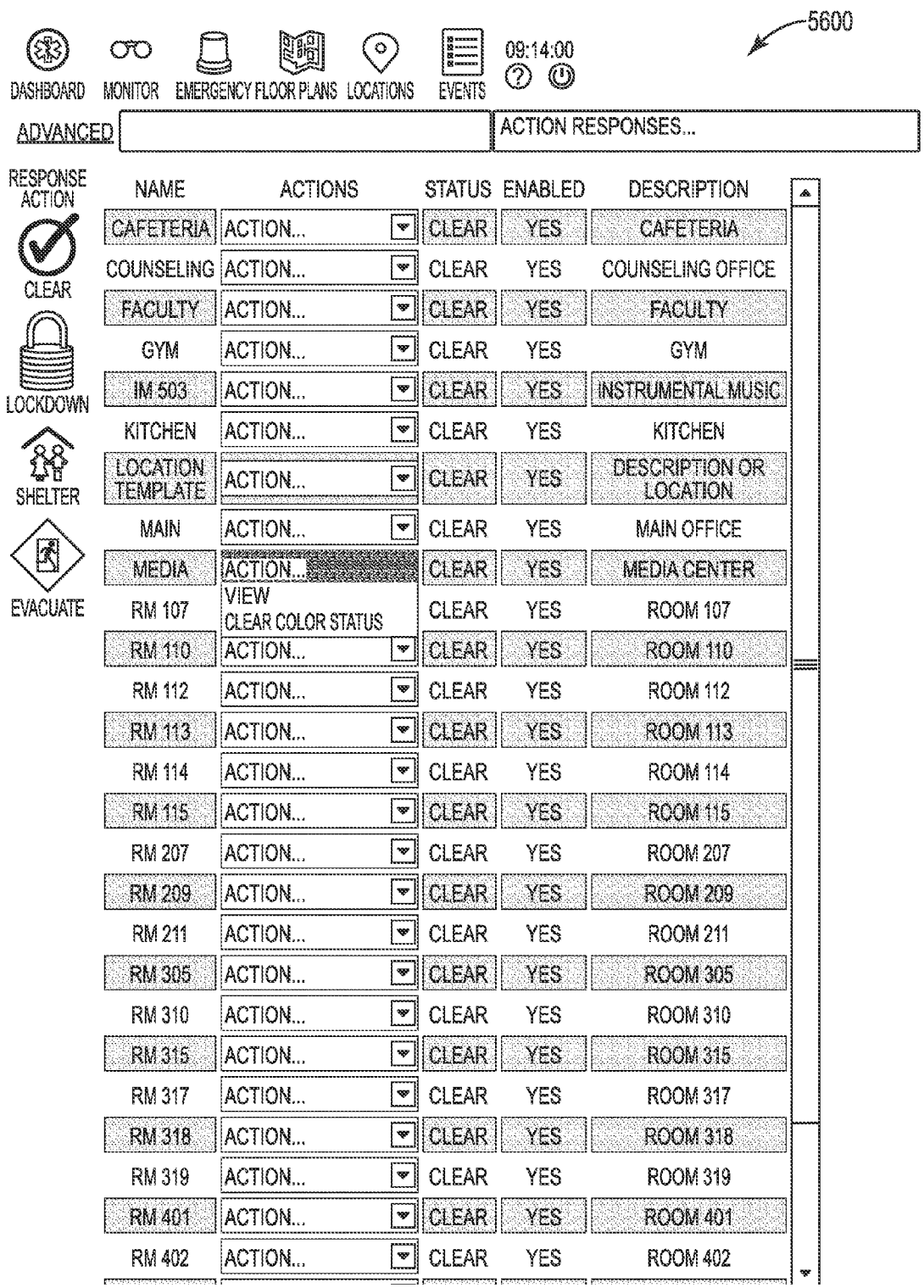
FIG. 56 is a screenshot from an embodiment of a responder interface for the database of an embodiment of the invention relating to locations, according to some embodiments of the present disclosure.

The database 102 has a user interface, exemplary embodiments of which are shown in FIGS. 5-56. The database 102 may be accessible by one or more authorized administrators and authorized users. In some embodiments, an authorized administrator and/or an authorized user must login to the database using a secure login. The secure login may require the entry of a password, biometrics, or other acceptable security information to authenticate the user. The database 102 has a plurality of functions, inputs, and outputs which may be combined in any combination. The figures and disclosure below discuss exemplary embodiments of the database, its user interface, and its functions, but other possibilities are contemplated and within the spirit and scope of the present disclosure, including various combinations of particular functions and elements disclosed below.

In some embodiments, the database comprises a software package, which may be Sielox Pinnacle® software, but other software programs are possible and within the spirit and scope of the present disclosure. In at least one embodiment, the software package may also include a floor plan graphics package and an emergency notification software module to link events that display as icons on the floor plan graphics. In some embodiments, the icons may be color coded to indicate a particular security level, for example. For example, in some embodiments color may be used to indicate one or more status levels as follows: green may indicate the status as normal; yellow may indicate that a problem is occurring, but is not severe; red may indicate a serious problem; blue may indicate medical attention is needed; and white may indicate that no response has been received from a room or area, yet. Still other status levels and color codes are possible and within the scope of the invention. In other embodiments, the icons themselves may be different and may indicate a particular security level, for example, an icon may say "ok," "danger," or "in progress" to indicate what may be happening in a given room or area. Still other possibilities are within the scope of the present disclosure. For example, a numbering system may be used, or some combination of colors, words, pictures, and/or numbers may be used to indicate the status of a room or area. Instant notification and real time updates may display on the floor plan graphics screen at all designated workstations enabling the staff or first responders to see a real time status of the facility. In addition, in some embodiments, these same events can trigger pop-up messages viewable by the authorized user or administrator that provide text or other visual indicia indicating the room status condition as well as instructions on how to respond. In some embodiments, the system may include additional configurable icons for use with other events as desired or identified by the user. For example, one or more icons may be used to indicate a medical situation. An icon could be used to indicate that one or more students in a classroom have gotten in a fight, etc. The configurable icons may also include a space for labeling the icon to state the purpose of the icon. In some cases, these other "non-emergency" icons could be distinguished from emergency icons by the intensity of the color of the icon, for example, or placement of the icons, in other cases. It will be appreciated that the icon(s) may have any desired shape, color, or configuration to enhance the intuitive use of the system and/or enhance the aesthetic appeal of the system, for example.

FIG. 5 shows an exemplary embodiment of a user interface or dashboard 300 for the database 102, although other embodiments of the user interface are contemplated by this invention. The user interface 300 may include one or more of the following features (as shown in FIG. 5): scheduling information such as management of time zones and holidays (shown generally at 302); information on the remote devices, controllers, and safety devices (shown generally at 304); information on the authorized users and personnel with access cards (shown generally at 306); information on the most recent events (shown generally at 308); information on filters and triggers (shown generally at 310); network information (shown generally at 312); archives (shown generally at 314); setup features and protocols (shown generally at 316); and other general features. In at least one embodiment, the database 102 allows the user to print screen views, reports, and other options from the database. In at least one embodiment, lists of cardholders, groups of cardholders, users, and groups of users are available (shown generally at 320). In at least one embodiment, the database interface 102 provides information along with drop-down menus or other means of selecting particular action items. As shown in FIG. 5, these include information regarding cardholders with a drop-down menu or other means of selecting particular action items. In at least one embodiment, the database interface for the authorized administrator includes a list of cardholders and the ability to select an action such as enable, disable, edit and copy the cardholder (shown generally at 342 in FIG. 5). The database interface for the authorized administrator may include a list of doors or other safety devices and location-based identifiers and the ability to select an applicable action such as lock, unlock, on, off, edit, delete, and copy (shown generally at 344 in FIG. 5); and a list of events (including the location and time of the event). The database interface for the authorized administrator may include a list of the most recent events and information regarding those events (shown generally at 346 in FIG. 5), such as the nature of the event (e.g. unlocking or opening a door, logging into a system, entering a secured area, changing the status of an area), the location of the event (and may include a broad description of what type of location the event occurred and the specific location where the event took place), identification of the authorized administrator or the authorized user or access cardholder who initiated or reported the event (who in some embodiments may be identified by an identification number, username, full name, and role or combinations thereof), the date and time of the event, and a numeric or alphanumeric identifier for the event. In at least one embodiment, each event is assigned a unique identifier for tracking purposes, reports, analysis, and archive information.

Figure 6:
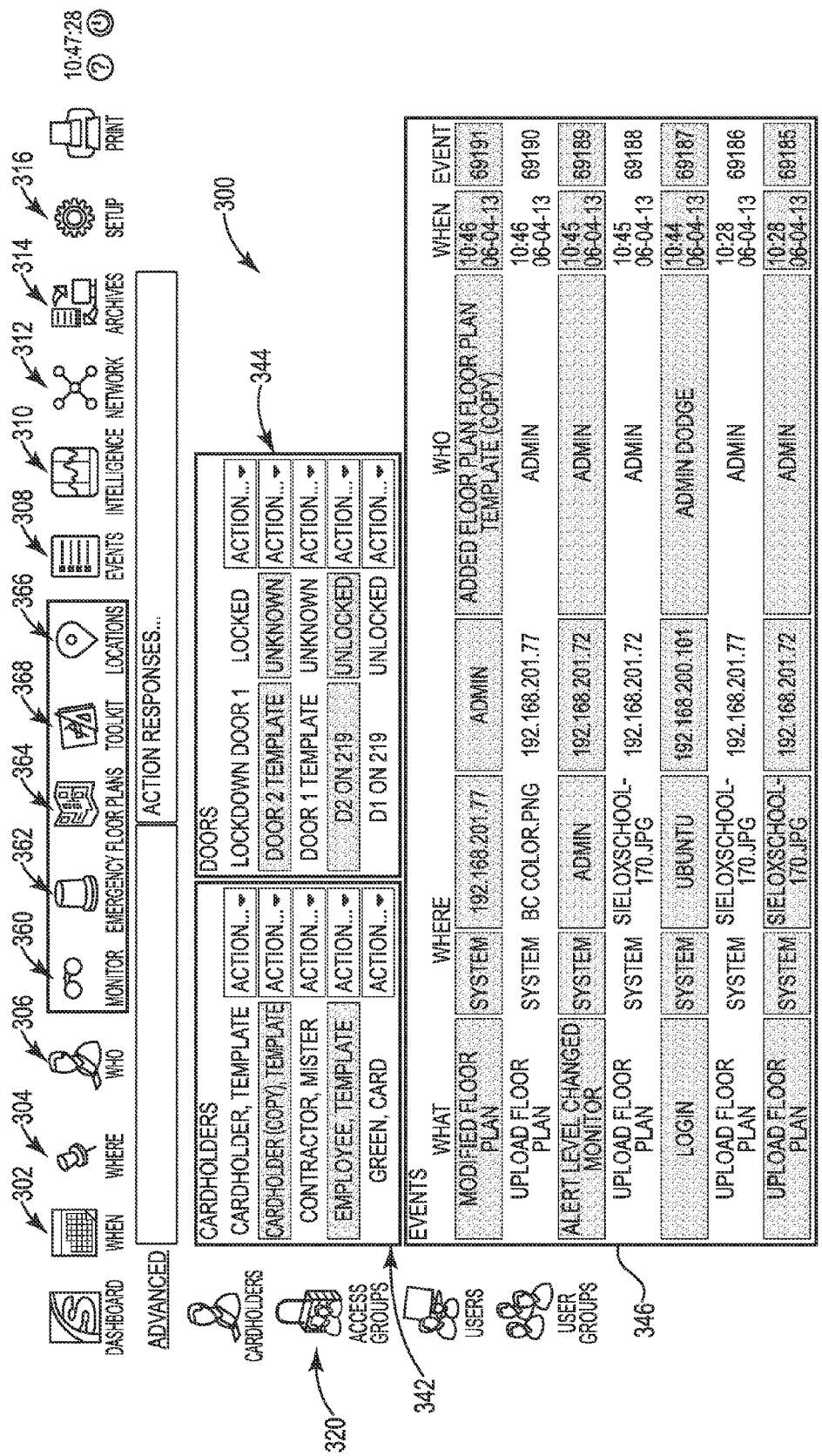

In at least one embodiment, as shown in FIG. 6, the user interface 300 further comprises one or more of the following features: an icon 360 which if selected, allows the administrator to set the system to the standard, monitor state; an icon 362 which if selected that allows the administrator to set the system to the emergency state; the ability to add, view, and modify floor plans (shown generally at 364); the ability to add, view and modify locations (shown generally at 366). In at least one embodiment, the system also features a toolkit 368 that allows the authorized user to manipulate locations within floor plans. In at least one embodiment, the database interface includes a search feature, which allows the authorized administrator to limit information based on defined filters, particular events, particular cardholders or users, and a particular date range. For example, an authorized administrator may want to search for all events that were reported in the past year that were medical emergencies.

Figure 7:
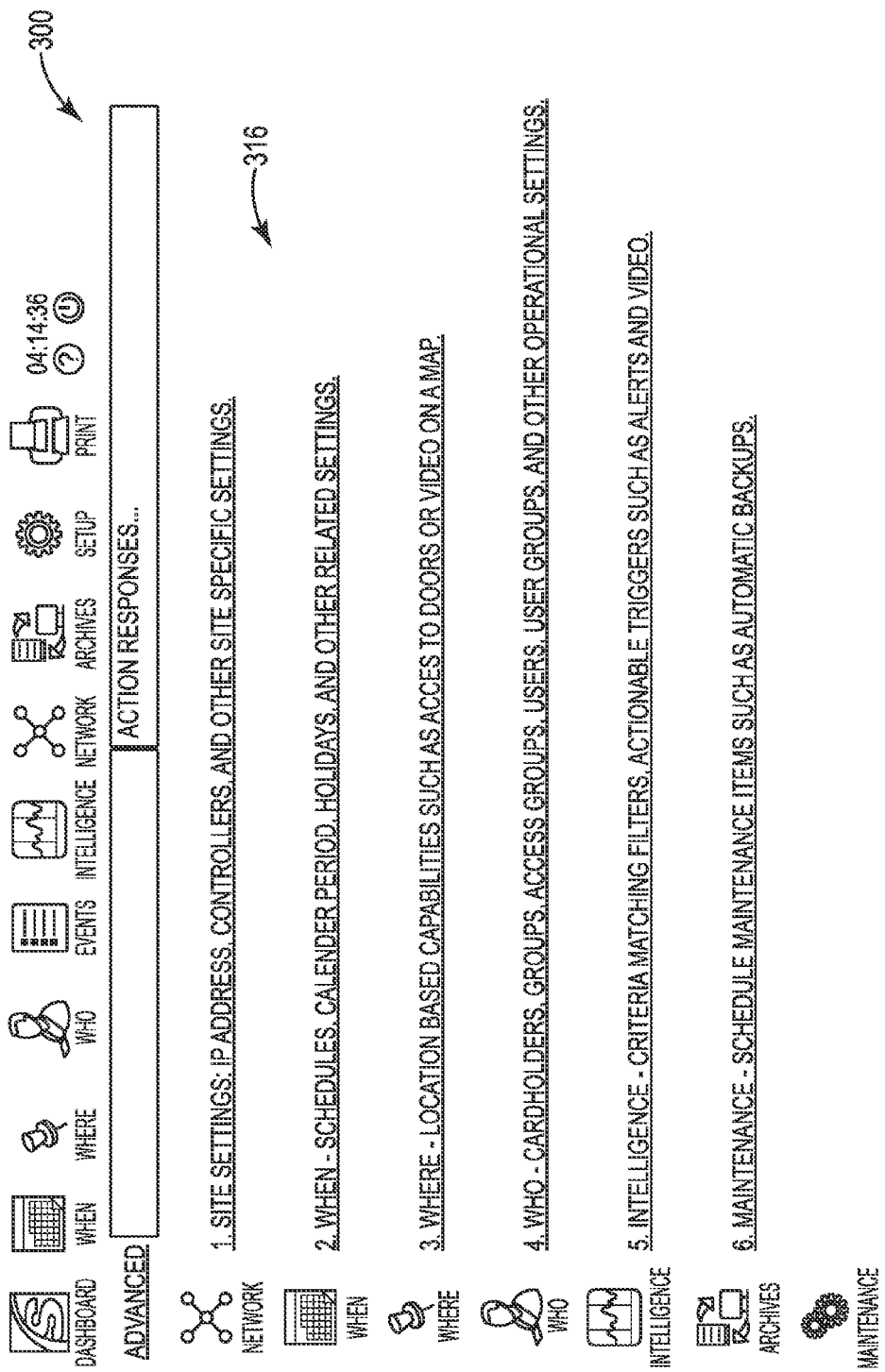

In at least one embodiment, the database 102 is modifiable by an authorized administrator via a "setup" feature shown generally at 316 in FIG. 5. In at least one embodiment, as shown in FIG. 7, the database includes at least one of the following categories of information which may be modified: site settings (e.g. IP addresses, controllers and other site specific settings), scheduling (e.g. calendars, holidays, daily schedules and other timing settings), location based capabilities (e.g. access to doors or video on a map); authorized administrators and users (e.g. lists of cardholders, groups, access groups, users, user groups); intelligence (e.g. criteria matching filters, actionable triggers such as alerts and video); maintenance settings (e.g. automatic backups).

Figure 8:
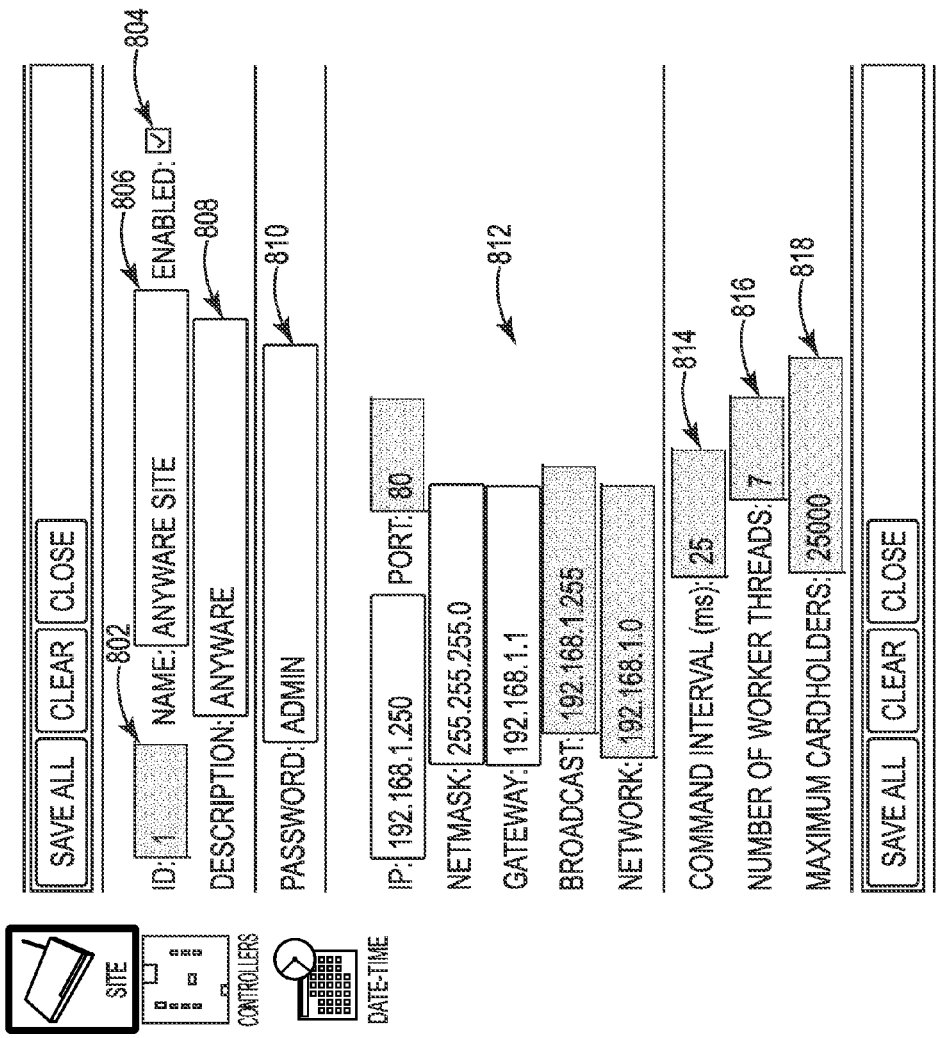
FIG. 8 is a screenshot from an embodiment of an authorized administrator interface for the database of an embodiment of the invention relating to the function of modifying, adding, or editing the overall site settings, according to some embodiments of the present disclosure.

As shown in FIG. 8, at least one of the overall site settings (such as a reference name, the IP address or other network settings, the command interval, and the maximum number of cardholders with access) can be modified by an authorized administrator. In some embodiments, the site setting may be given an identifier in an ID field 802, which may be automatically populated by the system. In at least one embodiment, the authorized administrator may enable or disable a site setting (as shown generally at 804). In some embodiments, the authorized administrator may enter or edit the site settings' name (shown generally at 806); may enter or edit a brief description in order to quickly identify the site setting (shown generally at 808); may create or edit a password for the site setting (shown generally at 810); may edit network identifiers including, for example, an IP address (shown generally at 812); may enter or edit a command interval (shown generally at 814); may enter or edit a number of worker threads (shown generally at 816); and/or may enter or edit a maximum number of access cardholders for the site (shown generally at 818).

Figure 9:
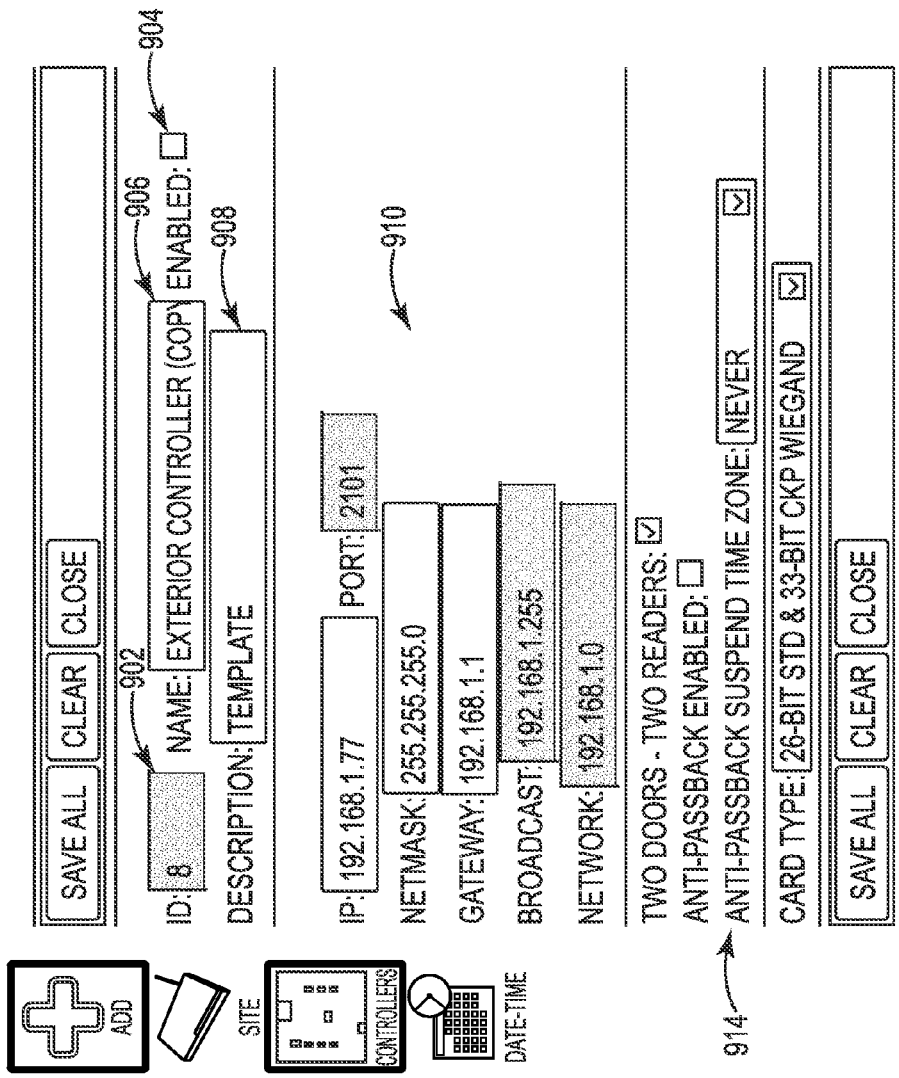
FIG. 9 is a screenshot from an embodiment of an authorized administrator interface for the database of an embodiment of the invention relating to the function of modifying, adding, or editing the controller settings, according to some embodiments of the present disclosure.

As shown in FIG. 9, at least one of the controller settings (such as an identification number or name, a description, card information, and the IP address or other network settings, particular features of the controller such as two doors—two readers, anti-passback features) can be modified by an authorized administrator, in some embodiments. In some embodiments, the controller setting may be given an identifier in an ID field 902, which may be automatically populated by the system. In at least one embodiment, the authorized administrator may enable or disable a controller setting (as shown generally at 904). In some embodiments, the authorized administrator may enter or edit the controller settings' name (shown generally at 906); may enter or edit a brief description in order to quickly identify the site setting (shown generally at 908); may edit network identifiers including, for example, an IP address (shown generally at 910); and/or may select particular features about the controller (shown generally at 914) including, but not limited to, whether the controller is related to two doors and two access code, whether anti-passback is enabled, whether anti-passback has a time zone, and/or a particular card type for the controller.

Figure 10:
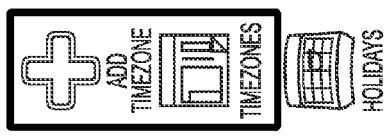
FIG. 10 is a screenshot from an embodiment of an authorized administrator interface for the database of an embodiment of the invention showing a list of schedules, according to some embodiments of the present disclosure.

As shown in FIG. 10, settings for schedules may be set, such as settings for standard operating hours, weekend hours, holiday hours, scheduled test procedures, and other schedule-related settings. FIG. 10 shows a list of schedules 1000 viewable by an authorized administrator. The list may in some embodiments display for each schedule the name (shown generally at 1002), the status (shown generally at 1004), whether the schedule is enabled (shown generally at 1006), a description of the schedule (shown generally at 1008), and the time interval (shown generally at 1010). In some embodiments, the authorized administrator may make modifications to the schedule to add, edit, or delete the schedule and as shown in FIG. 10, may do so by selecting the action from a drop down menu for each schedule (shown generally at 1012).

In at least one embodiment as shown in FIG. 11, particular schedule related settings can be determined by selecting the particular day of the week and the start-stop time interval of the setting. In some embodiments, the schedule related setting may be given an identifier in an ID field 1102, which may be automatically populated by the system. In at least one embodiment, the authorized administrator may enable or disable the schedule related setting (as shown generally at 1104). In some embodiments, the authorized administrator may enter or edit the schedule related settings' name (shown generally at 1106); may enter or edit a brief description in order to quickly identify the schedule related setting (shown generally at 1108); and may select one or more time intervals by selecting particular dates of the week (Monday-Sunday), "holidays" as defined herein, a start time, and a stop time (shown generally at 1110).

Figure 12:
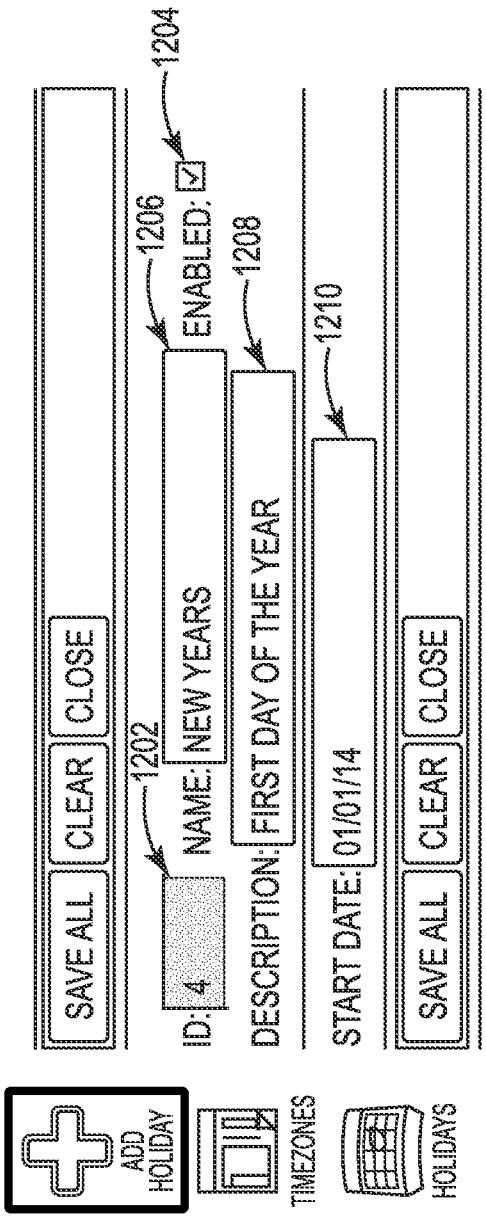
FIG. 12 is a screenshot from an embodiment of an authorized administrator interface for the database of an embodiment of the invention relating to the function of modifying, adding, or editing the holidays, according to some embodiments of the present disclosure.

As shown in FIG. 12, holiday settings (or settings for a specific date) may be determined and/or modified by an authorized administrator. In some embodiments, the schedule related setting may be given an identifier in an ID field 1202, which may be automatically populated by the system. In at least one embodiment, the authorized administrator may enable or disable the holiday (as shown generally at 1204). In some embodiments, the authorized administrator may enter or edit the holiday's name (shown generally at 1206); may enter or edit a brief description in order to quickly identify the holiday (shown generally at 1208); and may select the specific date or dates that define the holiday (shown generally at 1210).

Time zones and holidays may be added or edited by an authorized administrator, in some embodiments. In at least one embodiment, the system employs a network time protocol (NTP) to synchronize time between at least one of the administrative work station, the central server, the database, and the remote device. The protocol may use the user datagram protocol (UDP). In some embodiments, the NTP provides coordinated universal time including scheduled leap second adjustments. Information about time zones or daylight saving time may or may not be automatically transmitted and in some cases must be obtained separately. The NTP may use Marzullo's algorithm or other algorithms and is designed to resist the effects of variable latency. In at least one embodiment, the NTP maintains time within tens of milliseconds over the internet, and in at least one embodiment, the NTP can achieve 1 millisecond accuracy in local area networks under ideal conditions. Other methods of synchronizing time within the system may be utilized.

Figure 13:
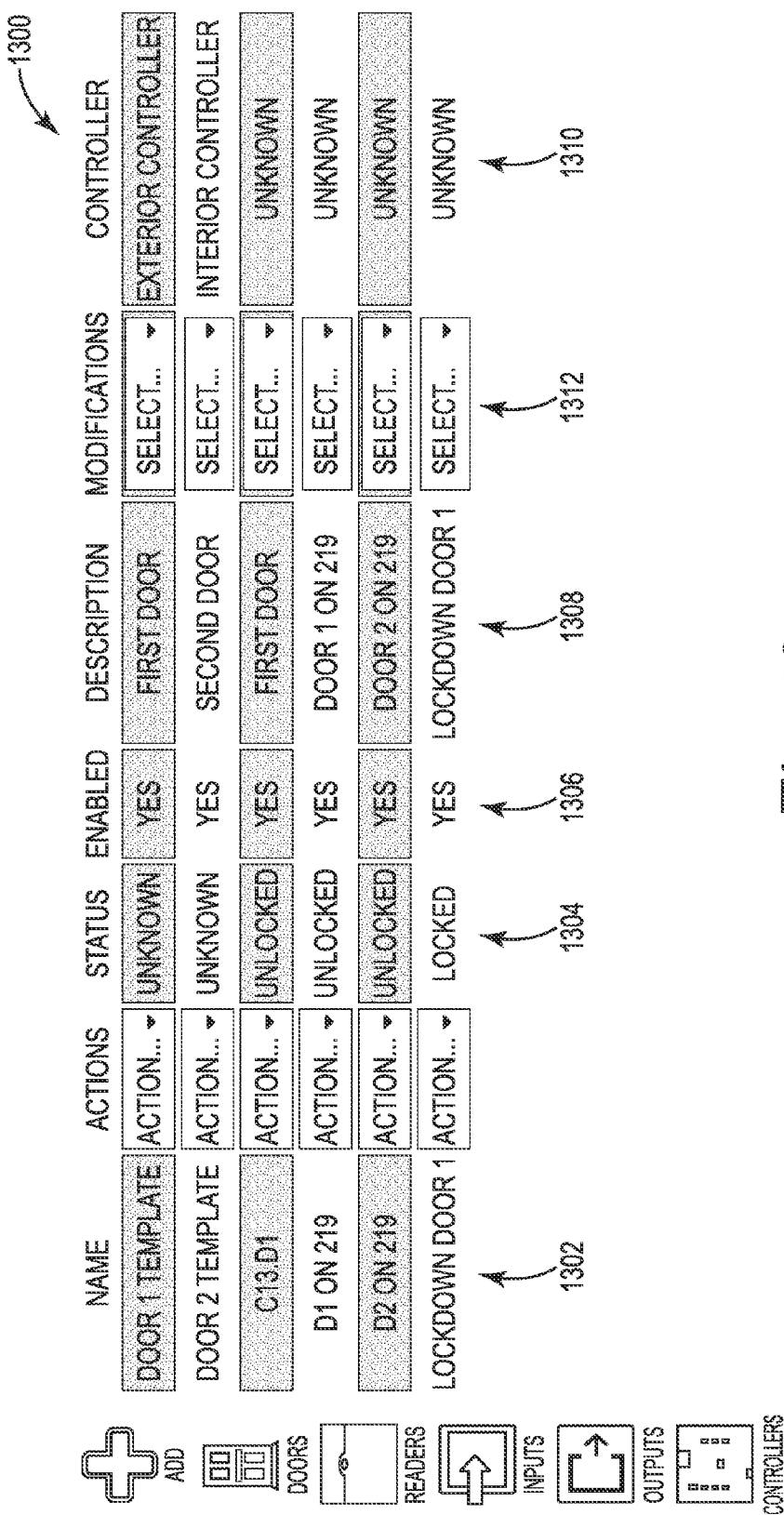
FIG. 13 is a screenshot from an embodiment of an authorized administrator interface for the database of an embodiment of the invention relating to the function of listing, modifying, adding, or editing the particular location-based identifiers, according to some embodiments of the present disclosure.

In at least one embodiment as shown in FIG. 13, an authorized administrator can store information relating to location-based identifiers such as particular doors, remote devices, controllers and input/output information. In some embodiments, the stored information may be viewed in a list 1300. The authorized user may view the location-based identifiers by name (as shown at 1302). In at least one embodiment, the authorized administrator can view the status of the location-based identifiers, such as locked, unlocked, or unknown; (as shown at 1304) whether the particular device is enabled (as shown at 1306); a description of the device (as shown at 1308); and/or if applicable, a particular controller related to the device (as shown at 1310). In at least one embodiment, the authorized administrator can view and modify settings (as shown at 1312) related to a particular door, such as an identification number, name, description, type of controller, activation time, held open time, whether the door switch is supervised, whether the switch is normally closed, whether a forced event causes an alarm, whether if the door is open causes an alarm, whether particular events related to the door are reported. In some embodiments, as shown in FIG. 13, the authorized administrator can select a particular modification action from a drop-down menu or other similar graphical user interface icon (as shown at 1312). In at least one embodiment, the authorized administrator can view and modify settings related to a particular remote device, such as an identification number, name, description, type of remote device, false counts, anti-passback direction, whether valid codes and/or invalid codes are reported.

Figure 14:
FIG. 14 is a screenshot from an embodiment of an authorized administrator interface for the database of an embodiment of the invention relating to the function of listing, modifying, adding, or editing the particular cardholders, according to some embodiments of the present disclosure.

In at least one embodiment, the authorized administrator can add cardholders; import a list of cardholders; view and/or modify a list of cardholders; setup, modify and/or view access groups; add authorized users; view and/or modify a list of authorized users; setup, modify and/or view user groups. As shown in FIG. 14, a list of cardholders 1400 may be viewable by an authorized administrator. The list of cardholders may comprise one or more of the following: a first and last name of the cardholder (as shown generally at 1402), an access group for the cardholder (as shown generally at 1404), and/or a card code (shown generally at 1406). In some embodiments, as shown in FIG. 13, the authorized administrator can select a particular modification action from a drop-down menu or other similar graphical user interface icon (as shown at 1408).

Figure 15:
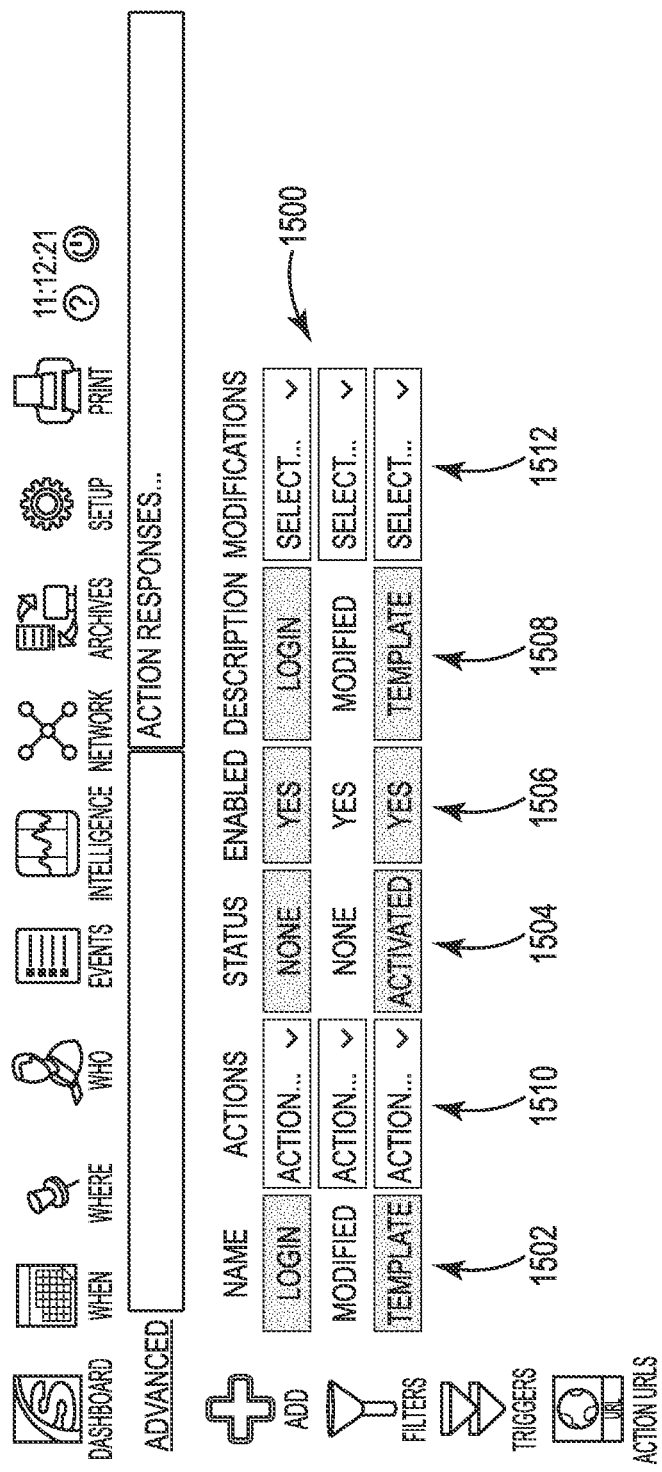
FIG. 15 is a screenshot from an embodiment of an authorized administrator interface for the database of an embodiment of the invention showing a list of filters and/or triggers, according to some embodiments of the present disclosure.

As shown in FIG. 15, the authorized administrator can view, add, or edit event filters which pair events (such as crisis situations, fires, medical emergencies, or missing persons) with devices and cardholders in accordance with some embodiments of the present invention. The authorized administrator can also view, add, or edit triggers and action uniform resource locators (URLs). In at least one embodiment, the authorized administrator may access database archives and may print information from the database. In some embodiments, the filters and/or triggers can be listed, as shown in FIG. 15. The list of filters and/or triggers 1500 may comprise one or more of the following: a name of the filter and/or trigger (as shown generally at 1502), a status of the filter and/or trigger (as shown generally at 1504), whether the filter and/or trigger is enabled (as shown generally at 1506), and/or a description of the filter and/or trigger (as shown generally at 1508). In some embodiments, as shown in FIG. 15, the authorized administrator can select a particular action from a drop-down menu or other similar graphical user interface icon (as shown at 1510). In some embodiments, as shown in FIG. 15, the authorized administrator can select a particular modification action from a drop-down menu or other similar graphical user interface icon (as shown at 1512).

Figure 16:
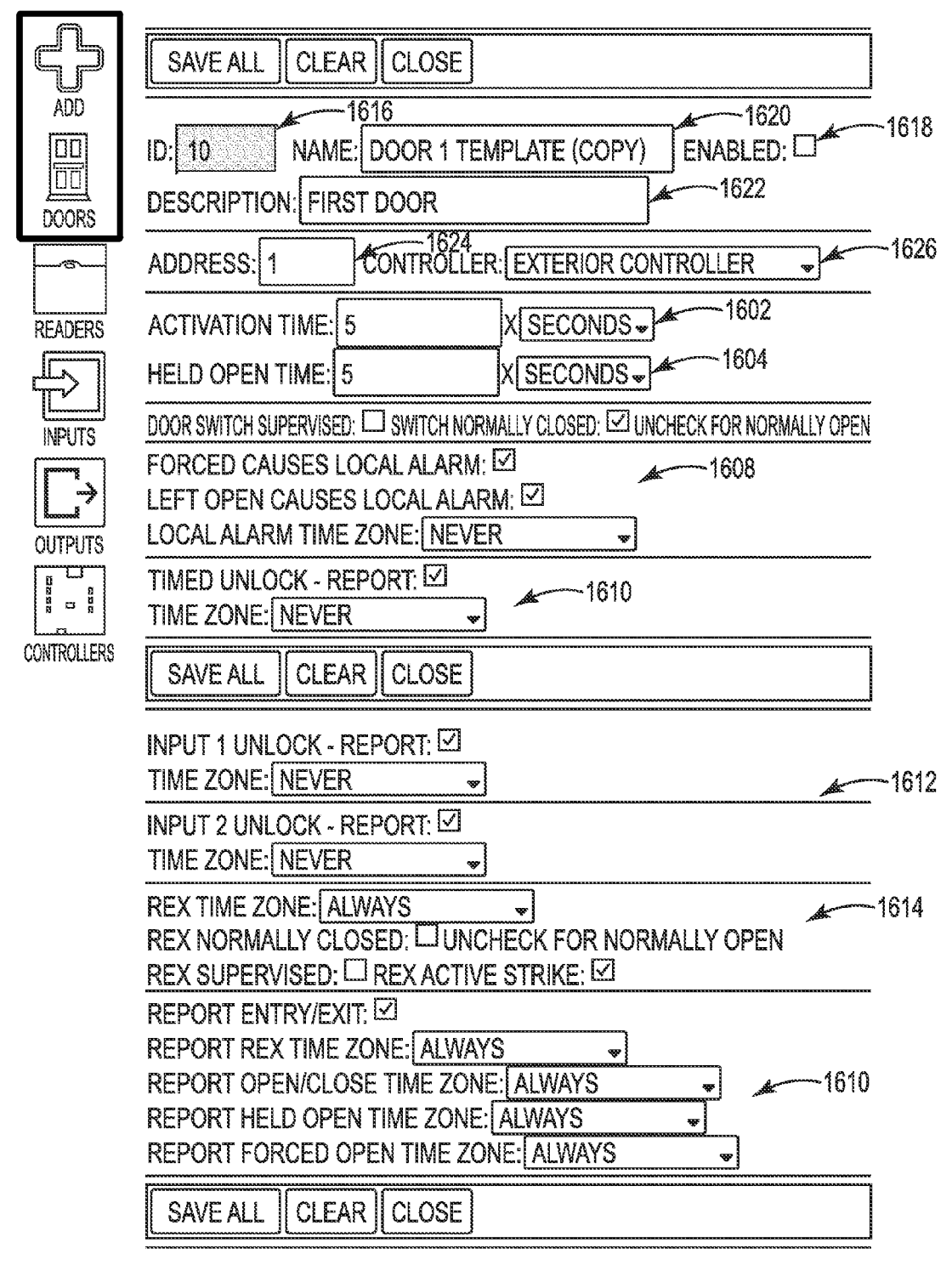

As shown in FIG. 16, the authorized administrator can in some embodiments view, add, or edit settings for particular safety devices 112 (here, doors) and controllers 110, including but not limited to, activation time (as shown at 1602), held open time (as shown at 1604), whether a forced entry causes an alarm (as shown at 1608), whether certain actions are reported such as an unlock (as shown at 1610), schedule when a door is locked or unlocked (as shown at 1612), and/or whether a card is required to open the door to enter or exit (as shown at 1614). In some embodiments, the safety device may be given an identifier in an ID field 1616, which may be automatically populated by the system. In at least one embodiment, the authorized administrator may enable or disable the safety device (as shown generally at 1618). In some embodiments, the authorized administrator may enter or edit the safety device's name (shown generally at 1620); may enter or edit a brief description of the safety device (shown generally at 1622); may identify a particular address for the safety device (shown generally at 1624); and/or may identify a particular controller associated with the safety device (1626).

Figure 17A:
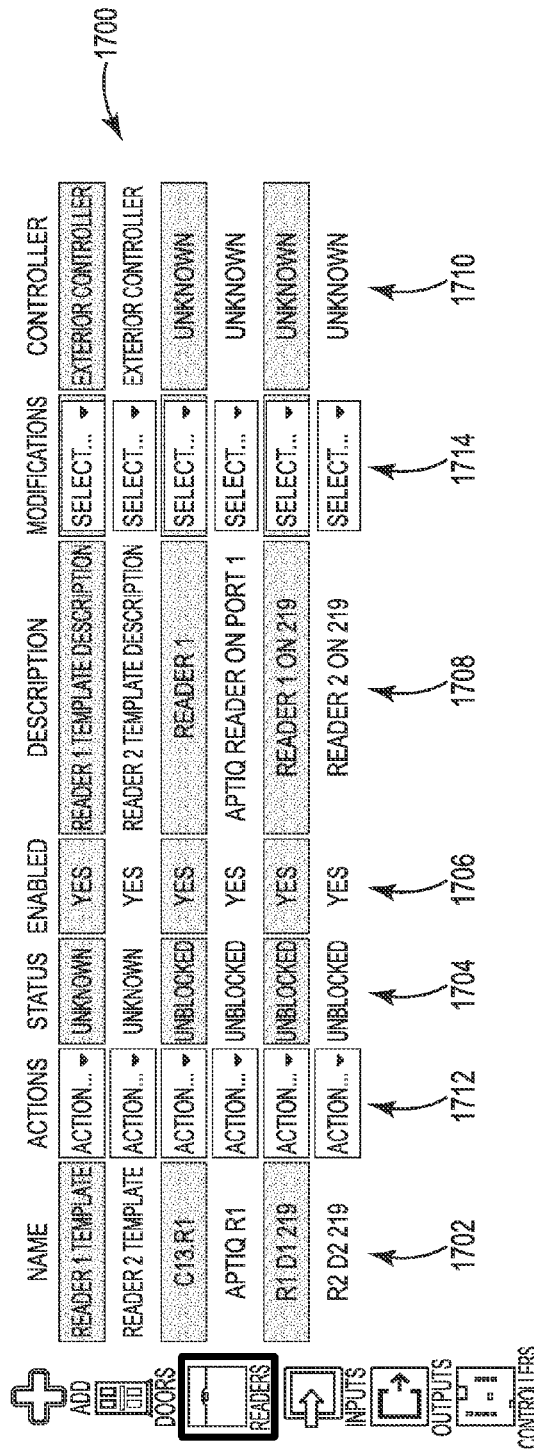
FIG. 17A is a screenshot from an embodiment of an authorized administrator interface for the database of an embodiment of the invention showing a list of remote devices, according to some embodiments of the present disclosure.
Figure 17B:
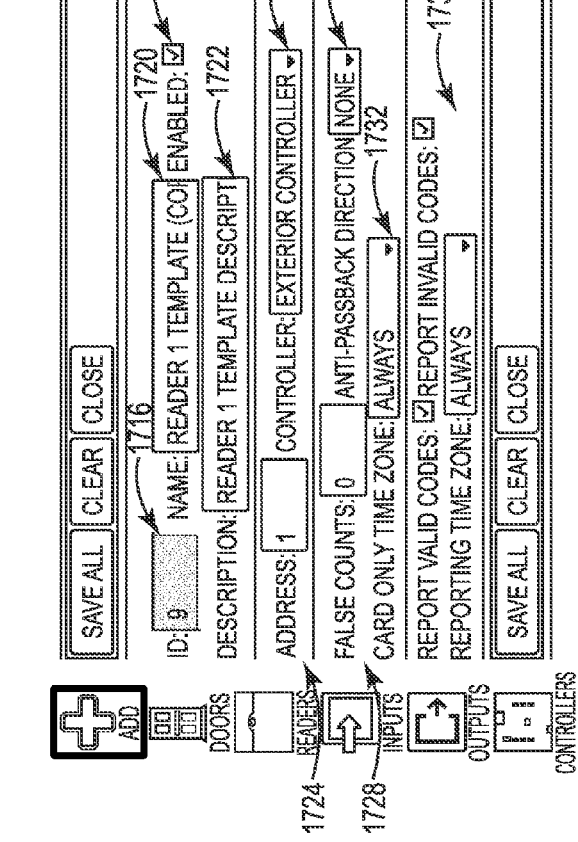
FIG. 17B is a screenshot from an embodiment of an authorized administrator interface for the database of an embodiment of the invention relating to the function of modifying, adding, or editing a remote device, according to some embodiments of the present disclosure.

In at least one embodiment as shown in FIG. 17A-17B, the authorized administrator can view, add, or edit settings for a particular remote device 108, including but not limited to viewing a status of the reader, whether the reader is enabled or not, whether the reader is connected to a controller. In some embodiments, the remote devices 108 can be listed, as shown in FIG. 17A. The list of remote devices 1700 may comprise one or more of the following: a name of the remote device (as shown generally at 1702), a status of the remote device (as shown generally at 1704), whether the remote device is enabled (as shown generally at 1706), a description of the remote device (as shown generally at 1708), and/or information regarding a controller associated with the remote device (as shown generally at 1710). In some embodiments, as shown in FIG. 17A, the authorized administrator can modify the information regarding the remote device by selecting a particular action from a drop-down menu or other similar graphical user interface icon (as shown at 1712). As shown in FIG. 17A, the authorized administrator can select a particular modification action from a drop-down menu or other similar graphical user interface icon (as shown at 1714). As shown in FIG. 17B the safety device may be given an identifier in an ID field 1716, which may be automatically populated by the system. In at least one embodiment, the authorized administrator may enable or disable the safety device (as shown generally at 1718). In some embodiments, the authorized administrator may enter or edit the safety device's name (shown generally at 1720); may enter or edit a brief description of the safety device (shown generally at 1722); may identify a particular address for the safety device (shown generally at 1724); may identify a particular controller associated with the safety device (shown generally at 1726); may identify an acceptable number of false counts (shown generally at 1728); may identify an anti-passback direction (shown generally at 1730); may identify a particular time zone (shown generally at 1732); and/or may identify particular reporting attributes (shown generally at 1734).

Figure 18:
FIG. 18 is a screenshot from an embodiment of an authorized administrator interface for the database of an embodiment of the invention showing a list of authorized users and/or cardholders, according to some embodiments of the present disclosure.

In at least one embodiment, the interface 300 may provide information to the authorized administrator on the authorized users and personnel with access cards (cardholders) as shown in FIG. 18. In at least one embodiment, the authorized administrator can identify cardholders. A cardholder may be any individual with the school, company or organization who possesses an access card. In some embodiments, all authorized users may be cardholders, but not all cardholders may be authorized users of the system. As shown in FIG. 18, the authorized users may be identified by first and last name (shown generally at 1802). As shown in FIG. 18, the authorized users may listed by an access group (shown generally at 1804). As shown in FIG. 18, the authorized user or cardholder may be identified by a particular code identifying the cardholder (shown generally at 1806), which in one embodiment may be embedded in the internal electronic programming of the card and is received and interpreted by the card reader. A second identifier different from the first identifier may be publicly used to identify the card without revealing the first identifier, in some embodiments. As shown in FIG. 18, an authorized administrator may edit, copy or delete the authorized user or cardholder from the list and/or from related access groups.

Figure 19:
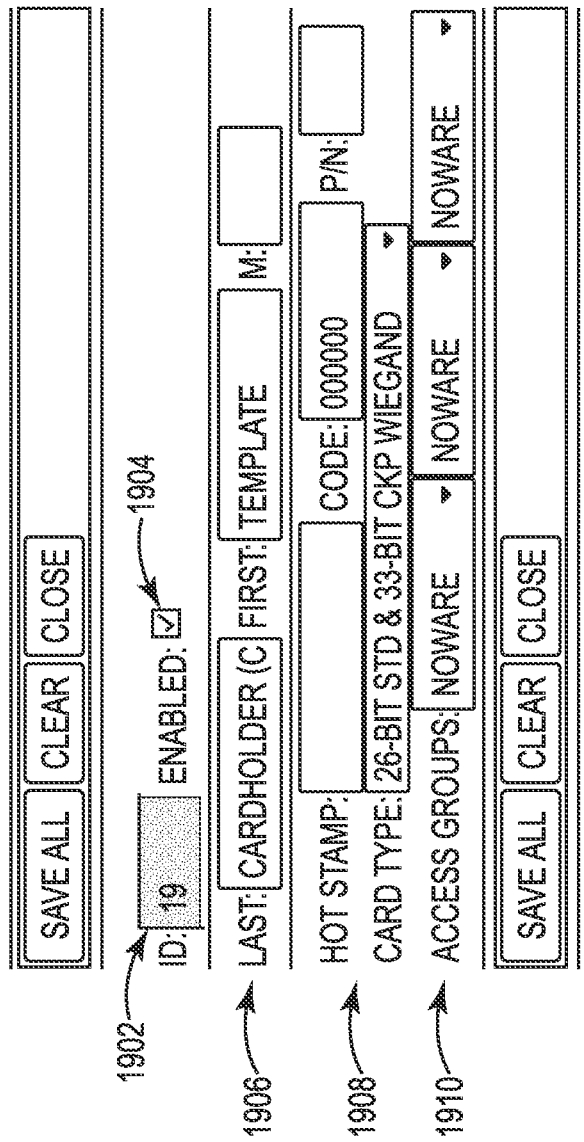
FIG. 19 is a screenshot from an embodiment of an authorized administrator interface for the database of an embodiment of the invention relating to the function of modifying, adding, or editing selected cardholders and/or authorized users, according to some embodiments of the present disclosure.

As shown in FIG. 19, an authorized administrator may add cardholders and edit their information. In at least one embodiment, the system automatically populates the ID field 1902. The authorized administrator may enable or disable a cardholder (as shown generally at 1904). In at least one embodiment, the authorized administrator can enter or edit the cardholder's name (shown generally at 1906). In at least one embodiment, the authorized administrator can enter and edit identifying information relating to the access card assigned to the user or cardholder (shown generally at 1908). In some embodiments, the access card may have at least one unique identifier, such as a card code embedded in the internal electronic programming of the card or a numeric or alphanumeric number imprinted on the outside of the access control card and used to identify the card without revealing the card code. In at least one embodiment, the access card has both an embedded code and the second identifier. In at least one embodiment, the authorized administrator can select a particular access group for the cardholder or authorized user (shown generally at 1910). As shown in FIG. 19, in one embodiment, the authorized administrator can select up to three access groups and in some embodiments can select these groups via a drop-down menu or other suitable method.

The authorized administrator can establish an access group, which is a set of parameters that restricts or grants access to certain areas at certain times to particular cardholders and/or authorized users, according to some embodiments. Thus, the administrator can control when certain types of employees are allowed to be in certain areas, and what areas they are allowed to access. In addition, these controls may be used to allow employees to enter and exit the building at particular times or prevent employees from accessing restricted areas. In at least one embodiment, the authorized user can enable or disable the access group, provide a brief description of the access group for identification purposes, and make modifications, such as editing, copying, or deleting the access group.

Figure 20:
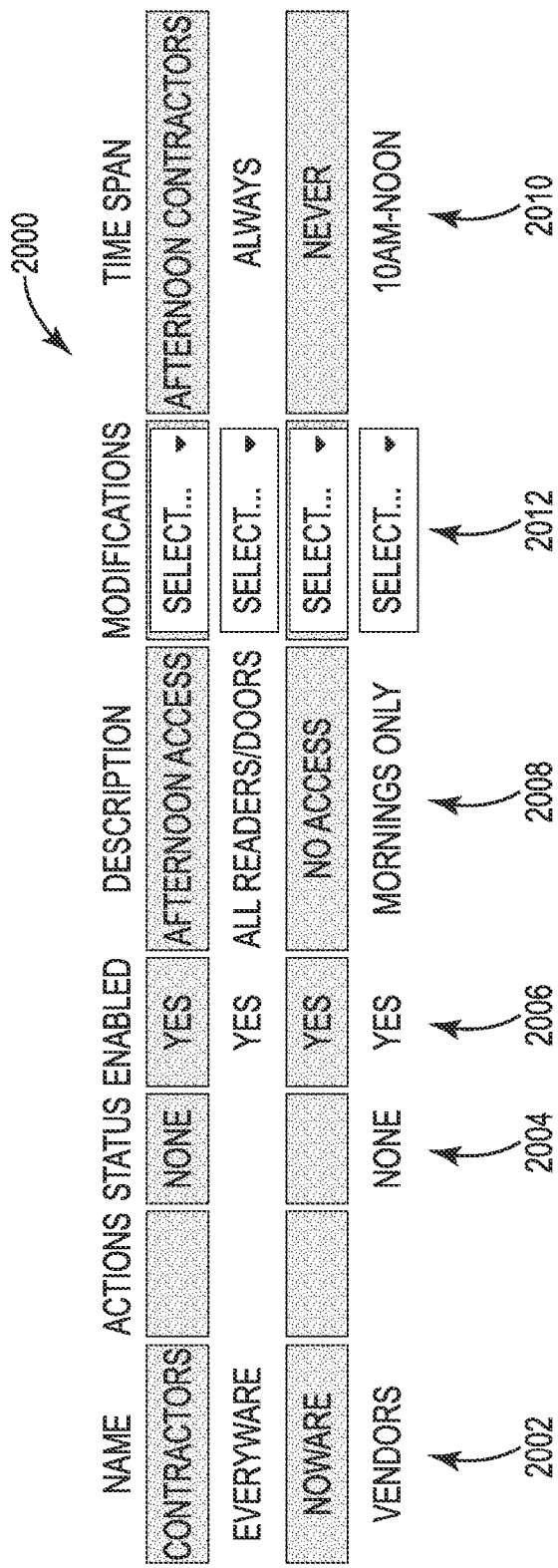
FIG. 20 is a screenshot from an embodiment of an authorized administrator interface for the database of an embodiment of the invention relating to a list of access groups, according to some embodiments of the present disclosure.

As shown in FIG. 20, a list of access groups is viewable by the authorized administrator according to some embodiments. The list of access groups 2000 may provide information such as name (as shown generally at 2002), a status of the access group (as shown generally at 2004) whether the group is enabled or disabled (as shown generally at 2006), a brief description of the access group (as shown generally at 2008), and briefly describes the time frame during which that group may access the area (as shown generally at 2010). In at least the embodiment shown, the authorized administrator can modify each access group by selecting from a drop-down menu to edit, copy or delete the access group (as shown generally at 2012).

Figure 21:
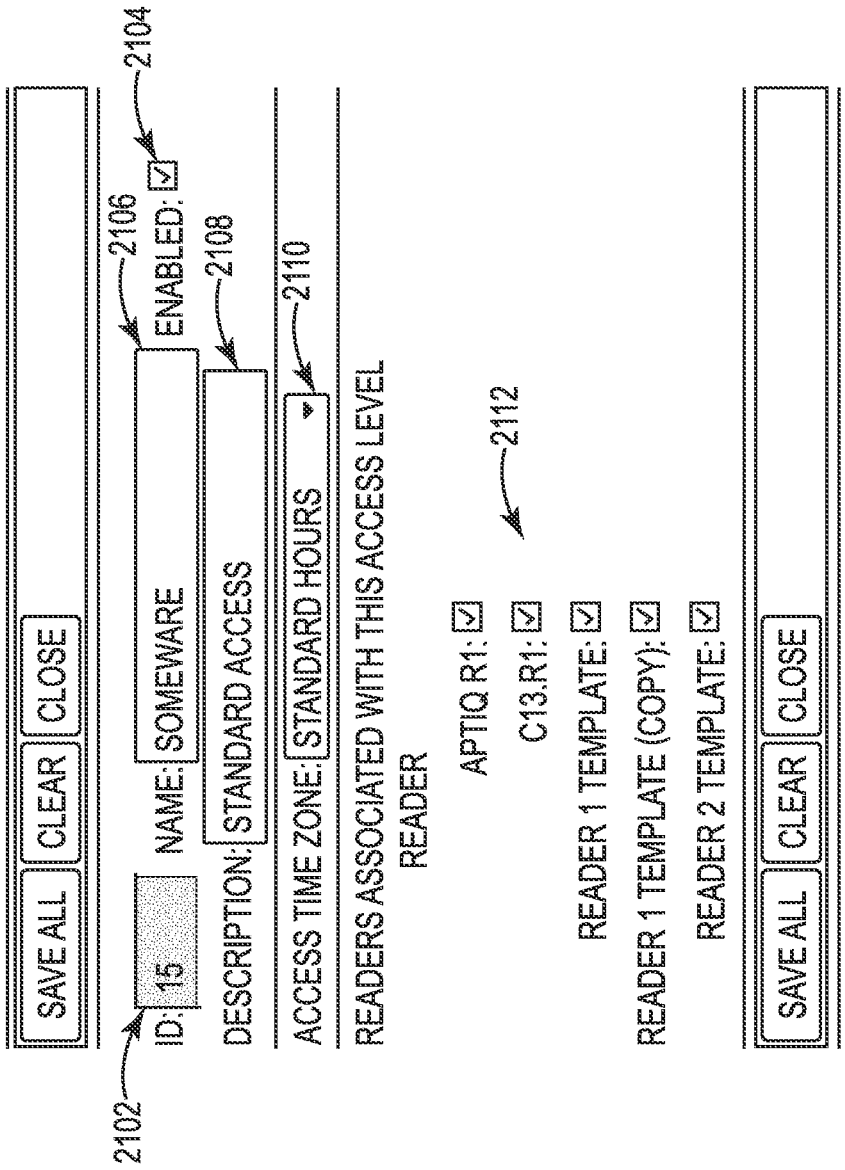
FIG. 21 is a screenshot from an embodiment of an authorized administrator interface for the database of an embodiment of the invention relating to the function of modifying, adding, or editing selected cardholders and/or access groups, according to some embodiments of the present disclosure.

As shown in FIG. 21, an authorized administrator can add access groups or edit them. The system may automatically populate the ID field 2102 in some embodiments. In at least one embodiment, the authorized administrator may enable or disable an access group (as shown generally at 2104). In some embodiments, the authorized administrator may enter or edit the access group's name (shown generally at 2106) and/or enter and edit a brief description in order to quickly identify the access group (shown generally at 2108). In at least one embodiment, the duration of access for the access group may be identified by start time or stop time or may be selected from a drop-down menu as shown in FIG. 21 (shown generally at 2110). In some embodiments, the access group can select particular access devices or remote devices 108 that will be granted access for this group (shown generally at 2112).

In at least one embodiment, the interface 300 may provide information to the authorized administrator on the authorized users as shown in FIG. 22. In some embodiments, a list of authorized users 2200 may provide information such as name (as shown generally at 2202), a status of the authorized user (as shown generally at 2204), whether the user is enabled or disabled (as shown generally at 2206), a brief description of the user (as shown generally at 2208), and/or an associated group (as shown generally at 2210). In at least the embodiment shown, the authorized administrator can modify each access group by selecting from a drop-down menu to edit, copy or delete the access group (as shown generally at 2212).

Figure 23:
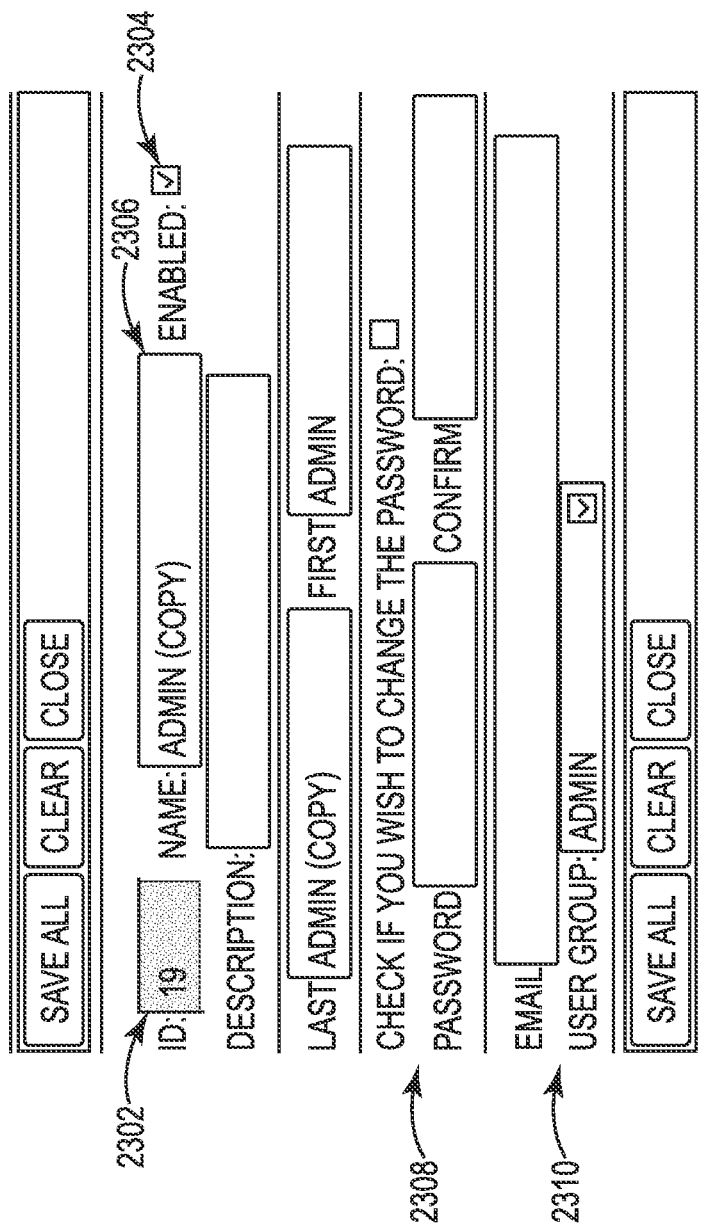
FIG. 23 is a screenshot from an embodiment of an authorized administrator interface for the database of an embodiment of the invention relating to the function of modifying, adding, or editing authorized users, according to some embodiments of the present disclosure.

In at least one embodiment, as shown in FIG. 23, an authorized administrator can add authorized administrators and/or authorized users and edit their information. In some embodiments, the system may automatically populate the ID field 2302. The authorized administrator may enable or disable an authorized user (as shown generally at 2304), in at least one embodiment. The authorized administrator may enter or edit the user's name (shown generally at 2306) in some embodiments. The authorized administrator may enter and edit the authorized user's password and e-mail address (shown generally at 2308) in some embodiments. In at least one embodiment, the authorized administrator can select a particular access group for the authorized user (shown generally at 2310).

Figure 25:
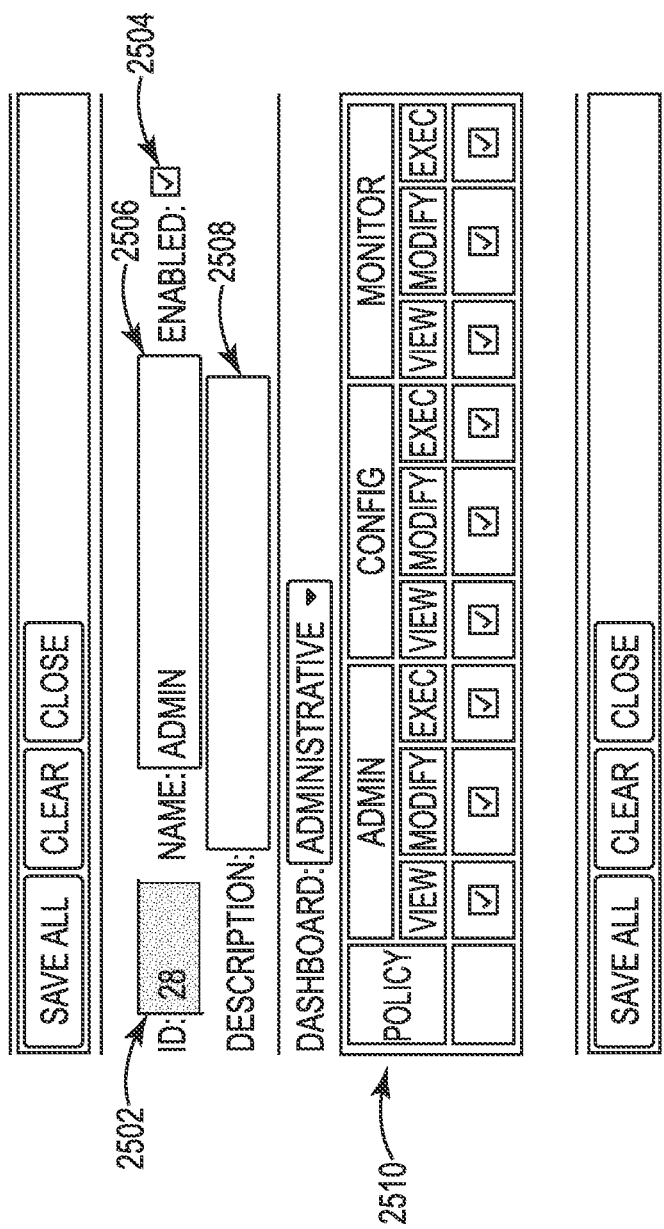
FIG. 25 is a screenshot from an embodiment of an authorized administrator interface for the database of an embodiment of the invention relating to the function of modifying, adding, or editing user groups, according to some embodiments of the present disclosure.

The authorized administrator may establish a user group, which is a set of parameters that restrict or grant access to the database, according to some embodiments of the present invention. Thus, the administrator can control what information is in the database and what rights in the database the authorized user may utilize for viewing, modifying, or executing. In at least one embodiment, the authorized administrator can enable or disable the access group, provide a brief description of the access group for identification purposes, and make modifications, such as editing, copying, or deleting the access group. As shown in FIG. 24, a list of access groups 2400 is viewable by the authorized administrator, and the list may provide information such as name (as shown generally at 2402), the administrative controls for the user group (as shown generally at 2404), the configuration controls for the user group (as shown generally at 2406), the monitoring controls for the group (as shown generally at 2408), the type of database interface the group is assigned to (e.g. administrative, service, monitor, initiator or responder) (as shown generally at 2410), and/or a brief description of the access group (as shown generally at 2412). In at least the embodiment shown, the authorized administrator can modify each access group by selecting from a drop-down menu to edit, copy or delete the access group (as shown generally at 2414). In at least one embodiment, as shown in FIG. 25, an authorized administrator can add access groups or edit them. The system may automatically populate the ID field 2502. In at least one embodiment, the authorized administrator can enable or disable the access group (as shown generally at 2504). In at least one embodiment, the authorized administrator can enter or edit the access group's name (shown generally at 2506); or enter and edit a brief description of when and/or where the new group has access to in order to quickly identify the access group (shown generally at 2508). At least the administrative controls, configuration controls, and monitoring controls may be selected for the user group (shown generally at 2510) by the administrator in some embodiments. These controls can include viewing and modifying information and executing actions, including lockdown procedures, for example.

In at least one embodiment, the user interface 300 may provide information to the authorized administrator regarding the "time zones" (allotted times and days that cardholders or authorized users are allowed to access particular areas of the building, for example, granting access for some cardholders to access areas over the weekend or restricting part-time employees from certain areas) and "holidays" (specific dates) as defined above. As shown in FIG. 26, the list of time zones 2600 may viewable by the authorized administrator. The list of time zones 2600 may provide information such as name (shown generally at 2602), the status of the time zone (for example, whether the time zone is activated or not) (shown generally at 2604), whether the time zone is enabled or not (shown generally at 2606), a brief description of the time zone (shown generally at 2608), and/or the time interval (shown generally at 2610). In at least the embodiment shown, the authorized administrator can modify each time zone by editing, copying, or deleting the time zone. When the authorized administrator wants to modify the time zone, in some embodiments they can do so by selecting an action from a drop-down menu (shown generally at 2612). As shown in FIG. 27, an authorized administrator can add time zones or edit them. The time zone may assigned an identification number or other identifier which is stored in ID field 2702. The system may automatically populate the ID field 2702. In at least one embodiment, the authorized administrator can enable or disable the time zone (as shown generally at 2704). The authorized administrator may enter or edit the time zone's name (shown generally at 2706); a description (shown generally at 2707); and/or a particular interval for the time zone (shown generally at 2708). The authorized administrator may select a start time, a stop time, and the applicable days Monday through Sunday. In at least one embodiment, the authorized administrator can select a holiday as defined above for the interval. In at least one embodiment, the start time and stop time may be entered based on a 24-hour clock, and in other embodiments the start time and stop time may be entered based on a 12-hour clock. Each time zone may have one or more intervals. For example, as shown in FIG. 27, the time zone has two intervals: one from 4:59 to 7:59 and one from 18:00 to 20:00 for Mondays, Tuesdays, Wednesdays, Thursdays, Fridays, Saturdays, Sundays and holidays. In other areas of the interface, the authorized administrator can then select certain activities or statuses for cardholders, access groups, or user groups for the time zone, for example, allowing cardholders to enter a specific area of the building during those intervals.

Figure 29:
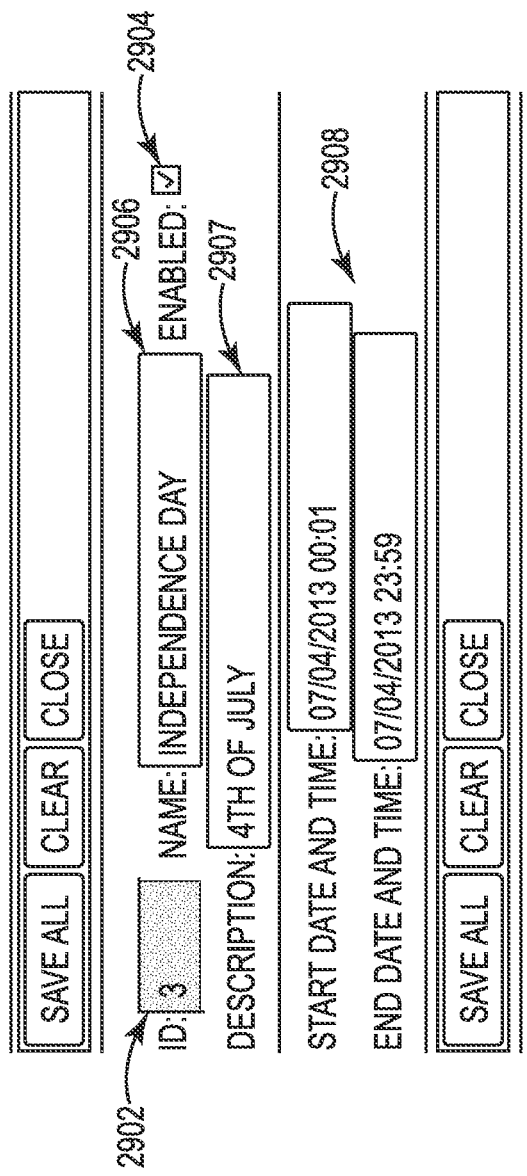
FIG. 29 is a screenshot from an embodiment of an authorized administrator interface for the database of an embodiment of the invention relating to the function of modifying, adding, or editing holidays, according to some embodiments of the present disclosure.

As shown in FIG. 28, the list of holidays 2800 is viewable by the authorized administrator. Holidays may be a single day or several days. As shown in FIG. 28, the list of holidays may provide information such as name (as shown generally at 2802), the start date and time of the holiday (as shown generally at 2804), the end date and time of the holiday (as shown generally at 2806), whether the holiday is enabled or not (as shown generally at 2808), and a brief description of the holiday (as shown generally at 2810). In at least the embodiment shown, the authorized administrator can modify each holiday by editing, copying, or delete the holiday. In at least the embodiment shown, the authorized administrator who wants to modify the holiday can do so by selecting an action from a drop-down menu (as shown generally at 2812), but other methods for selecting an action in a graphic user interface such as the interface 300 is contemplated by the invention. As shown in FIG. 29, an authorized administrator can add holidays or edit them. In some embodiments, the holiday is assigned an identification number or other identifier which may be stored in ID field 2902. The system may automatically populate the ID field 2902. In at least one embodiment, the authorized administrator can enable or disable the holiday (as shown generally at 2904). In at least one embodiment, the authorized administrator can enter or edit the holiday's name (shown generally at 2906) and a description (shown generally at 2907). In at least one embodiment, the authorized administrator can select a particular interval for the holiday (shown generally at 2908). The authorized administrator can select a start date, a start time, a stop date, and a stop time. In at least one embodiment, the start time and stop time may be entered based on a 24-hour clock, and in other embodiments the start time and stop time may be entered based on a 12-hour clock. In at least one embodiment, each holiday may have one or more intervals.

Figure 31:
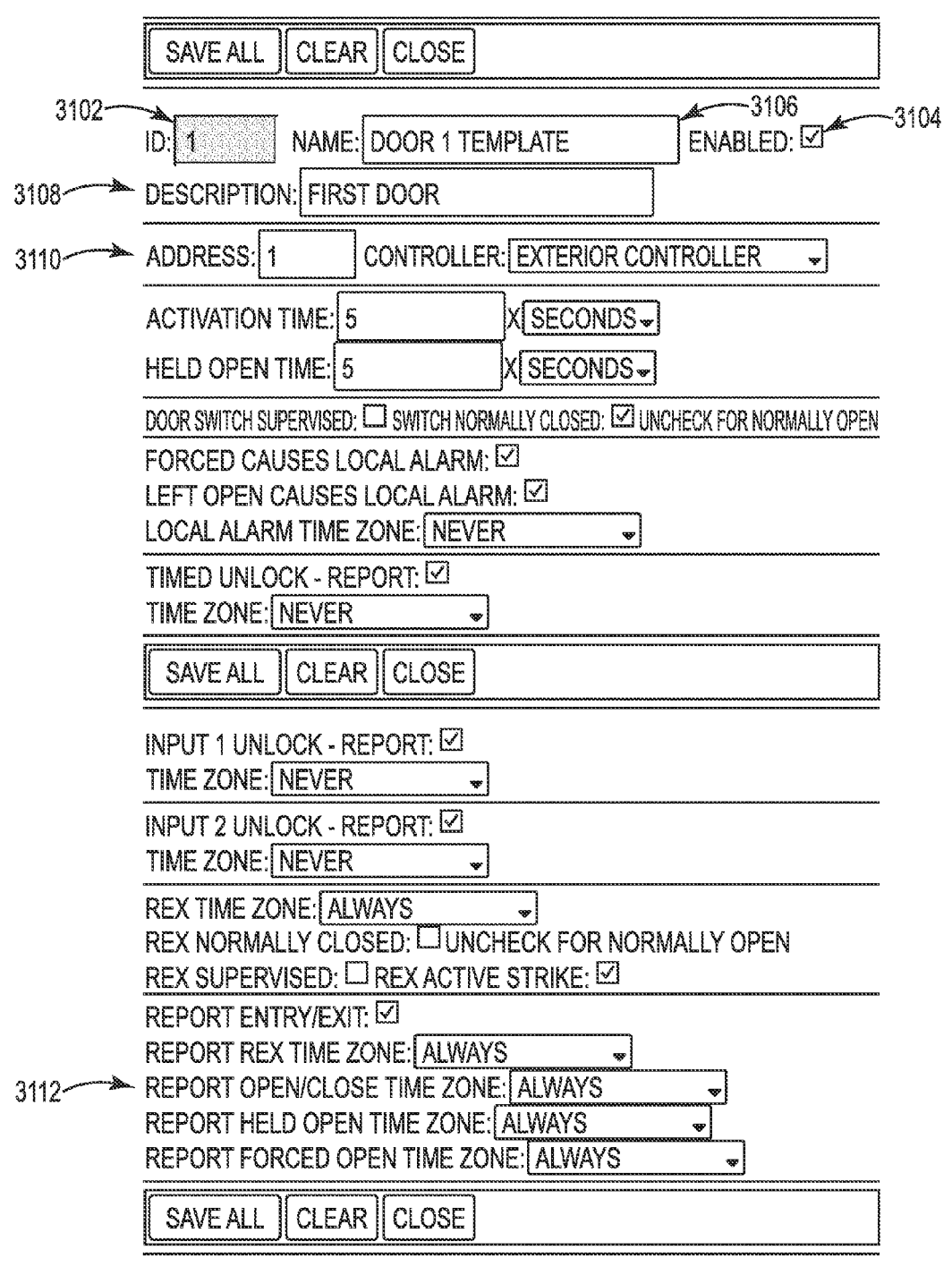

In at least one embodiment, the authorized administrator can add, view and modify information regarding particular safety devices 112. For example, in at least one embodiment, the authorized administrator can add, view and modify information regarding for one or more doors. Doors can include controlled entrances such as an exterior or interior door, a turnstile, a gate or an elevator door requiring a card read or keypad entry for access. In at least one embodiment, shown in FIG. 30, a list of safety devices 3000, such as the doors, is viewable by the authorized administrator. As shown in FIG. 30, the list of safety devices 3000 may provide information such as name (as shown generally at 3002); type or description of the safety device (as shown generally at 3004); the status of the safety device (as shown generally at 3006); whether the safety device is enabled (as shown generally at 3008); particular actions for the safety device (for example, for a door, to unlock, to lock, to momentarily unlock, an enhanced unlock feature, or a cancel feature) (as shown generally at 3010); and/or the related controller 110 (as shown generally at 3012). In at least the embodiment shown, the authorized administrator can modify each safety device by selecting from a drop-down menu to edit, copy or delete the safety device from the list (as shown generally at 3014). As shown in FIG. 31, an authorized administrator can add safety devices 112 or edit them. In some embodiments, the safety device is assigned an identification number or other identifier which is stored in ID field 3102, which the system may automatically populate. The authorized administrator may enable or disable the safety device (as shown generally at 3104). In some embodiments, the authorized administrator can enter or edit the safety device's unique identifying name (shown generally at 3106) and/or a brief description of the safety device that describes the safety device to authorized administrators and authorized users (shown generally at 3108). The authorized administrator may edit the address for the safety device, which may be a particular numeric or alphanumeric reference to a location (shown generally at 3110). The authorized administrator may edit information regarding the particular controller 110 that communicates with the safety device 112. The authorized administrator may select another controller 110 to communicate with the safety device 112, in some embodiments. The authorized administrator may provide the amount of time during which the safety device is activated or deactivated, in some embodiments. For instance, where the safety device is a door, the authorized administrator may provide the amount of time during which the door is unlocked after an access card is read, a "request to exit" activation (for example, a request to leave the building without reading an access card), or a momentary unlock (for example, a specified time period where the door is unlocked and after that time elapses or after someone uses the opens the door, the system then locks the door again). In at least one embodiment, the authorized administrator may define a "held open time," a length of time during which the door can be held open before an event will be posted in the event list (discussed above) by the system. In at least one embodiment, where the safety device is a door, the authorized administrator may provide information regarding one or more of following exemplary features of the door: whether supervisory resistors are installed on the door, whether the door switch is normally closed, whether a forced door (for example, a door that has been opened without a valid card read or request to exit activation prior to opening) causes an alarm, whether an alarm will sound if the door is left open for a defined period of time, the time interval that an alarm will sound, a time interval that is set to automatically unlock a reader-controlled door (for example, the locking mechanism for a lobby door can have a time unlock interval that corresponds to business hours), whether a "request to exit" activation is acceptable for this door, the time intervals when the "request to exit" is active, whether the door is supervised, whether to report entry or exit at the door as an event to the system. Additional information for particular features of a door or other safety device may be provided as needed.

In some embodiments, a sensor (for example, a motion detector) may be provided for the safety device and the state of the sensor can be monitored by the system. As shown in FIG. 31, in some embodiments, the authorized user can select whether the state of the sensor is normal (wherein the door or surrounding area is considered secure) or abnormal, wherein the sensor is reported as being active, potentially causing the room to be unsecure. An alarm may sound if the state of the sensor is abnormal in some embodiments. In at least one embodiment, the authorized administrator can select to report entry or exit at the door or other activation of the safety device as an event and whether the action is included in an event archive (shown generally at 3112). Depending on the information stored regarding the door or other safety device, the safety device will be programmed to perform based at least in part on that information to report events, sound alarms, allow access, or perform other functions.

Figure 33:
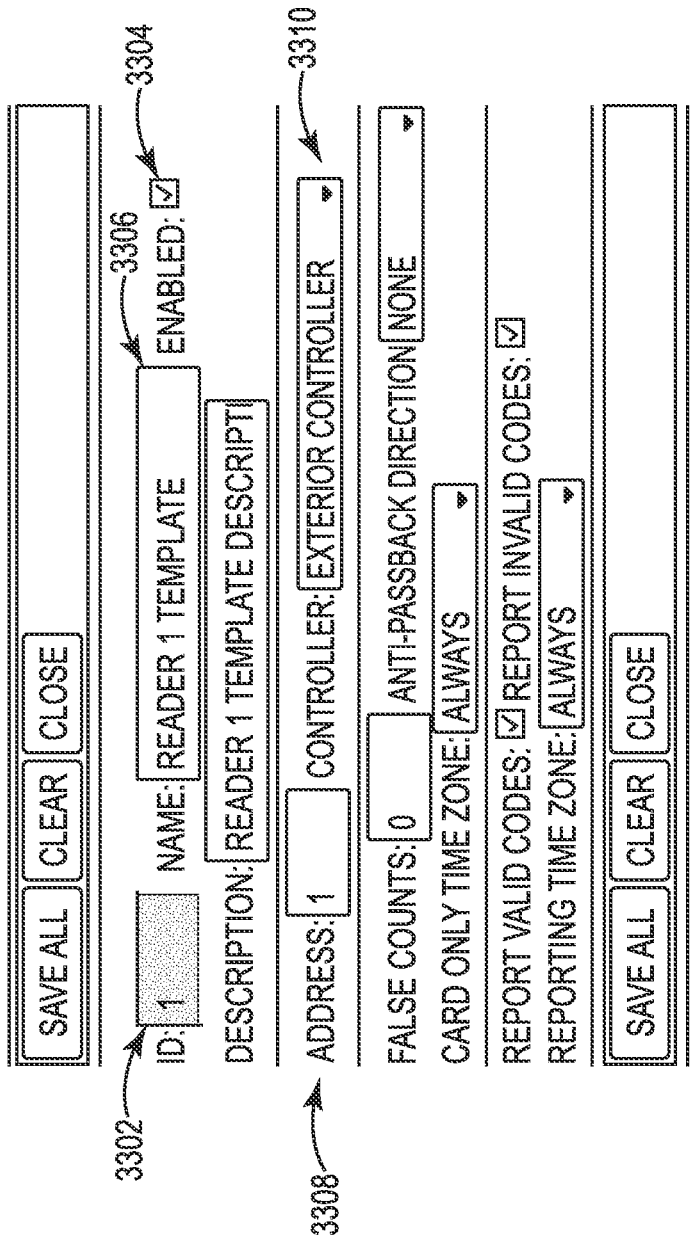
FIG. 33 is a screenshot from an embodiment of an authorized administrator interface for the database of an embodiment of the invention relating to the function of modifying, adding, or editing the readers, according to some embodiments of the present disclosure.

In at least one embodiment, the interface 300 allows for information to be stored regarding the access card readers. As shown in FIG. 32, the list of access card readers 3200 may be viewable by the authorized administrator. As shown in FIG. 32, the list of readers 3200 may provide information such as name (as shown generally at 3202), status of the reader (as shown generally at 3204), whether the reader is enabled or disabled (as shown generally at 3206), a brief description of the reader (as shown generally at 3208), and/or an associated controller (as shown generally at 3210). In at least one embodiment, the authorized administrator can block or unblock the reader (as shown generally at 3212). For instance, the authorized administrator who wants to block or unblock the reader can do so by selecting an action from a drop-down menu, but other methods for selecting an action in a graphic user interface such as the interface 300 is contemplated by the invention. In at least the embodiment shown, the authorized administrator can modify the information for each reader by adding, editing, copying, or deleting the reader (as shown generally at 3214). As shown in FIG. 33, an authorized administrator can add readers or edit them. In at least one embodiment, as shown in FIG. 33, the reader may be assigned an identification number or other identifier which is stored in ID field 3302, and the system may automatically populates the ID field 3302. The authorized administrator can enable or disable the reader (as shown generally at 3304) in some embodiments. The authorized administrator may enter or edit the reader's name (shown generally at 3306). In at least one embodiment, the authorized administrator may edit the address for the reader, which may be a particular numeric or alphanumeric reference to a location (shown generally at 3308). Where the reader is associated with a controller 110, the authorized administrator may edit information regarding the particular controller 110 that communicates with the reader (as shown generally at 3310) or may select another controller 110. In some embodiments, the authorized administrator may select the number of allowable false counts (the number of times before the reader will send an unknown code event to the system). In at least one embodiment, the authorized administrator may select the "anti-passback" direction (the direction, in or out, assigned to a reader in an anti-passback area). "Anti-passback" prevents a card holder from passing an access card back to another person so they can gain entry. When anti-passback features are enabled, the cardholder must leave the secured area through an exit reader before the system will grant another entry. In at least one embodiment, the authorized administrator may select a particular "time zone" as defined above or time interval during which entry is granted. The authorized administrator may select whether to report valid codes as an event, to report invalid codes as an event, and to select a particular "time zone" to report the event in some embodiments.

Figure 35:
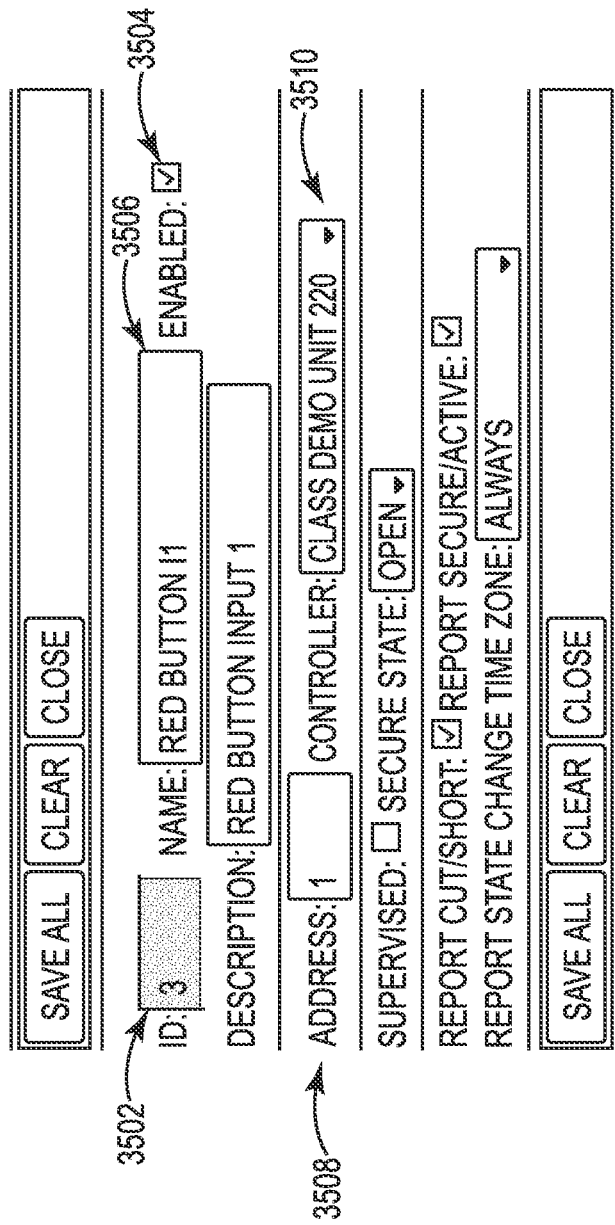
FIG. 35 is a screenshot from an embodiment of an authorized administrator interface for the database of an embodiment of the invention relating to the function of modifying, adding, or editing the sensors, according to some embodiments of the present disclosure.

In at least one embodiment, the interface 300 allows for information to be stored regarding sensors, such as motion detectors, which may provide an input to the system 100. As shown in FIG. 34, a list of sensors 3400 is viewable by the authorized administrator. As shown in FIG. 34, the list of sensors 3400 may provide information such as name (shown generally at 3402), status of the sensor (shown generally 3404), whether the sensor is enabled or disabled (shown generally 3406), a brief description of the sensor (shown generally 3408), and/or, if applicable, information regarding a controller associated with the sensor (shown generally 3410). The authorized administrator may disable the sensor's reporting ability in some embodiments. For instance, the authorized administrator who wants to disable the sensor's reporting ability can do so by selecting an action from a drop-down menu (shown generally 3412), but other methods for selecting an action in a graphic user interface such as the interface 300 is contemplated by the invention. In at least the embodiment shown, the authorized administrator can modify the information for each sensor by adding, editing, copying, or deleting the sensor (shown generally at 3414). As shown in FIG. 35, an authorized administrator can add sensors or edit them. The sensor may be assigned an identification number or other identifier which is stored in ID field 3502. In at least one embodiment, the system automatically populates the ID field 3502. In at least one embodiment, the authorized administrator may enable or disable the sensor (as shown generally at 3504). The authorized administrator may enter or edit the sensor's name (shown generally at 3506) and/or may edit the address for the sensor, which may be a particular numeric or alphanumeric reference to a location (shown generally at 3508). In some embodiments, where the sensor is associated with a controller 110, the authorized administrator may edit information regarding the particular controller 110 that communicates with the sensor or may select another controller 110 (shown generally at 3510). In some embodiments, the authorized administrator may select the security status of the sensor, for example "normally open" or "normally closed" or the number of allowable false counts (the number of times before the reader will send an unknown code event to the system). The authorized administrator may select whether to report as an event if the sensor provides an input which is cut or shorted, secure or active, or to select reporting information based on a particular "time zone" according to some embodiments.

As shown in FIG. 36, the interface 300 allows for information to be stored regarding output devices, which have contacts that will open or close depending on pre-defined parameters to turn remote devices on or off. A list of output devices 3600 that provide outputs may viewable by the authorized administrator, as shown in FIG. 36. The list of output devices 3600 may provide information such as an identifier (shown generally at 3602), status of the output device (shown generally at 3604), whether the output device is enabled or disabled (shown generally at 3606), a brief description of the output device (shown generally at 3608), and/or a related controller (shown generally at 3610). In at least one embodiment, the authorized administrator may turn the output device on, off, or "momentarily on"). For instance, the authorized administrator who wants to turn off the output device can do so by selecting an action from a drop-down menu (shown generally at 3612), but other methods for selecting an action in a graphic user interface such as the interface 300 is contemplated by the invention. In some embodiments, the authorized administrator can modify the information for each output device by adding, editing, copying, or deleting the controller (shown generally at 3614). As shown in FIG. 37, an authorized administrator can add output devices to the database or edit them. In at least one embodiment, as shown in FIG. 37, the output device is assigned an identification number or other identifier which is stored in ID field 3702 and in some embodiments, the system automatically populates the ID field 3702. In some embodiments, the authorized administrator can enable or disable the output device (as shown generally at 3704). In at least one embodiment, the authorized administrator can enter or edit the output device's name (shown generally at 3706) or may edit the address for the output device, which may be a particular numeric or alphanumeric reference to a location (shown generally at 3708). In some embodiments, the authorized administrator may enter an amount of time that an output is active in a "momentary on" event. In some embodiments, the authorized administrator can select an output trigger for the controller, the normal output state, the "time zone" in which the output is automatically active, the "time zone" in which the output will activate from an input or an event, and/or the "time zone" in which the system will report state changes. In at least one embodiment, the authorized administrator can select at least one of the inputs (discussed above) to relate the input to the outputs.

Figure 39:
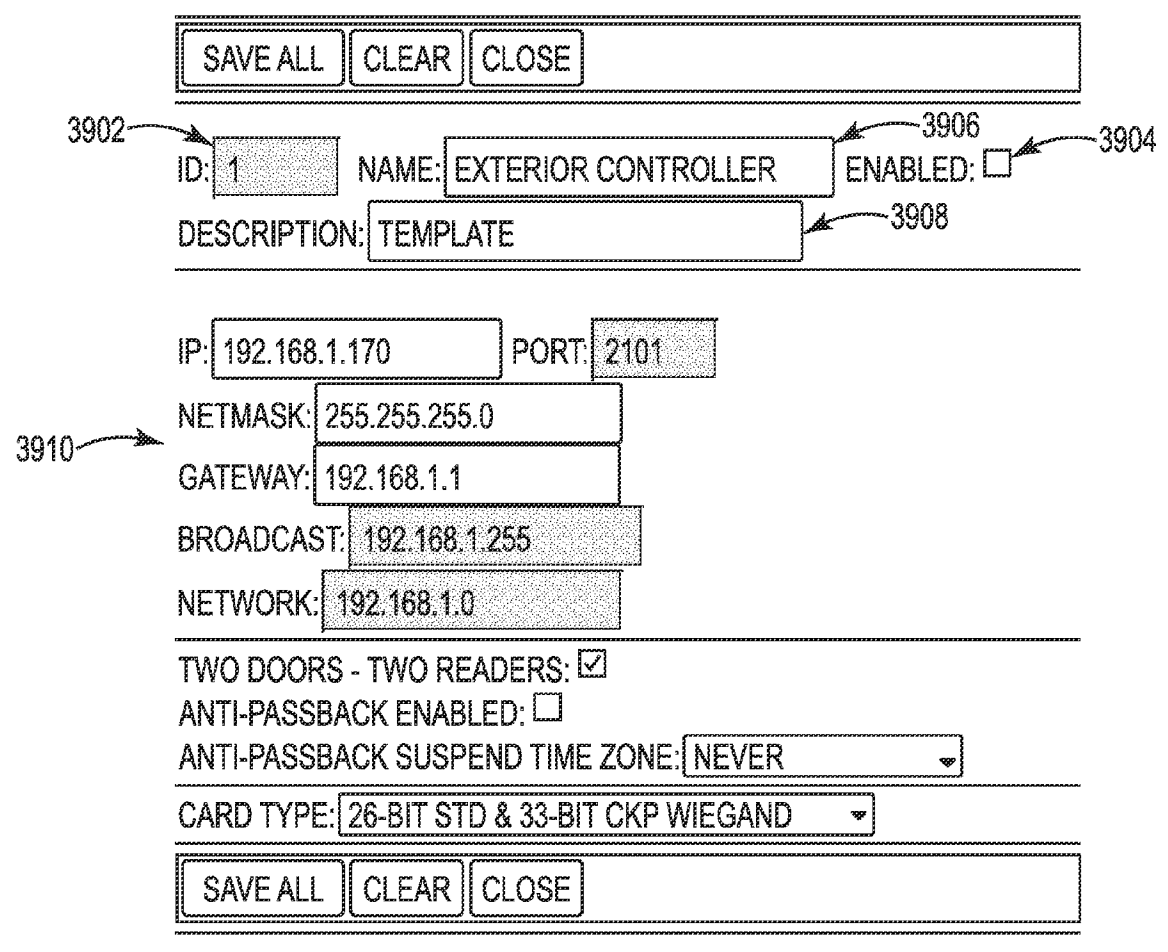

As shown in FIG. 38, the interface 300 allows for information related to controllers 110. In some embodiments, a list of controllers 3800 is viewable by the authorized administrator. The list of controllers 3800 may provide information such as an identifier (shown generally at 3802), status of the controller (shown generally at 3804), whether the controller is enabled or disabled (shown generally at 3806), a brief description of the controller (shown generally at 3808), the IP address for the controller (shown generally at 3810), and/or other pertinent information. The authorized administrator may perform various operations by selecting actions through the database interface 300, for example, refreshing the controller with the applications memory content for that controller, activating the controller, or deactivating the controller. For instance, the authorized administrator who wants to select one of these actions relating to the controller may do so by selecting an action from a drop-down menu (as shown generally at 3812), but other methods for selecting an action in a graphic user interface such as the interface 300 is contemplated by the invention. The authorized administrator may be able to modify the information for each controller by adding, editing, copying, or deleting the controller from the list (as shown generally at 3814). As shown in FIG. 39, an authorized administrator can add controllers to the database or edit them. The controller may be assigned an identification number or other identifier which is stored in ID field 3902, and in at least one embodiment, the system automatically populates the ID field 3902. In some embodiments, the authorized administrator can enable or disable the controller (as shown generally at 3904). In at least one embodiment, the authorized administrator may enter or edit the controller's name (shown generally at 3906); enter or edit a brief description for the controller (shown generally at 3908); edit the IP address and other network related information for the door for the controller (shown generally at 3910); select the number of readers that may be connected to a number of doors connected to the controller; select whether anti-passback features are enabled, disabled, or suspended during a particular "time zone"; and/or select a particular card that may be associated with the reader.

Figure 41:
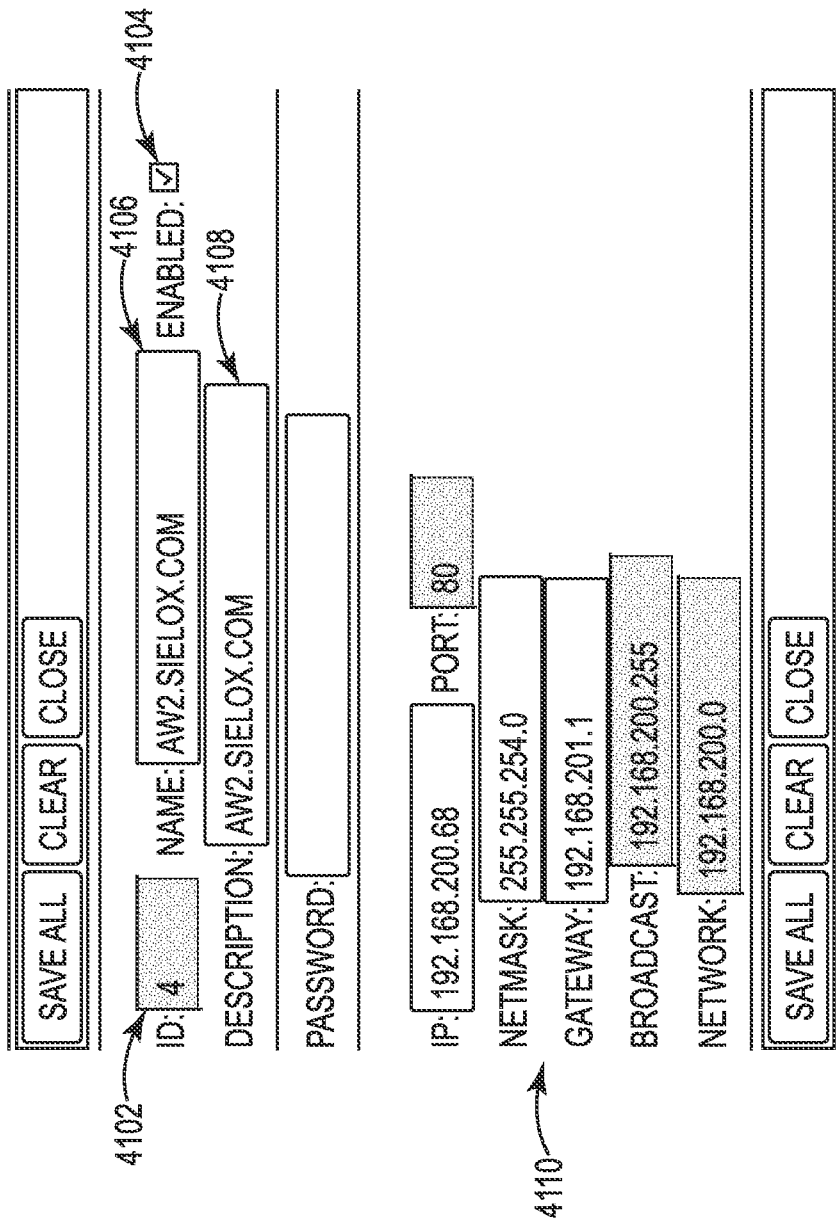
FIG. 41 is a screenshot from an embodiment of an authorized administrator interface for the database of an embodiment of the invention relating to the function of modifying, adding, or editing the websites for access to the database, according to some embodiments of the present disclosure.

As shown in FIG. 40, the interface 300 allows for an authorized administrator to select and update information related to web browser access for the database. In some embodiments, a list of websites 4000 for access to the database is viewable by the authorized administrator. The list of websites 4000 may provide information such as the domain name (shown generally at 4002), status of the website (shown generally at 4004), whether the website is enabled or disabled (shown generally at 4006), a brief description of the website (shown generally at 4008); and/or the IP address for the controller (shown generally at 4010). In the at least one embodiment, the authorized administrator may perform various operations by selecting actions through the database interface 300, for example, syncing, activating the website, deactivating the website or restarting the website. For instance, the authorized administrator who wants to select one of these actions relating to the website may do so by selecting an action from a drop-down menu (shown generally at 4012), but other methods for selecting an action in a graphic user interface such as the interface 300 is contemplated by the invention. In at least the embodiment shown, the authorized administrator can modify the information for each website by adding, editing, copying, or deleting the website from the list (as shown generally at 4014). As shown in FIG. 41, an authorized administrator can add websites to the database or edit them. In some embodiments, the website is assigned an identification number or other identifier which is stored in ID field 4102. The system may automatically populate the ID field 4102. In at least one embodiment, the authorized administrator may enable or disable the website (as shown generally at 4104); may enter or edit the domain name (shown generally at 4106); may enter or edit a brief description for the website (shown generally at 4108); and/or may edit the IP address and other network related information for the door for the website (shown generally at 4110). When accessing the system remotely, in some embodiments, the authorized administrator can also update the clock based on the authorized administrator's current location to sync the authorized work station with the time and date of the building.

In at least one embodiment, the interface 300 allows for an authorized administrator to select and update information related to events and alarms. As discussed above, events may include a change of state of a device or database object. For example, checking the status of a door or looking at a cardholder record does not generate an event; unlocking a door or changing a cardholder's access does generate an event, because something in the database has changed, according to some embodiments. As shown in FIG. 42, a list of the most recent events 4200 is viewable by the authorized administrator. The list of events may provide general information such as what kind of event occurred (shown generally at 4202), the location of the event (shown generally at 4204), which cardholder or authorized user initiated or reported the event (shown generally at 4206), what time and date the event occurred (shown generally at 4208), and a unique identifier for the event (which may be numeric or an alphanumeric identifier) (shown generally at 4210). In some embodiments, an authorized administrator may "pause" an event if the authorized administrator wants to stop notification of future events to look at an event without being interrupted. In one embodiment, the authorized administrator can select one icon to temporally pause the incoming events and another icon to resume the events, or other similar graphical user interface object functions to pause and resume the event list.

Figure 43:
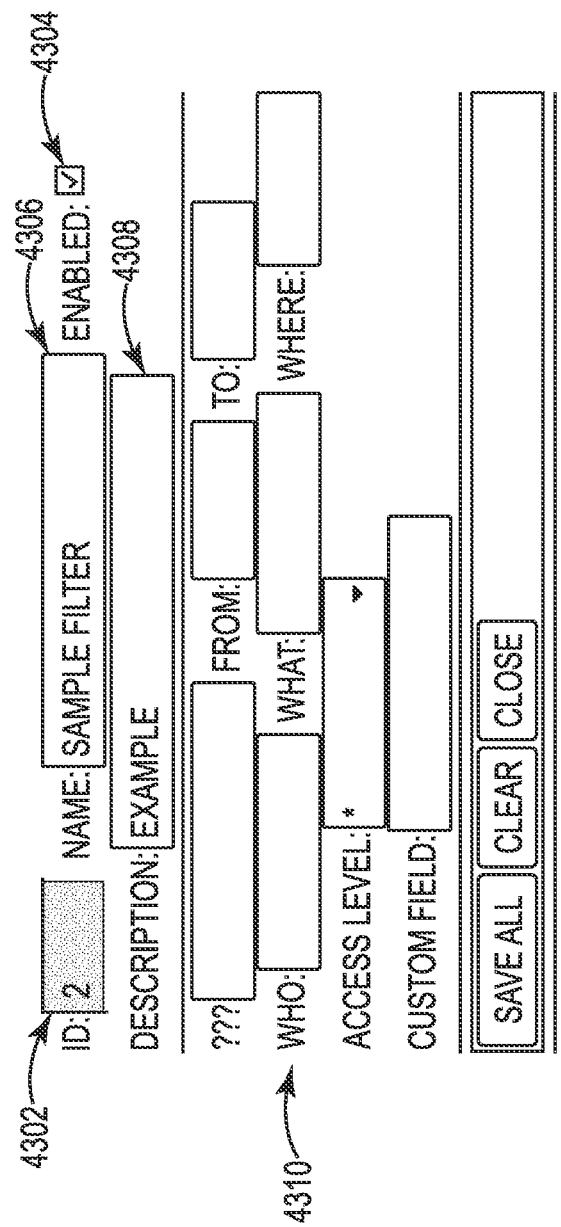
FIG. 43 is a screenshot from an embodiment of an authorized administrator interface for the database of an embodiment of the invention relating to filters, according to some embodiments of the present disclosure.

In some embodiments, an authorized administrator may add or modify a filter, which in some embodiments may be an object for pairing events with devices and cardholders. Events in a filter may be allowed to pass through to be listed as an event in the list of events, while those events not in a filter may be blocked. In at least one embodiment, a list of the filters is viewable by the authorized administrator in the interface 300. The list of filters may provide information such as the name of the filter, whether the filter is activated or not, whether the filter is enabled or not, a brief description of the filter that helps the authorized administrator quickly identify it. The authorized administrator, in some embodiments, can add or edit a filter as shown in FIG. 43. In some embodiments, the filter is assigned an identification number or other identifier which is stored in ID field 4302. The system may automatically populates the ID field 4302. In at least one embodiment, the authorized administrator may enable or disable the filter (as shown generally at 4304); may enter or edit the name of the filter (shown generally at 4306); may enter or edit a brief description for the filter (shown generally at 4308); and/or may enter a variety of parameters to filter out particular events (shown generally at 4310) that may include, but are not limited to, keywords, dates, times, users, administrators, access groups, locations, doors, safety devices, controllers, inputs, outputs, access levels, and custom fields.

Figure 44:
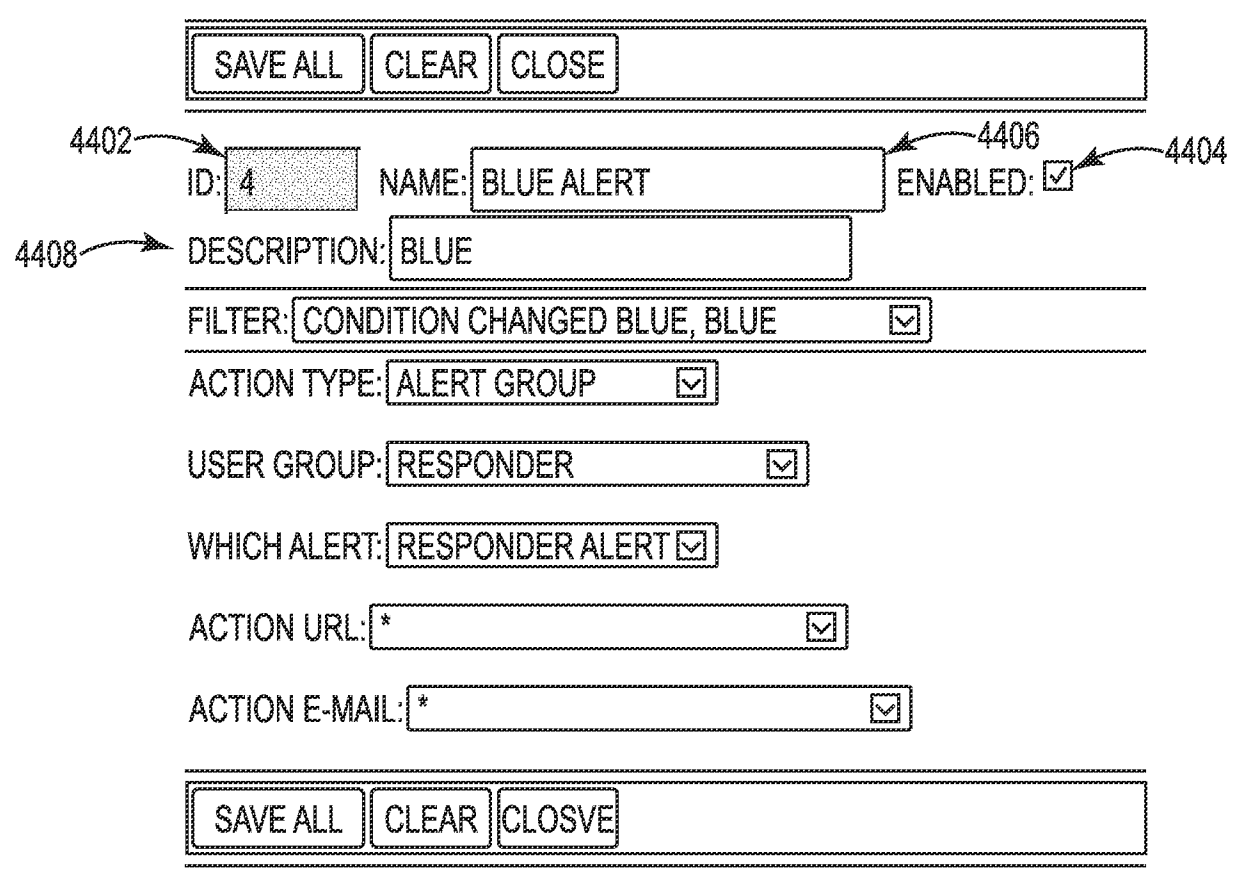

In at least one embodiment, an authorized administrator can add or modify a trigger, which in some embodiments may be in response to an event. In at least one embodiment, the trigger action type is modifiable. The trigger action type is selected from a group of actions including highlighting a filtered event (when a filtered event is triggered, the database highlights it in the events list), alerting a group (when an event is triggered, a predetermined group is notified of the event, for instance via a new pop-up window in their browser or via email), or sending a user to a URL based on a particular event, where the URL may include additional information and/or instructions. The authorized administrator, in some embodiments, an add or edit a trigger as shown in FIG. 44. The trigger may be assigned an identification number or other identifier which is stored in ID field 4402. The system may automatically populate the ID field 4402. In some embodiments, the authorized administrator may enable or disable the trigger (as shown generally at 4404); may enter or edit the name of the trigger (shown generally at 4406); may enter or edit a brief description for the filter (shown generally at 4408). In at least one embodiment, at least one of the filters discussed above is selected which will be used for firing the trigger. In some embodiments, authorized administrator may select a particular trigger action type, as discussed above and/or may select a particular access or user group that would be affected by the action. In at least one embodiment, the authorized administrator may enter a URL of a website that may be displayed to the particular access or user group affected by the trigger or an email address where an action e-mail will be sent to the particular access or user group affected by the trigger. The authorized administrator may also select the size of the pop-up window that may appear for a cardholder or authorized user, in some embodiments. The URL or the e-mail may contain information with additional instructions for the members of the access or user group.

Figure 45:
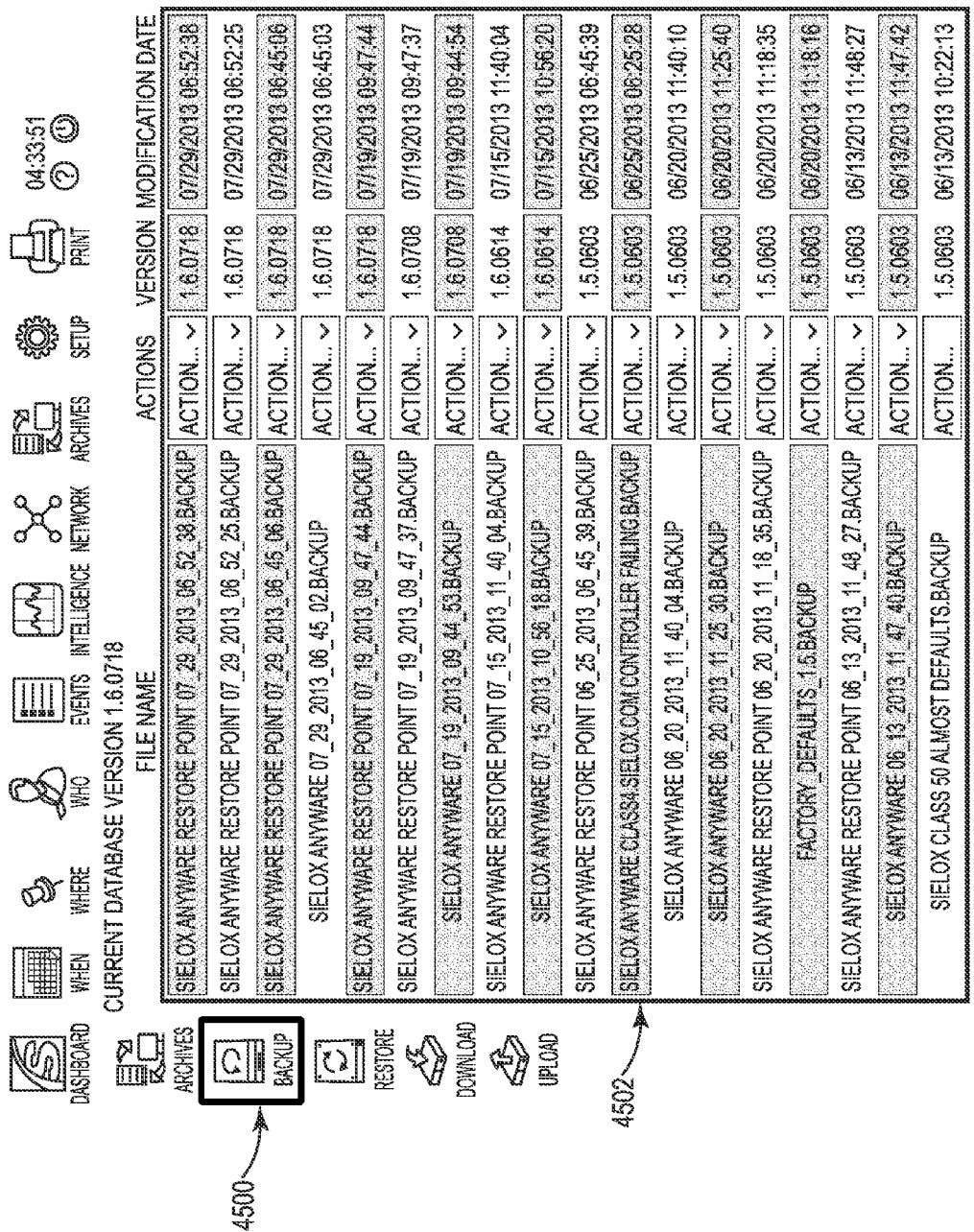
FIG. 45 is a screenshot from an embodiment of an authorized administrator interface for the database of an embodiment of the invention relating to backups, according to some embodiments of the present disclosure.

As shown in FIG. 45, in some embodiments the database 102 can be backed up by selecting a "backup" icon 4500 on the interface 300, for example. A list of backup files 4502 on the system may be provided to an authorized administrator, which may be identified by file name, version, and modification date (as shown generally at 4502). In some embodiments, the authorized user may access, modify, or delete the backup file. In at least one embodiment, the backup file has a default filename that includes the exact time and date of the backup in the following format—MM_DD_YYYY_hh_mm_ss. The authorized user may restore the database to an earlier state by selecting a "restore" icon on the interface 300 and then selecting a backup file, in some embodiments. In certain embodiments, the backup file may be downloaded from the database to a computer and can be taken offsite for permanent backup within archiving policies of the particular institution, if any.

Figure 46:
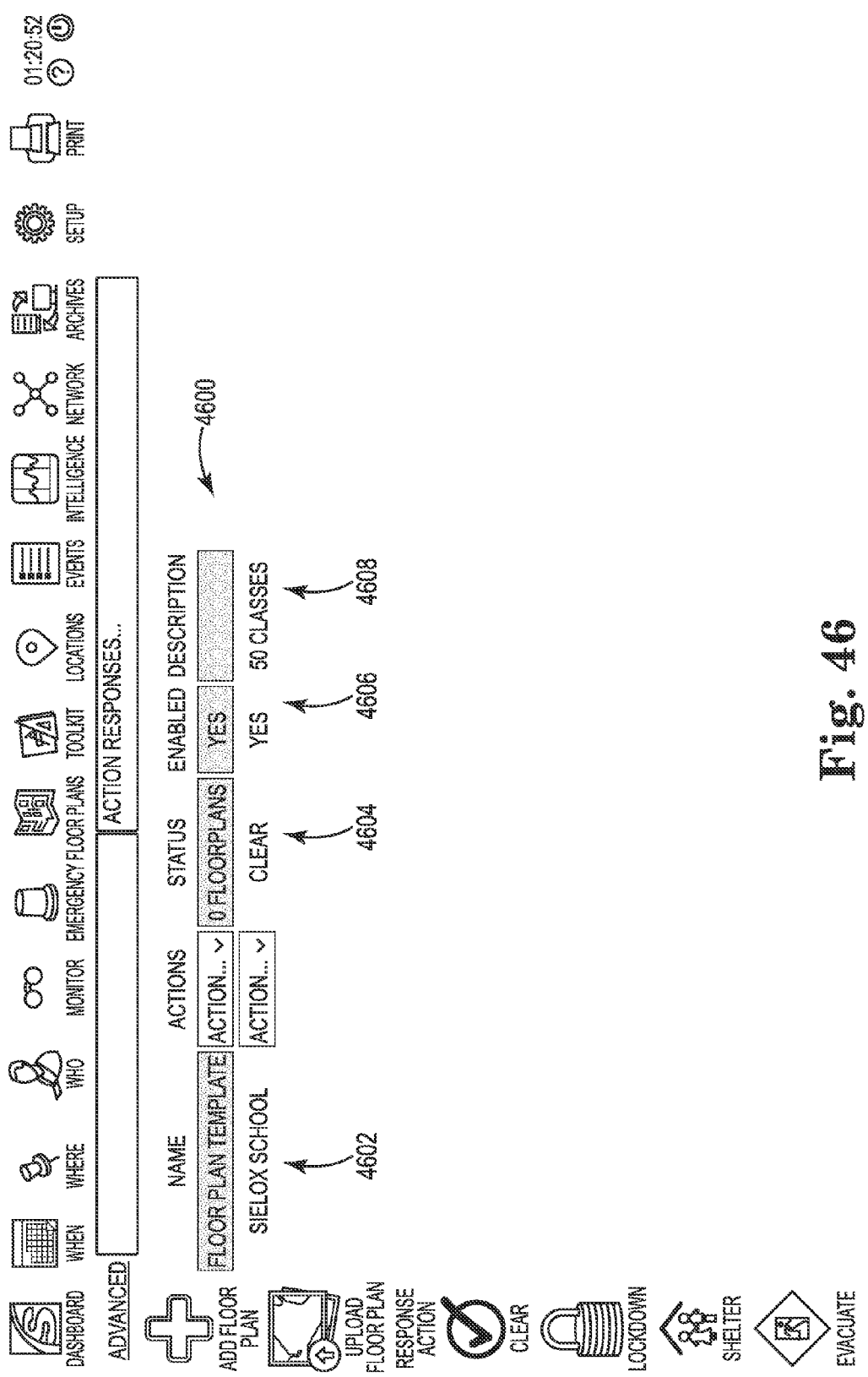
FIG. 46 is a screenshot from an embodiment of an authorized administrator interface for the database of an embodiment of the invention relating to the floor plans, according to some embodiments of the present disclosure.
Figure 47:
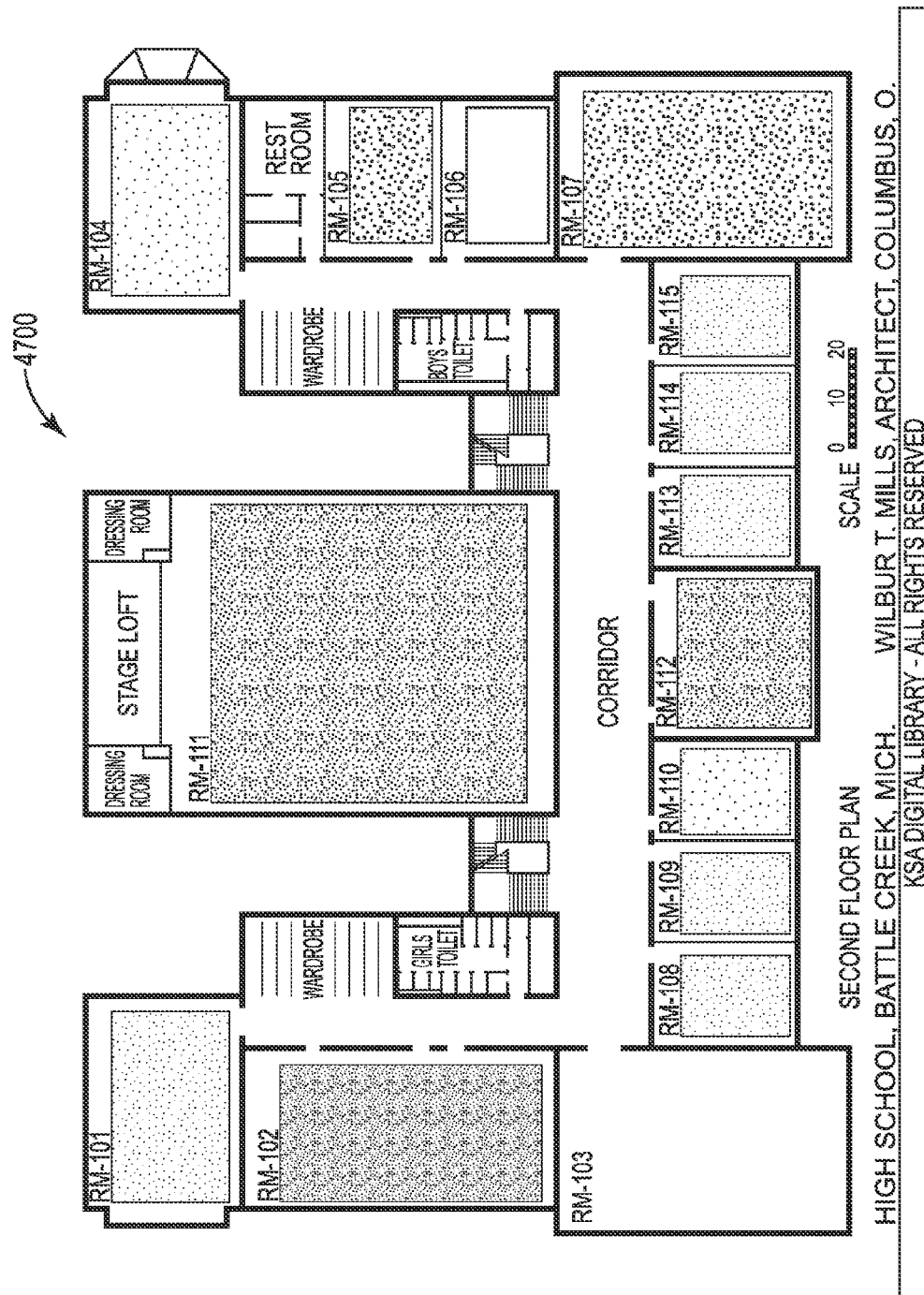
FIG. 47 is a screenshot from an embodiment of an authorized administrator interface for the database of an embodiment of the invention showing an exemplary floor plan, according to some embodiments of the present disclosure.
Figure 48:
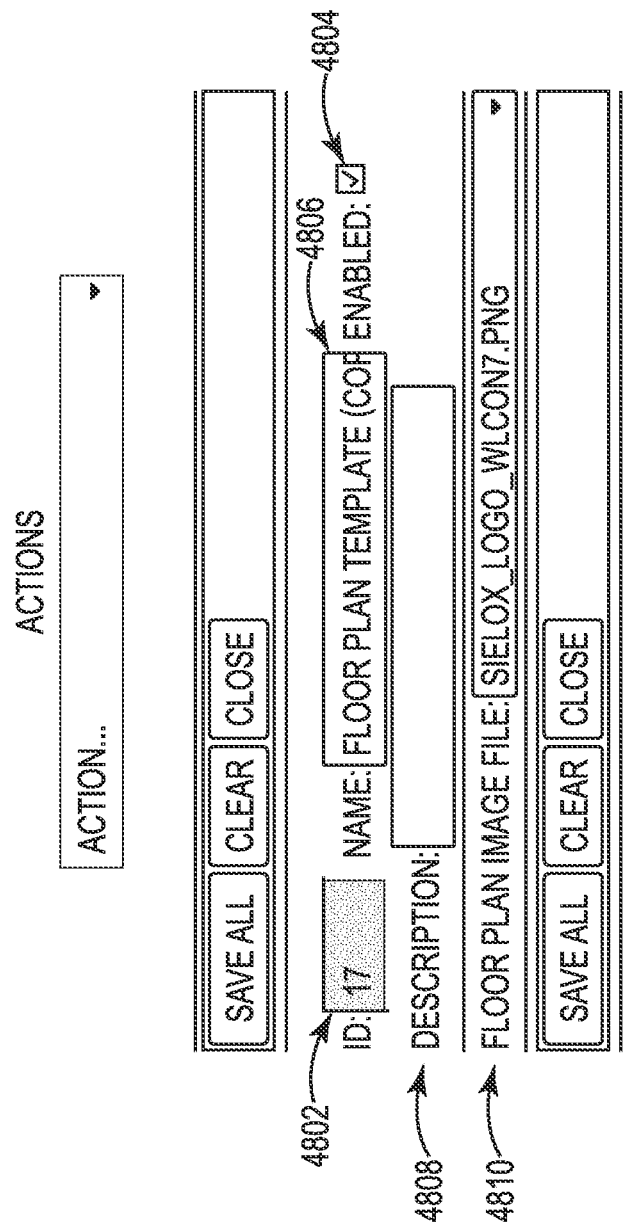
FIG. 48 is a screenshot from an embodiment of an authorized administrator interface for the database of an embodiment of the invention relating to the function of modifying, adding, or editing the floor plan, according to some embodiments of the present disclosure.
Figure 49:
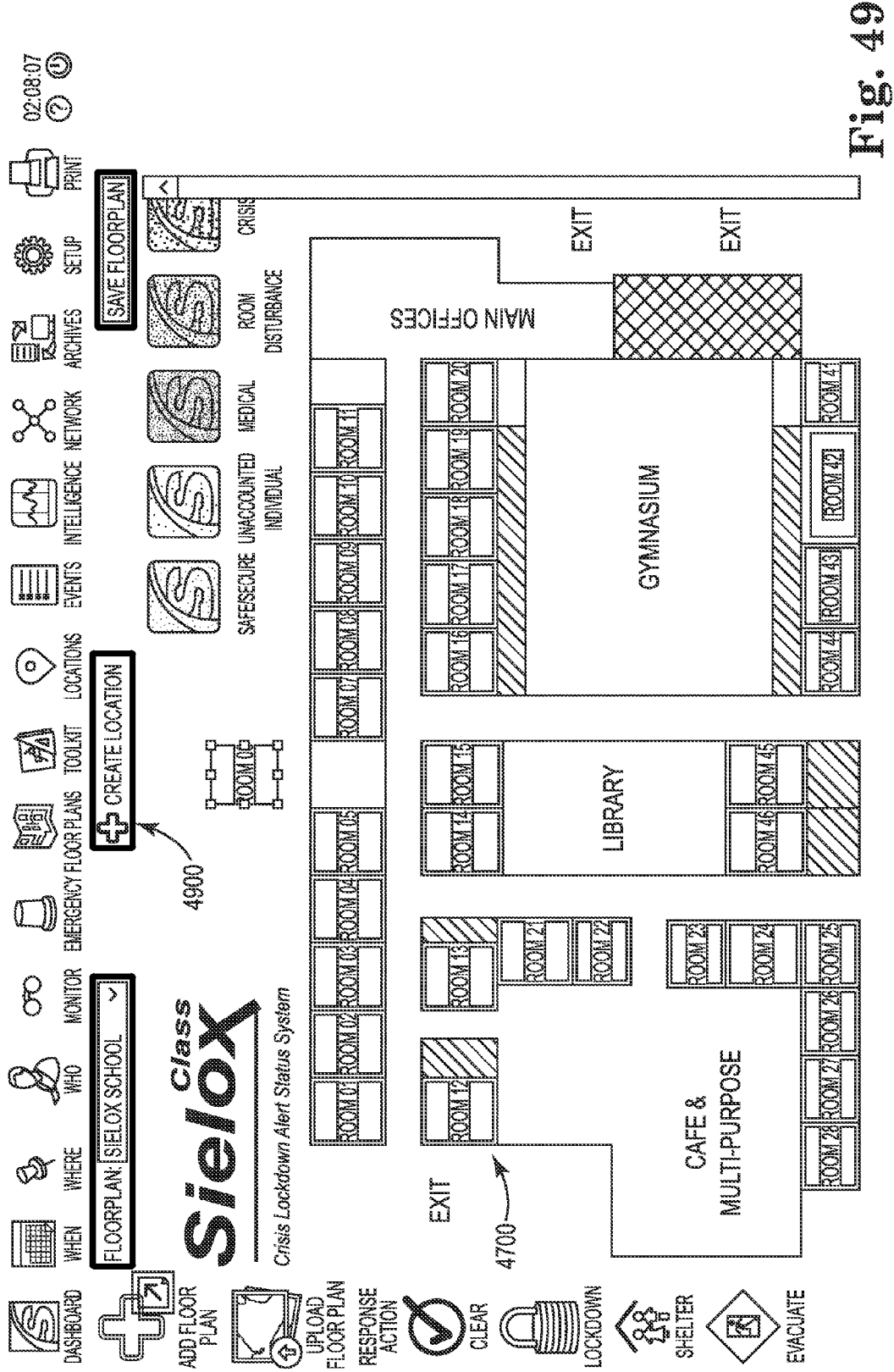
FIG. 49 is a screenshot from an embodiment of an authorized administrator interface for the database of an embodiment of the invention relating to editing locations on the floor plan, according to some embodiments of the present disclosure.
Figure 50:
FIG. 50 is a screenshot from an embodiment of an authorized administrator interface for the database of an embodiment of the invention showing a list of locations, according to some embodiments of the present disclosure.
Figure 51:
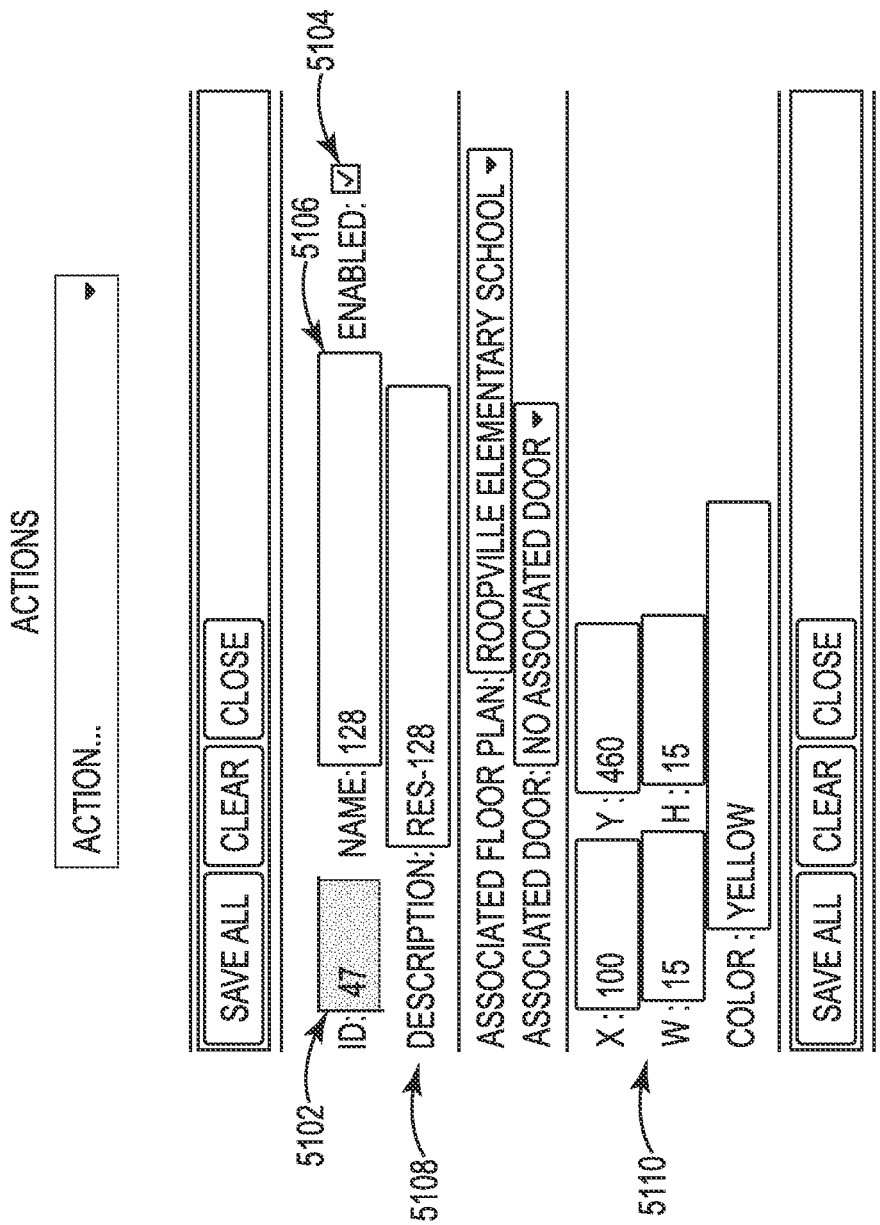
FIG. 51 is a screenshot from an embodiment of an authorized administrator interface for the database of an embodiment of the invention relating to the function of modifying, adding, or editing the locations, according to some embodiments of the present disclosure.

In some embodiments, the authorized administrator may view floor plans stored in the database for the building through the interface 300. The floor plans may be used to give the authorized administrator a physical, two-dimensional or three-dimensional physical layout of a school. In at least one embodiment, the authorized administrator may access the floor plans by selecting the "floor plans" icon on the interface 300. In at least one embodiment, shown in FIG. 46, a list of floor plans is viewable by the authorized administrator (as shown generally at 4600). The list of floor plans may provide information such as the name of the floor plan (shown generally at 4602), the status of the floor plan (shown generally at 4604), whether the floor plan is active in the system (shown generally at 4606), and a brief description of the floor plan to help the administrator identify it (shown generally at 4608). In some embodiments, the status of the floor plan is visually communicated by an icon or a color such as green, yellow, blue, orange, red or no color. In at least one embodiment, these icons or colors are prioritized to reflect the seriousness of the situation in the room. In one embodiment, red is the highest priority color, followed by orange, blue, yellow, green or no color, although any system of prioritization of colors or icons is contemplated by this invention. In at least one embodiment, the status can only be overridden with a higher priority color. For example, if the status was blue, it could only change if orange or red were selected. However, if green were selected, the status would remain blue until the status was cleared. In at least one embodiment, the authorized administrator can perform one of several actions related to the floor plan including, but not limited to, viewing the building's floor plan, activating a lockdown mode for the building or a portion thereof, clearing the lockdown, setting a status for the building or a portion thereof, removing the status, editing the floor plan, copying the floor plan, and/or deleting the floor plan, for example. The authorized administrator may view a selected floor plan 4700, an example of which is shown in FIG. 47. As shown in FIG. 47, each room or area may be filled with a different color to indicate the emergency status of the room or area as discussed above. The authorized administrator, in some embodiments, may add or upload a floor plan to the database. As shown in FIG. 48, the floor plan may be assigned an identification number or other identifier which is stored in ID field 4802. The system may automatically populate the ID field 4802. In at least one embodiment, the authorized administrator can enable or disable the floor plan (as shown generally at 4804). In some embodiments, the authorized administrator may enter or edit the name of the floor plan (shown generally at 4806) and/or may enter or edit a brief description for the floor plan (shown generally at 4808). In at least one embodiment, the floor plan image file can be selected (shown generally at 4810). As shown in FIG. 48, the floor plan image file can be selected from a drop-down menu, but other methods of selecting a file through a graphical user interface may be used. In at least one embodiment shown in FIG. 49, the authorized administrator can add locations or move locations on a floor plan 4700 as shown generally at 4900. In some embodiments, a location is a room, a hallway, a stairwell, or another discrete area of the building. Once a new location is created, in some embodiments it may populate onto the map and may be moved, resized or deleted after creation. In at least one embodiment, an authorized administrator may view a list of locations (as shown in FIG. 50 generally at 5000) and add or edit locations (as shown in FIG. 51) for inclusion on the floor plan. The list of locations 5000 may provide information such as the name of the location (shown generally at 5002), the status of the location (shown generally at 5004), whether the location is active (shown generally at 5006), and/or a brief description of the floor plan to help the administrator identify it (shown generally at 5008). In some embodiments, the status of the location is visually communicated by an icon or a color such as green, yellow, blue, orange, red or no color. In at least one embodiment, these icons or colors are prioritized to reflect the seriousness of the situation in the room. In one embodiment, red is the highest priority color, followed by orange, blue, yellow, green or no color, although any system of prioritization of colors or icons is contemplated by this invention. In at least one embodiment, the status can only be overridden with a higher priority color. For example, if the status was blue, it could only change if orange or red were selected. However, if green were selected, the status would remain blue until the status was cleared. In some embodiments, the authorized administrator may perform one of several actions related to the location including, but not limited to, viewing the location, activating a lockdown mode for the location, clearing the lockdown, editing the location, copying the location or deleting the location. The authorized administrator, in some embodiments, may add or edit a location. In at least one embodiment, as shown in FIG. 51, the floor plan is assigned an identification number or other identifier which is stored in ID field 5102. In at least one embodiment, the system automatically populates the ID field 5102. In at least one embodiment, the authorized administrator can enable or disable the location (as shown generally at 5104). In at least one embodiment, the authorized administrator can enter or edit the name of the location (shown generally at 5106) and in some embodiments the authorized administrators can enter or edit a brief description for the floor plan (shown generally at 5108). In at least one embodiment, the authorized user can associate the location with a particular floor plan, controller, door, or other safety device. In at least one embodiment, the dimensions of the location can be stored. In one embodiment, the x-coordinate, y-coordinate, height and width of the location are stored, as shown generally at 5110 in FIG. 51.

Figure 52:
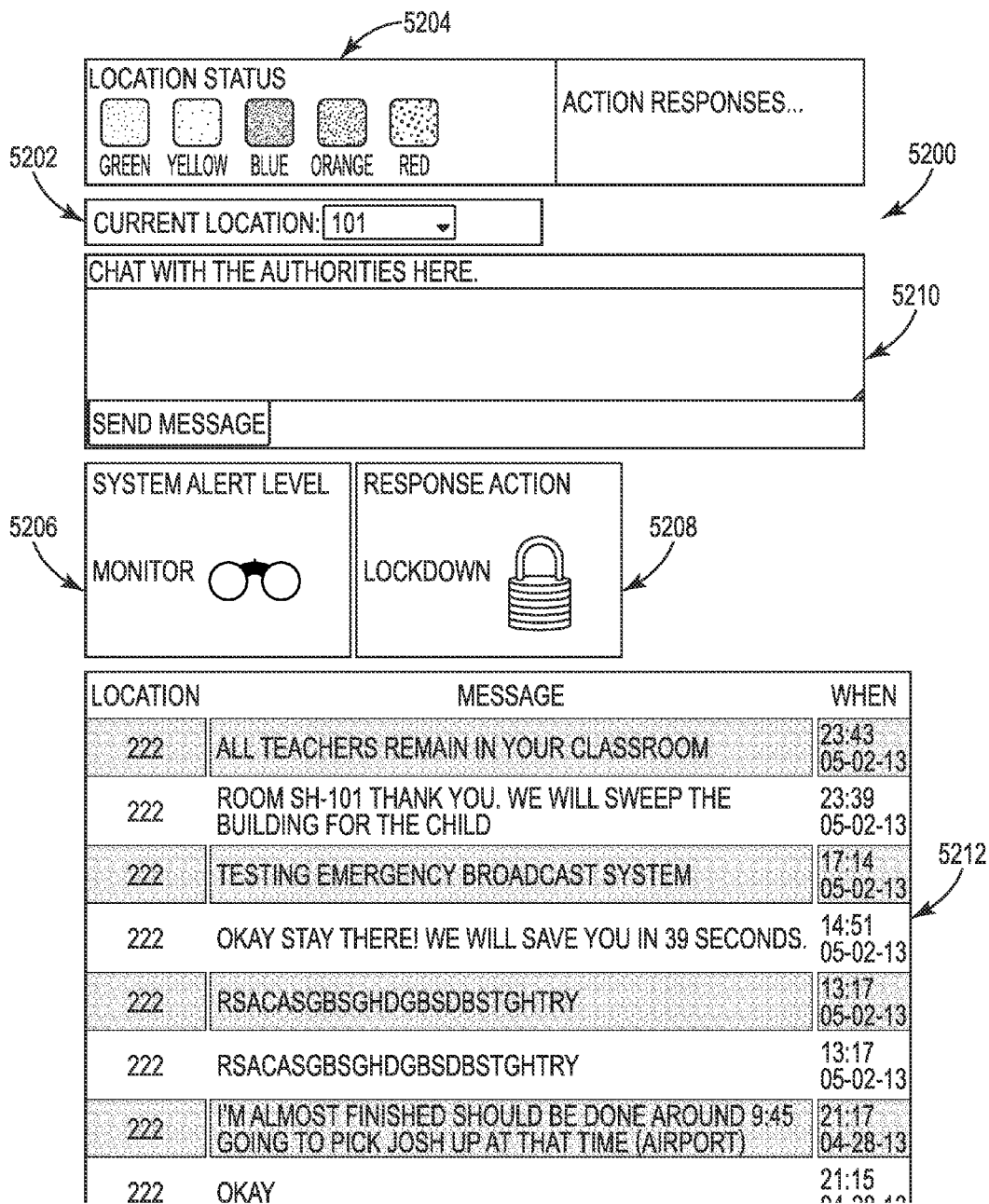
FIG. 52 is a screenshot from an embodiment of an authorized user interface for the database of an embodiment of the invention, according to some embodiments of the present disclosure.
Figure 53:
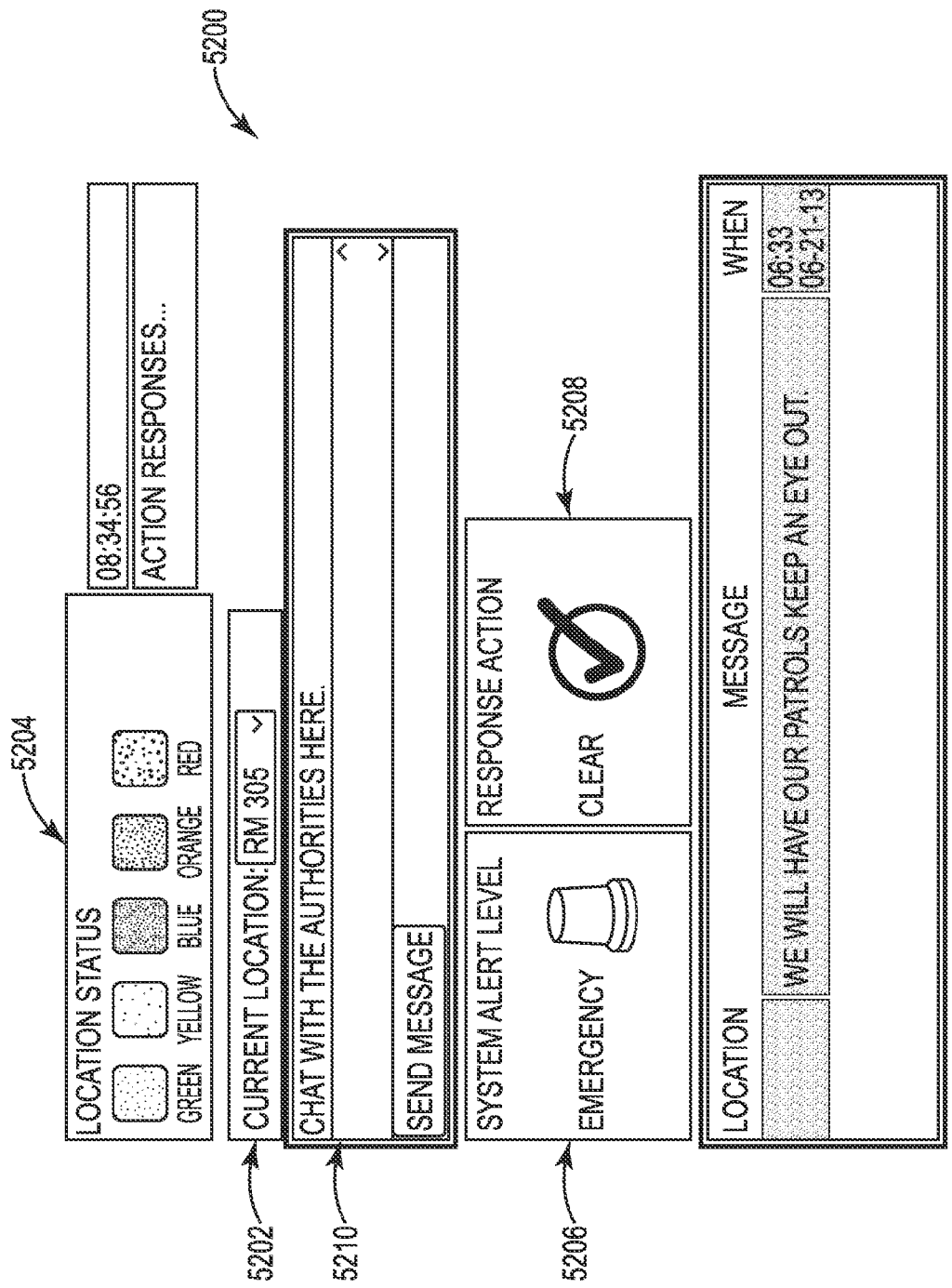
FIG. 53 is a screenshot from an embodiment of an authorized user interface for the database of an embodiment of the invention, according to some embodiments of the present disclosure.

FIGS. 52-53 show an exemplary interface 5200 for an authorized user, which can be accessed by the remote device 108 of the authorized user. In at least one embodiment, the authorized user's current location is provided (as shown generally at 5202). The authorized user may identify the present location status for the location that they are currently in, by either self-identifying their location, scanning a QR code or an RFID tag, relying on a GPS locator in their remote device, or other suitable methods of location identification. In the embodiment shown in FIG. 52, the authorized user can select a status for the identified location (as shown generally at 5204). The status may include "safe" or "secure", "unaccounted individual," "medical," "room disturbance," an emergency crisis situation, or any other desired and/or suitable status. As shown in FIG. 52, the authorized user can select the status by selecting a particular color coded icon, another particular visual indicia, a status from a drop down menu, or other suitable visual indicia. In at least one embodiment, the authorized user can view the current system alert level for the building (as shown generally at 5206 of FIG. 52). In some embodiments, the current system alert level is selected from the group consisting of monitor (no apparent danger in the school) and emergency (level in which the threat of danger is present). In at least one embodiment, the authorized user can be informed of what action to take in protecting and directing a classroom (as shown generally at 5208 of FIG. 52). In some embodiments, the action may include an instruction to lockdown the school, an instruction to stay in the building, an instruction to exit the building, and an "all clear" sign. In some embodiments, this action may be communicated by a particular graphic icon, another visual indicia, audio, video, or text. If the action is the lockdown action, in some embodiments it may only be cleared by a first responder or authorized administrator. As shown at least in FIG. 52, the authorized user may communicate with a first responder or an authorized administrator through a chat feature, shown generally at 5210. In at least one embodiment, the chat feature displays one or more of the location of the authorized user, the message, a date/time stamp of the message, and information regarding the message sender. The authorized user may also review the most recent actions in the status as shown generally at 5212 in FIG. 52.

Figure 54:
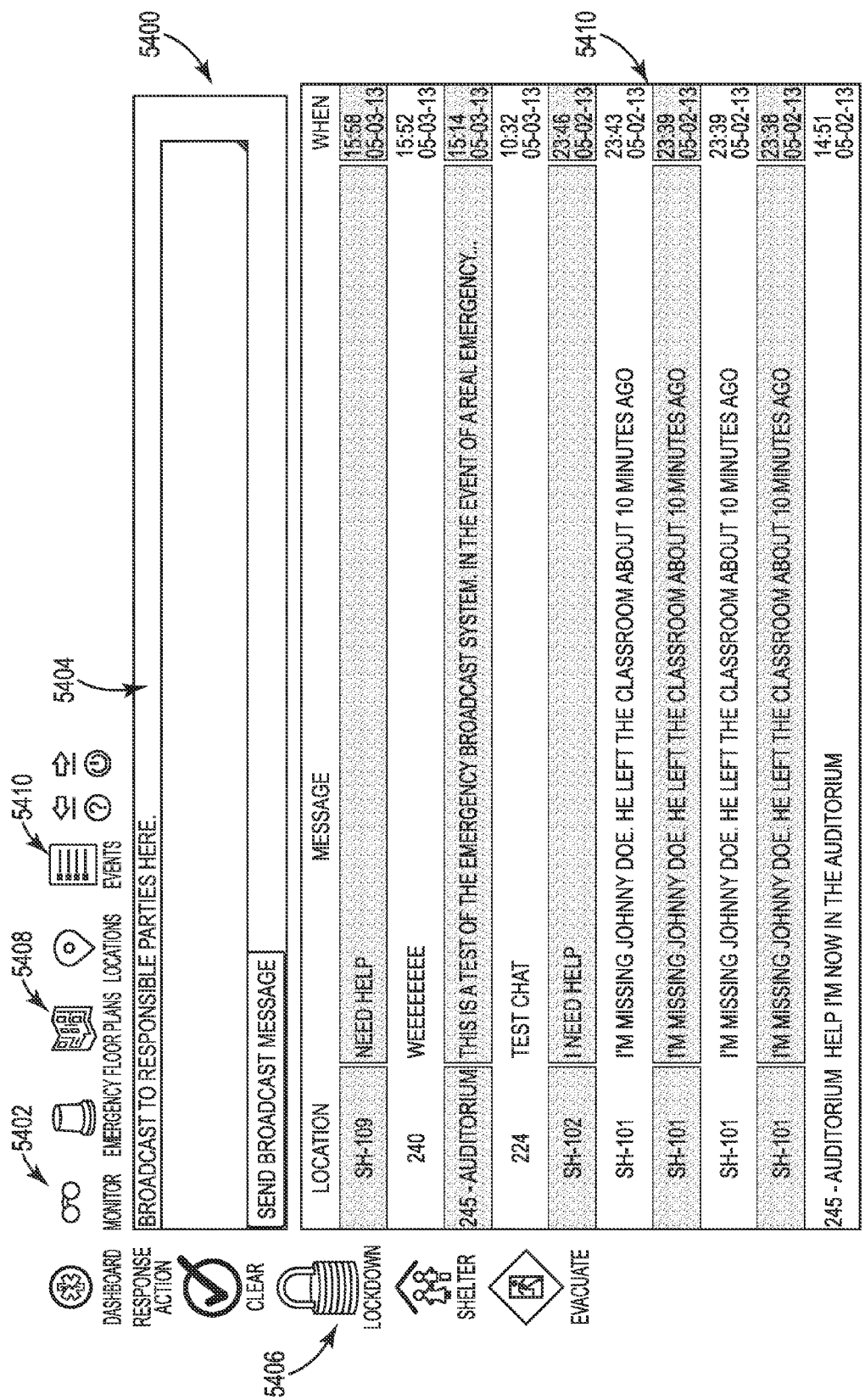
FIG. 54 is a screenshot from an embodiment of a responder interface for the database of an embodiment of the invention, according to some embodiments of the present disclosure.

While either of the above user interfaces may be suitable for a first responder to also use, in at least one embodiment, first responders such as medical personnel, police officers, and firefighters may have their own interface, an exemplary embodiment of which is shown at FIG. 54. Interface 5400 allows the responder to take a number of actions relative to the building and the database, including but not limited to, changing the system alert level (as shown generally at 5402); chatting, sending instant messages, or sending broadcast messages, and sharing information through text, video or audio communication with authorized administrators or authorized users (as shown generally at 5404); selecting the response action such as to lockdown the school, to stay in the building, to exit the building, and "all clear" sign (as shown generally at 5406); viewing floor plans (for example, by selecting the "floor plan" icon shown at 5408); and/or viewing a list of events (for example, by selecting the "events" icon at 5410). In some embodiments, a responder can "pause" an event if the first responder wants to stop notification of future events to look at an event without being interrupted. In one embodiment, the responder can select one icon to temporally pause the incoming events and another icon to resume the events, or other similar graphic user interface functions to pause and resume the event list. When the responder selects the "floor plan," the responders may be shown a list of floor plans (shown generally at 5500) for the building, and the responder can then select "view" from one or more actions to view the floor plan as shown in FIG. 55 (as shown generally at 5502).

Figure 55:
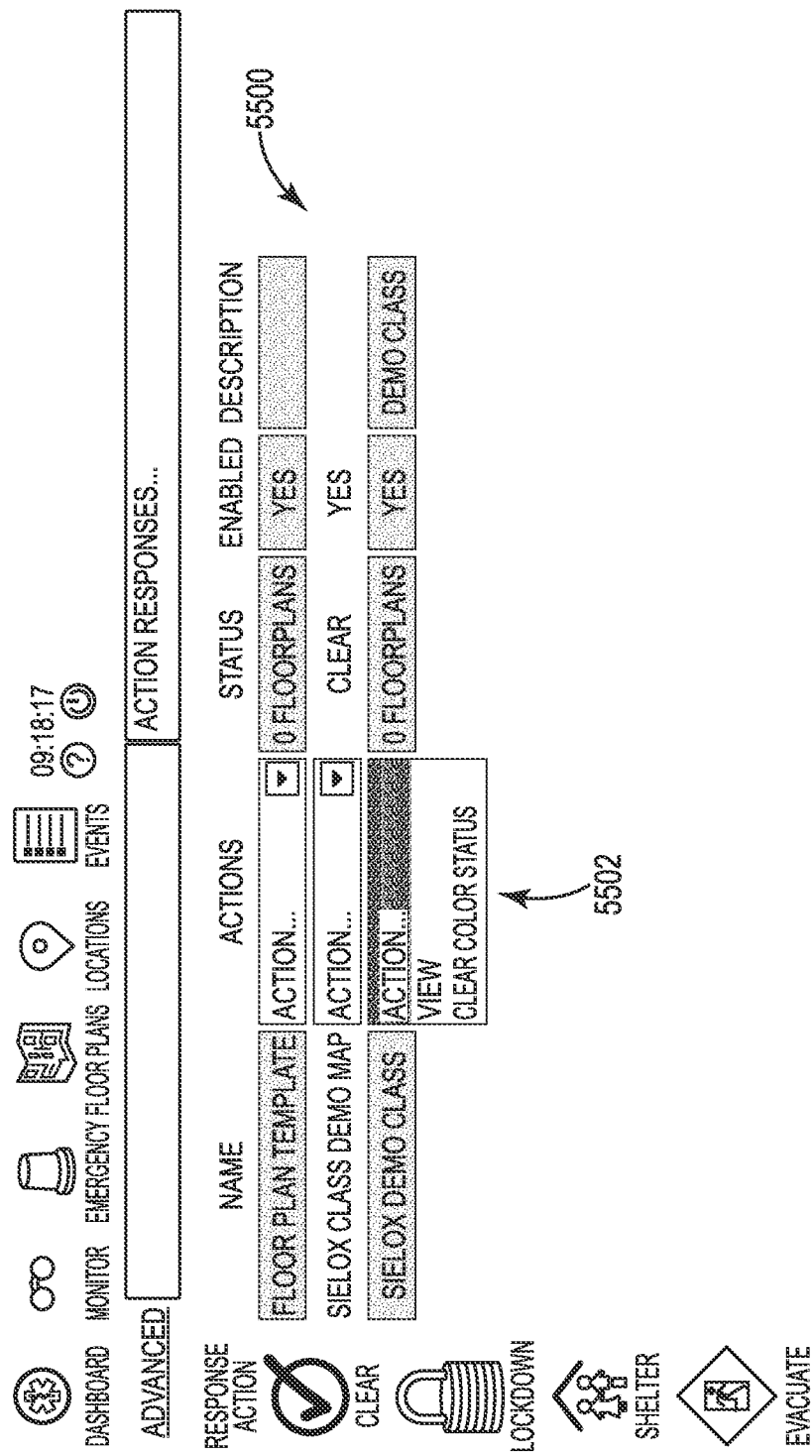
FIG. 55 is a screenshot from an embodiment of a responder interface for the database of an embodiment of the invention relating to floor plans, according to some embodiments of the present disclosure.

In at least one embodiment, the responder may also clear color statuses via the floor plan list, as shown in FIG. 55. In some embodiments, the responder can also view particular locations, as shown in FIG. 56. The responders may be shown a list of locations 5600, and the responder can then select "view" from one or more actions to view the locations as shown in FIG. 56 (shown generally at 5602). In at least one embodiment, the responder may also clear color statuses via the location list, as shown in FIG. 56. In at least one embodiment, the responder may also view a list of events 5700, as shown in FIG. 57.

The system may include an interface to a paging system that may be commutatively coupled to the school or institution's intercom system, for example. In the event that an emergency is in progress, the programming could include the ability to trigger one of a plurality of pre-recorded messages, for example. An authorized user may initiate such a feature. The messages could include updates, emergency instructions, etc. In some embodiments, the user may record one or more messages in real time for playing over the sound system.

In some embodiments, an instant messaging type of application may be included in the system to allow one or more users to interact in real time. For example, security personnel or first responders may try to instant message with a teacher in a room that according to the database has an emergency issue to try to determine whether the occupants of the room are safe. Or in other cases, security personnel may wish to provide instructions to either evacuate the room, area, or building, or stay in place, for example.

At least one of the chat feature, instant messaging feature or the intercom feature may also be used to notify a single room, a plurality of rooms, or an even larger area that a threat is or may be in the area and that lockdown mode should be initiated and/or that the occupants should proceed to any area that does not have a paging or notification system to notify anybody there of the threat. Additionally, occupants of particular rooms or areas may be notified of where safe areas may be and whether it appears that they have a clear route to the safe area and/or the best route for reaching a safe or safer area. In some embodiments, a chat feature is provided that enables the authorized user and the authorized administrator (including for example a first responder) to communicate via audio, video, or text in order to communicate information or instructions.

Figure 59:
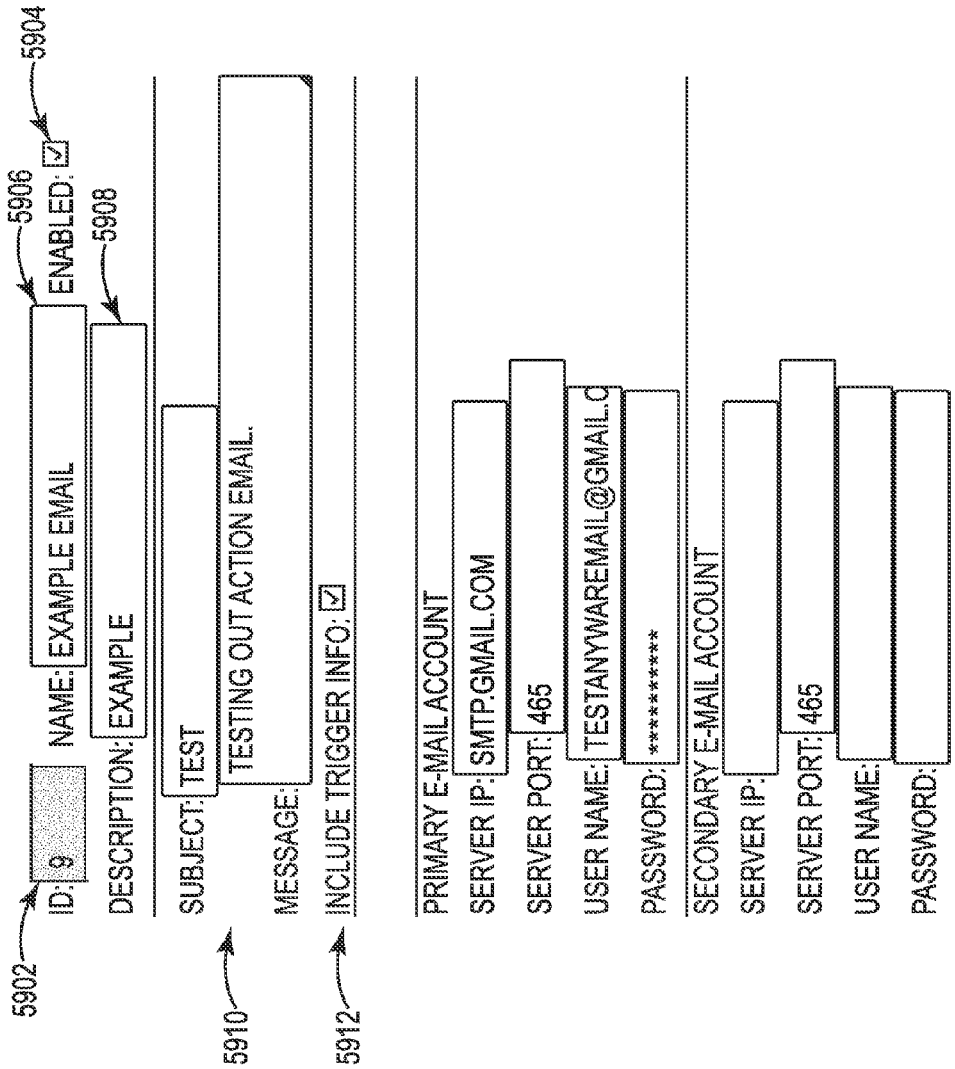
FIG. 59 is a screenshot from an embodiment of the email system relating to the creation of an action e-mail, according to some embodiments of the present disclosure.

In some embodiments, the system may also include an e-mail server to allow instructions to be sent to authorized users or cardholders with instructions about actions, at least when a trigger is fired as discussed above. As shown in FIG. 58, an action e-mail can be added to the list of action e-mails (shown generally at 5800). The action emails may be identified in the list of action e-mails by name (shown generally at 5802); action (shown generally at 5804); status (shown generally at 5806); whether enabled or disabled name (shown generally at 5808); description (shown generally at 5810); and/or subject (shown generally at 5812). In some embodiments, an action e-mail may be created or modified by selecting a drop-down menu (shown generally at 5814) in the list of action e-mails 5800. An action e-mail may be created or modified as shown in FIG. 59. The action e-mail may have an assigned identification number or other identifier which is stored in ID field 5902. The system may automatically populate the ID field 5902. In at least one embodiment, the authorized administrator may enable or disable the e-mail (as shown generally at 5904); enter or edit the name of the e-mail (shown generally at 5906); and/or may enter or edit a brief description for the e-mail message (shown generally at 5808). In some embodiments, a subject heading and a message may be provided in the action e-mail (shown generally at 5910). In at least one embodiment, information regarding an appropriate trigger may be included (shown generally at 5912). In some embodiments, an e-mail server may need to be configured by entering the server IP of the e-mail service (for example, Gmail, Yahoo, Hotmail, etc.) and the server port for the e-mail service. The administrator can then enter the user name and password for the account created under the e-mail service. In at least one embodiment, a secondary e-mail account can be added, which will send the message if the first e-mail account cannot send the message. In at least one embodiment, the e-mail can be tested using the test connection button, which in one embodiment is configured to send the message to itself.

The system may also include occupant lists associated with a given room or area, if appropriate. For example, a classroom in a school may include a list of all of the children in the class during each period of the day, as well as the teachers that teach in the room for each period of the day. In some cases, a teacher may update the list to indicate if a student is not present at the start of a day or class period. The occupant list may include pictures of each of the room occupants to make identification during an emergency easier for rescue personnel, for example.

While certain embodiments have been described in detail, it will be understood that the present disclosure is not limited to such embodiments, but rather includes variations of features described, as well as combinations of features described, which are also included within the spirit and scope of the present invention.

What is claimed is:

1. An emergency notification system for an area having a plurality of particular locations, the system comprising:
   a central server;
   an administrative work station communicably coupled to the central server, wherein the administrative work station is accessible only by an authorized administrator;
   a database communicably coupled to the central server, the database accessible and modifiable by the authorized administrator at the administrative work station, the database further communicably coupled to a plurality of remote devices accessible only by an authorized user, each remote device at one of the plurality of locations; and
   a dynamic floor plan of the area, the floor plan displaying a crisis status indicator for each of the plurality of particular locations, the indicator for each particular location updating in real time based on communication received from the remote device at the particular location, the floor plan stored in the database and viewable at each of the plurality of remote devices and at the administrative work station.

2. The emergency notification system of claim 1, wherein the authorized user selects an indicator on the remote device corresponding to the crisis status of the location, which is communicated to the database and the floor plan is updated in real time to reflect the security status of the location.

3. The emergency notification system of claim 1, further comprising a chat feature enabling at least one of audio, video, or text communication between the authorized administrator and the authorized user.

4. The emergency notification system of claim 1, further comprising:
   a safety device communicably coupled to the central server, wherein a signal may be sent by the central server to the safety device to control the safety device depending on the crisis status of the particular location.

5. The emergency notification system of claim 4, wherein the safety device is selected from the group consisting of speakers, alarms, cameras, lights, locks, barriers, sensors, fire sprinkler systems, and public address systems.

6. The emergency notification system of claim 1, wherein the authorized administrator is at least one of an employee, a security officer, or a first responder.

7. The emergency notification system of claim 1, wherein the remote device is in wireless communication with the central server.

8. The emergency notification system of claim 1, wherein the remote device comprises a microphone, a camera, and a speaker.

9. The remote device of claim 8, wherein the remote device is selected from the group consisting of mobile phones, smartphones, and tablet devices.

10. The emergency notification system of claim 1, wherein the remote device comprises a touchscreen.

11. A method of remotely communicating a crisis status of a particular location to an authority and a plurality of remote devices, the method comprising:
    communicating the particular location of a first authorized user to a database via a remote device, wherein the database is communicably coupled to a central server and the database includes a dynamic floor plan of the area viewable by the authority and by a plurality of remote devices in the area; and
    selecting an indicator that correlates with a crisis status of the particular location, wherein selecting the indicator updates the floor plan in the database in real time by populating an indicator reflecting the crisis status of the particular location.

12. The method of claim 11, further comprising:
    communicating instructions and information through a chat feature enabling at least one of audio, video, or text communication between the authority and the authorized user.

13. The method of claim 11, further comprising:
    controlling a safety device communicably coupled to the central server, wherein a signal dependent upon the crisis status of the particular location may be sent by the central server to the safety device.

14. The emergency notification system of claim 13, wherein the safety device is selected from the group consisting of speakers, alarms, cameras, lights, locks, barriers, sensors, fire sprinkler systems, and public address systems.

* * * * *

UNITED STATES PATENT AND TRADEMARK OFFICE
CERTIFICATE OF CORRECTION

Page 1 of 1

PATENT NO. : 9,299,236 B2
APPLICATION NO. : 14/077986
DATED : March 29, 2016
INVENTOR(S) : Karen Evans It is certified that error appears in the above-identified patent and that said Letters Patent is hereby corrected as shown below:

Title Page, Item (73), Assignee, delete "Sietox, LLC" and insert --Sielox, LLC-- therefor.

In the Drawings,

Sheet 2, Figure 2, insert reference number --206-- to refer to the item labeled GATEWAY/ROUTER/FIREWALL.

Sheet 2, Figure 2, insert reference number --210-- to refer to the item communicatively arranged between the database 202 and the safety devices 212, and communicatively arranged between the central server 206 and the safety devices 212. Specifically, reference number 210 refers to the drawing of three grouped devices arranged at the lower left corner of Fig. 2, and shown between a line labeled LAN and the line labeled SLX INTERFACE.

Signed and Sealed this
Nineteenth Day of July, 2016

Michelle K. Lee
*Director of the United States Patent and Trademark Office*